(12) United States Patent
Pfost et al.

(10) Patent No.: US 6,485,690 B1
(45) Date of Patent: Nov. 26, 2002

(54) MULTIPLE FLUID SAMPLE PROCESSOR AND SYSTEM

(75) Inventors: Dale R. Pfost, Pennington, NJ (US); Sheila H. DeWitt, Stockton, NJ (US); Chao Lin, Monmouth Junction, NJ (US); Rolf E. Swenson, Princeton, NJ (US); Robert D. Juncosa, Yardley, PA (US); Gary J. Schnerr, Pennington, NJ (US); Sheldon M. Kugelmass, New York, NY (US)

(73) Assignee: Orchid BioSciences, Inc., Princeton, NJ (US)

( * ) Notice: Subject to any disclaimer, the term of this patent is extended or adjusted under 35 U.S.C. 154(b) by 0 days.

(21) Appl. No.: 09/321,410

(22) Filed: May 27, 1999

(51) Int. Cl.[7] .................................................. B01L 3/00
(52) U.S. Cl. ...................... 422/102; 422/68.1; 422/99; 422/100; 436/174; 436/179; 436/180
(58) Field of Search .................. 422/63, 68.1, 99–104, 422/130, 131, 134; 436/174, 175, 179, 180

(56) References Cited

U.S. PATENT DOCUMENTS

| | | |
|---|---|---|
| 3,494,723 A | 2/1970 | Gray |
| 3,615,241 A | 10/1971 | Low |
| 3,953,792 A | 4/1976 | Fletcher et al. |

(List continued on next page.)

FOREIGN PATENT DOCUMENTS

| | | |
|---|---|---|
| EP | 0198413 A2 | 4/1986 |
| EP | 0483117 A2 | 7/1986 |

(List continued on next page.)

OTHER PUBLICATIONS

Woolley & Mathies Article: "Ultra–High Speed DNA Fragment Separations Using Microfabricated Capillary Array Electrophoresis Chips"—Proc. Natl. Acad. Sci., vol. 91, pp. 11348–11352, Nov. 1994.

Dasgupta & Liu Article: "Electroosmosis: A Reliable Fluid Propulsion System for Flow Injection Analysis"—Anal. Chem. 1994, 66, 1792–1798.

Harmon, et al. Article: "Selectivity in Electrophoretically Mediated Microanalysis by Control of Product Detection Time"—Anal. Chem. 1994, 66, 3797–3805.

(List continued on next page.)

Primary Examiner—Jill Warden
Assistant Examiner—Dwayne K Handy
(74) Attorney, Agent, or Firm—Kevin G. Mierzwa

(57) ABSTRACT

Multiple fluid sample processors and systems for high throughput chemical synthesis and biological assays and/or processing. A multi-layered fluidic array having microchannels, reservoirs and reaction wells is subject to robotic and automated handling. A pressure pumping system is utilized for fluid delivery and control through the synthesis process. The sizes of the micro-sized channels, apertures, and valves are adjusted to optimize fluid distribution and channel filling. The fluid sample processors can be grouped together in a microtiter format to increase the speed, quantity and efficiency of the processing.

53 Claims, 26 Drawing Sheets

U.S. PATENT DOCUMENTS

| | | |
|---|---|---|
| 3,957,583 A | 5/1976 | Gibson et al. |
| 4,038,151 A | 7/1977 | Fadler et al. |
| 4,049,200 A | 9/1977 | Sobol |
| 4,271,119 A | 6/1981 | Columbus |
| 4,276,048 A | 6/1981 | Leaback |
| 4,283,262 A | 8/1981 | Cormier et al. |
| 4,284,496 A | 8/1981 | Newton |
| 4,298,795 A | 11/1981 | Takeuchi et al. |
| 4,301,970 A | 11/1981 | Craighero |
| 4,310,399 A | 1/1982 | Columbus |
| 4,318,028 A | 3/1982 | Perel et al. |
| 4,385,115 A | 5/1983 | de Zabala et al. |
| 4,426,451 A | 1/1984 | Columbus |
| 4,495,025 A | 1/1985 | Haskell |
| 4,501,965 A | 2/1985 | Douglas |
| 4,533,430 A | 8/1985 | Bower |
| 4,589,952 A | 5/1986 | Behringer et al. |
| 4,601,881 A | 7/1986 | Webster |
| 4,640,140 A | 2/1987 | Burghoffer et al. |
| 4,676,274 A | 6/1987 | Brown |
| 4,683,914 A | 8/1987 | Brisland |
| 4,748,043 A | 5/1988 | Seaver et al. |
| 4,749,125 A | 6/1988 | Escallon et al. |
| 4,753,775 A | 6/1988 | Ebersole et al. |
| 4,756,884 A | 7/1988 | Hillman et al. |
| 4,765,539 A | 8/1988 | Noakes et al. |
| 4,794,086 A | 12/1988 | Kasper et al. |
| 4,826,703 A | 5/1989 | Kisler |
| 4,842,701 A | 6/1989 | Smith et al. |
| 4,846,407 A | 7/1989 | Coffee et al. |
| 4,861,988 A | 8/1989 | Henion et al. |
| 4,891,120 A | 1/1990 | Sethi et al. |
| 4,908,112 A | 3/1990 | Pace |
| 4,935,624 A | 6/1990 | Henion et al. |
| 4,948,961 A | 8/1990 | Hillman et al. |
| 4,960,486 A | 10/1990 | Perkins et al. |
| 4,963,498 A | 10/1990 | Hillman et al. |
| 4,977,320 A | 12/1990 | Chowdhury et al. |
| 4,999,283 A | 3/1991 | Zavos et al. |
| 4,999,284 A | 3/1991 | Ward et al. |
| 4,999,286 A | 3/1991 | Gawel et al. |
| 5,000,817 A | 3/1991 | Aine |
| 5,001,048 A | 3/1991 | Taylor et al. |
| 5,003,822 A | 4/1991 | Joshi |
| 5,006,749 A | 4/1991 | White |
| 5,009,503 A | 4/1991 | Murphy, Jr. et al. |
| 5,015,845 A | 5/1991 | Allen et al. |
| 5,063,081 A | 11/1991 | Cozzette et al. |
| 5,066,938 A | 11/1991 | Kobashi et al. |
| 5,073,029 A | 12/1991 | Eberly et al. |
| 5,077,017 A | 12/1991 | Gorin et al. |
| 5,104,813 A | 4/1992 | Besemer et al. |
| 5,112,455 A | 5/1992 | Cozzzette et al. |
| 5,118,384 A | 6/1992 | Harmon et al. |
| 5,129,262 A | 7/1992 | White et al. |
| 5,140,161 A | 8/1992 | Hillman et al. |
| 5,141,868 A | 8/1992 | Shanks et al. |
| 5,143,854 A | 9/1992 | Pirrung et al. |
| 5,144,139 A | 9/1992 | Hillman et al. |
| 5,147,607 A | 9/1992 | Mochida |
| 5,156,810 A | 10/1992 | Ribi |
| 5,157,260 A | 10/1992 | Mylchreest et al. |
| 5,164,598 A | 11/1992 | Hillman et al. |
| 5,176,203 A | 1/1993 | Larzul |
| 5,186,001 A | 2/1993 | Muntz et al. |
| 5,188,963 A | 2/1993 | Stapleton |
| 5,189,914 A | 3/1993 | White et al. |
| 5,194,133 A | 3/1993 | Clark et al. |
| 5,200,051 A | 4/1993 | Cozzette et al. |
| 5,204,525 A | 4/1993 | Hillman et al. |
| 5,212,988 A | 5/1993 | White et al. |
| 5,220,189 A | 6/1993 | Higashi et al. |
| 5,229,297 A | 7/1993 | Schnipelsky et al. |
| 5,230,864 A | 7/1993 | Columbus |
| 5,230,866 A | 7/1993 | Shartle et al. |
| 5,238,853 A | 8/1993 | Calzi et al. |
| 5,241,363 A | 8/1993 | Garner |
| 5,247,842 A | 9/1993 | Kaufman et al. |
| 5,252,743 A | 10/1993 | Barrett et al. |
| 5,262,127 A | 11/1993 | Wise et al. |
| 5,270,170 A | 12/1993 | Schatz et al. |
| 5,277,754 A | 1/1994 | Hadimioglu et al. |
| 5,279,791 A | 1/1994 | Aldrich et al. |
| 5,288,463 A | 2/1994 | Chemelli |
| 5,296,114 A | 3/1994 | Manz |
| 5,296,375 A | 3/1994 | Kricka et al. |
| 5,304,487 A | 4/1994 | Wilding et al. |
| 5,312,590 A | 5/1994 | Gunasingham |
| 5,324,483 A | 6/1994 | Cody et al. |
| 5,324,633 A | 6/1994 | Fodor et al. |
| 5,326,598 A | 7/1994 | Seaver et al. |
| 5,359,115 A | 10/1994 | Campbell et al. |
| 5,384,261 A | 1/1995 | Winkler et al. |
| 5,412,087 A | 5/1995 | McGall et al. |
| 5,412,208 A | 5/1995 | Covey et al. |
| 5,420,328 A | 5/1995 | Campbell |
| 5,424,186 A | 6/1995 | Fodor et al. |
| 5,427,946 A | 6/1995 | Kricka et al. |
| 5,463,564 A | 10/1995 | Agrafiotis et al. |
| 5,480,614 A | 1/1996 | Kamahori |
| 5,503,985 A | 4/1996 | Cathey et al. |
| 5,580,523 A | 12/1996 | Bard |
| 5,585,069 A | 12/1996 | Zanzucchi et al. |
| 5,593,838 A | 1/1997 | Zanzucchi et al. |
| 5,603,351 A | 2/1997 | Cherukuri et al. |
| 5,609,921 A | 3/1997 | Gitzhofer et al. |
| 5,632,876 A | 5/1997 | Zanzucchi et al. |
| 5,643,738 A | 7/1997 | Zanzucchi et al. |
| 5,681,484 A * | 10/1997 | Zanzucchi et al. ............. 216/2 |
| 5,726,026 A | 3/1998 | Wilding et al. |
| 5,747,169 A | 5/1998 | Fan et al. |
| 5,755,942 A | 5/1998 | Zanzucchi et al. |
| 5,800,690 A | 9/1998 | Chow et al. |
| 5,800,778 A * | 9/1998 | Chen et al. .................... 422/48 |
| 5,840,256 A * | 11/1998 | Demers et al. ............. 422/102 |
| 5,842,106 A | 11/1998 | Thaler et al. |
| 5,846,396 A * | 12/1998 | Zanzucchi et al. .......... 204/601 |
| 5,853,586 A * | 12/1998 | Valus et al. ................. 210/406 |
| 5,854,684 A | 12/1998 | Stabile et al. |
| 5,858,193 A | 1/1999 | Zanzucchi et al. |
| 5,858,195 A | 1/1999 | Ramsey |
| 5,858,804 A | 1/1999 | Zanzucchi et al. |
| 5,863,502 A | 1/1999 | Southgate et al. |
| 5,863,708 A | 1/1999 | Zanzucchi et el. |
| 5,872,623 A | 2/1999 | Stabile et el. |
| 5,876,675 A | 3/1999 | Kennedy |
| 5,879,632 A | 3/1999 | Demers |
| 5,882,465 A | 3/1999 | McReynolds |
| 5,882,903 A | 3/1999 | Andrevski et al. |
| 5,906,795 A * | 5/1999 | Nakashima et al. ........ 422/100 |
| 5,957,579 A | 9/1999 | Kopf-Sill et al. |
| 5,958,203 A | 9/1999 | Parce et al. |
| 5,965,410 A | 10/1999 | Chow et al. |
| 5,976,336 A | 11/1999 | Dubrow et al. |
| 6,045,755 A * | 4/2000 | Lebl et al. ..................... 422/65 |
| 6,149,787 A * | 11/2000 | Chow et al. ................. 204/451 |
| 6,167,910 B1 * | 1/2001 | Chow ........................ 137/827 |

FOREIGN PATENT DOCUMENTS

| | | | |
|---|---|---|---|
| EP | 0402995 | A2 | 6/1990 |
| EP | 0430248 | A2 | 11/1990 |

| | | |
|---|---|---|
| EP | 0501796 A2 | 2/1992 |
| GB | 2248840 A | 7/1990 |
| WO | 90/09590 A1 | 8/1990 |
| WO | 91/16966 A1 | 11/1991 |
| WO | 92/10092 A1 | 6/1992 |
| WO | 93/06121 A1 | 4/1993 |
| WO | 93/22053 A1 | 11/1993 |
| WO | 93/22054 A1 | 11/1993 |
| WO | 93/22055 A2 | 11/1993 |
| WO | 93/22058 A1 | 11/1993 |
| WO | 93/22421 A1 | 11/1993 |
| WO | 94/05414 A1 | 3/1994 |
| WO | 94/10128 A1 | 5/1994 |
| WO | 95/12608 A1 | 5/1995 |
| WO | 96/04547 A1 | 2/1996 |

OTHER PUBLICATIONS

Patterson, et al. Article: "Electrophoretically Mediated Microanalysis of Calcium"—Journal of Chromatography A. 662 (1994) 389–395.

Chemical & Engineering News Article: "Microfabricated Device is Chemistry Lab on a Chip" Volume, page and date unknown.

Harmon, et al. Article: "Mathematical Treatment of Electrophoretically Mediated Microanalysis" Anal. Chem. 1993, 65, 2655–2662.

Avila & Whitesides Article: "Catalytic Activity of Native Enzymes During Capillary Electrophoresis: An Enzymatic Microreactor"—J. Org. Chem. 1993, 58, 5508–5512.

Harmon, et al. Article: "Electrophoretically Mediated Microanalysis of Ethanol"—Journal of Chromathography A. 657 (1993) 429–434.

Bao & Regnier Article: "Ultramicro Enzyme Assays in a Capillary Electrophoretic System"—Journal of Chromatography, 608 (1992) 217–224.

Plettner, et al. Article: "A Micromachined Electrohydrodynamic (EHD) Pump"—Sensors and Actuators A. 29 (1991) 159–168.

Bart, et al. Article: "Microfabricated Electrohydrodynamic Pumps"—Sensors and Actuators, A21–A23 (1990) 193–197.

Melcher Article: "Traveling–Wave Induced Electroconvection"—The Physics of Fluids, vol. 9, No. 8, Aug. 1966, pp. 1548–1555.

Pickard Article: "Ion Drag Pumping. I. Theory"—Journal of Applied Physics, vol. 34, No. 2, Feb. 1963, pp. 246–250.

Pickard Article: "Ion Drag Pumping. II. Experiment"—Journal of Applied Physics, vol. 34, No. 2, Feb. 1961, pp. 251–258.

Stuetzer Article: "Ion Drag Pumps"—Journal of Applied Physics, vol. 32, No. 1, Jan., 1960, pp. 136–146.

Tracey, et al. Article: "Microfabricated Microhaemorheometer"—(source and date unknown).

Medynski Article: "Synthetic Peptide Combinatorial Libraries"—Bio/Technology vol. 12, Jul., 1994, pp. 709–710.

Jacobson, et al. Article: "Precolumn Reactions with Electrophoretic Analysis Integrated on a Microchip"—Anal. Chem. 1994, 66, 4127–4132.

Jacobson, et al. Article: "Effects of Injection Schemes and Column Geometry on the Performance of Microchip Electrophoresis Devices"—Anal. Chem. 1994, 66, 1107–1113.

Jacobson, et al. Article: "High–Speed Separations on a Microchip"—Anal. Chem. 1994, 66, 1114–1118.

Fan & Harrison Article: "Micromachining of Capillary Electrophoresis Injectors and Separators on Glass Chips and Evaluation of Flow at Capillary Intersections"—Anal. Chem. 1994, 66, 177–184.

Mehregany Article: "Microelectromechanical Systems"—Jul., 1993, pp. 14–22.

Harrison, et al. Article: "Micromachining a Miniaturized Capillary Electrophoresis–Based Chemical Analysis System on a Chip"—Science, vol. 261, Aug. 13, 1993, pp. 895–897.

Harrison, et al. Article: "Capillary Electrophoresis and Sample Injection Systems Integrated on a Planar Glass Chip"—Anal. Chem. 1992, 64, 1926–1932.

Fisher Article: "Microchips for Drug Compounds"—New York Times, Mar. 3, 1991, page unknown.

Howe & Muller, et al. Article: "Silicon Micromechanics: Sensors and Actuators on a Chip"—IEEE Spectrum, Jul., 1990, pp. 29–35.

Wenzel & White Article: "A Multisensor Employing an Ultrasonic Lamb–Wave Oscillator"—IEEE Transactions on Electron Devices, vol. 35, No. 6, Jun., 1988, pp. 735–743.

Angell, et al. Article: "Silicon Micromechanical Devices"—Scientific American 248, 44–55, 1983.

Petersen Article: "Silicon as a Mechanical Material"—IEEE—1982, pp. 420–457.

Fodor et al., Science, vol. 251, No. 4995 (Feb. 15, 1991), pages unknown.

* cited by examiner

FIG.6
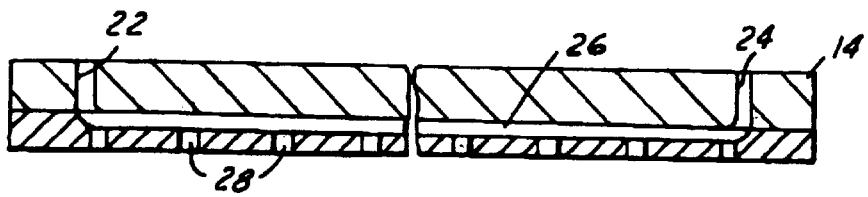
FIG.7
FIG.7A
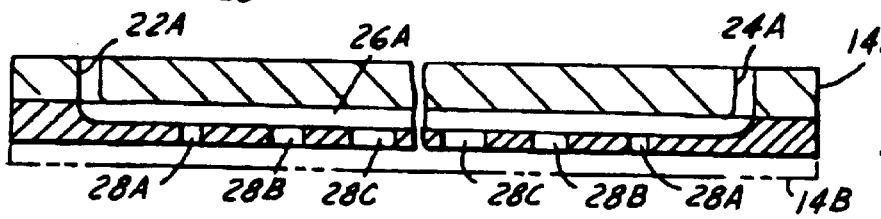
FIG.8
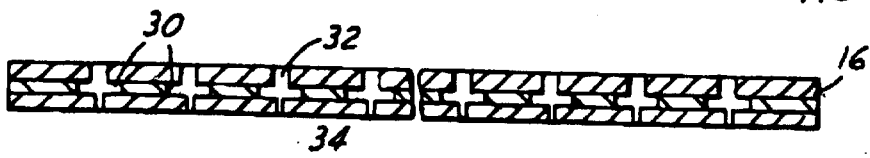
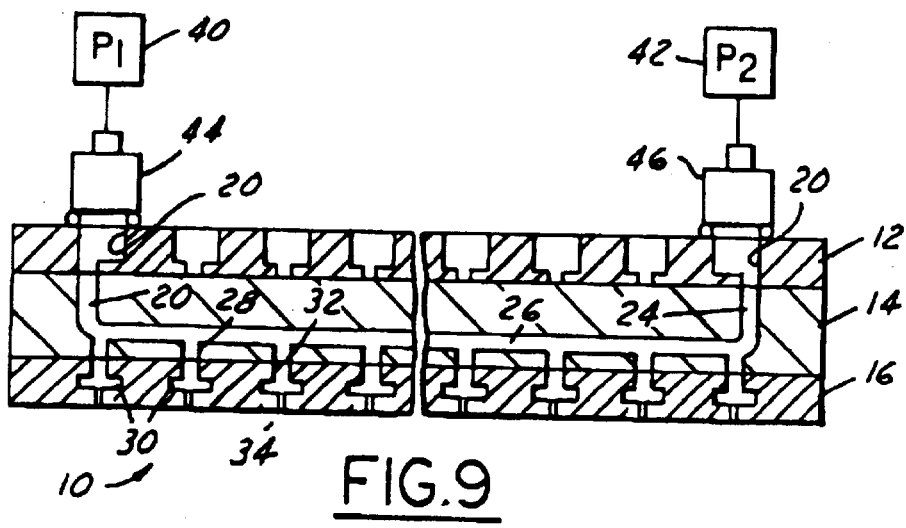
FIG.9
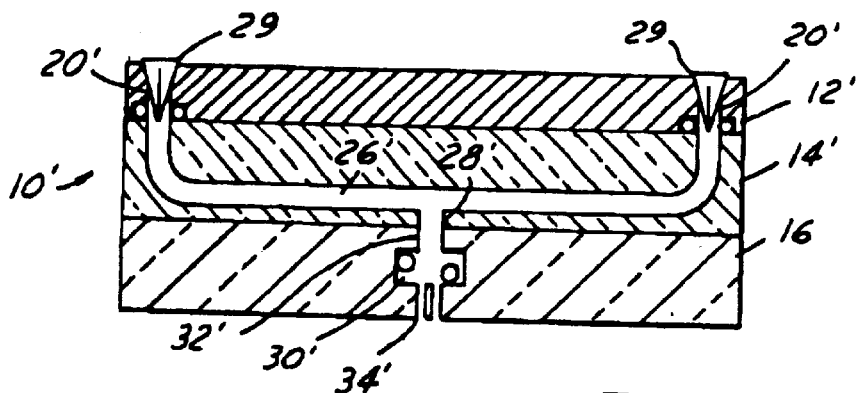
FIG.10

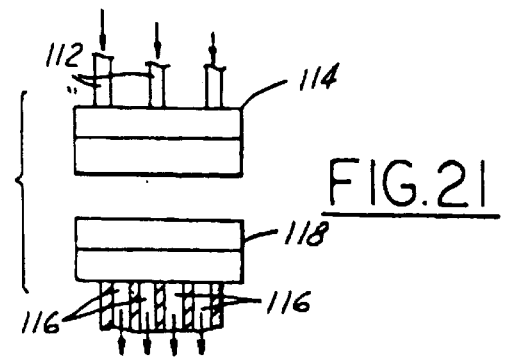
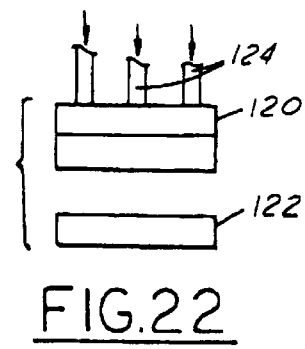
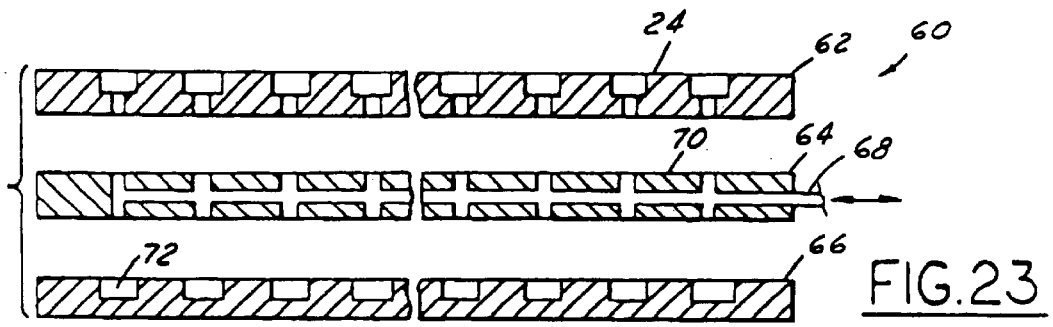
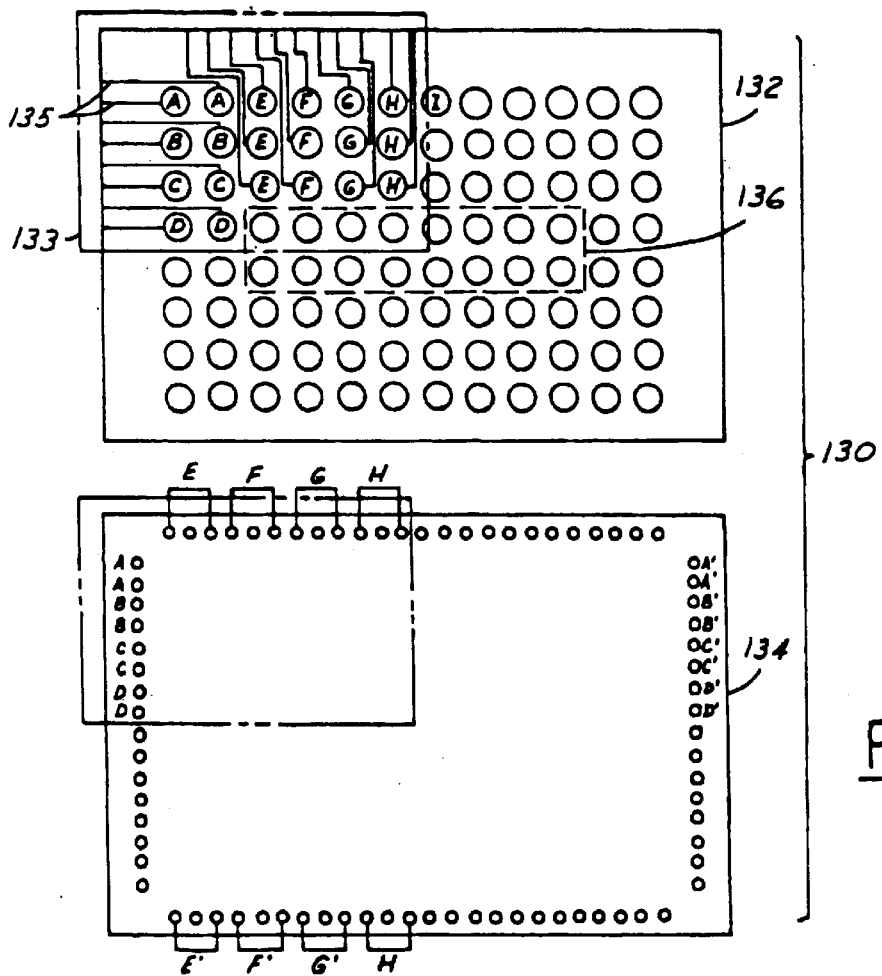

| No. | Well Options | | Reservoir Options | | | | | Pumping Options | |
|---|---|---|---|---|---|---|---|---|---|
| | Number | Pitch (mm) | Number | Pitch | Rows | Cols | Rows + Cols | Single sided | Double sided |
| 1 | 96 | 2.25 | 24 | 4.5 | 8 | 12 | 20 | x | |
| 1 | 384 | 2.25 | 24 | 9 | 16 | | 16 | | |
| 2 | 384 | 2.25 | 24 | 9 | | 24 | 24 | x | |
| 3 | 384 | 2.25 | 96 | 4.5 | 16 | | 16 | x | |
| 4 | 384 | 2.25 | 96 | 4.5 | | 24 | 24 | x | |
| 5 | 384 | 2.25 | 96 | 4.5 | 16 | 24 | 40 | x | x |
| 6 | 384 | 2.25 | 96 | 4.5 | 32 | | 32 | x | x |
| 7 | 384 | 2.25 | 96 | 4.5 | | 48 | 48 | x | x |
| 8 | 384 | 2.25 | 96 | 4.5 | 32 | 48 | 80 | x | x |
| 1 | 1536 | 2.25 | 96 | 9 | 32 | | 32 | x | |
| 2 | 1536 | 2.25 | 96 | 9 | | 48 | 48 | x | x |
| 3 | 1536 | 2.25 | 96 | 9 | 32 | 48 | 80 | x | |
| 4 | 1536 | 2.25 | 96 | 9 | | | 64 | x | |
| 5 | 1536 | 2.25 | 96 | 9 | 64 | 96 | 96 | x | |
| 6 | 1536 | 2.25 | 384 | 4.5 | 32 | | 32 | x | x |
| 7 | 1536 | 2.25 | 384 | 4.5 | | 48 | 48 | x | x |
| 8 | 1536 | 2.25 | 384 | 4.5 | 32 | 48 | 80 | x | x |
| 9 | 1536 | 2.25 | 384 | 4.5 | 64 | 96 | 64 | x | x |
| 10 | 1536 | 2.25 | 384 | 4.5 | 64 | 96 | 96 | x | x |
| 11 | 1536 | 2.25 | 384 | 4.5 | 64 | | 160 | x | x |
| 12 | 1536 | 2.25 | 384 | 4.5 | 128 | | 128 | x | x |
| 13 | 1536 | 2.25 | 384 | 4.5 | | 192 | 192 | x | x |

FIG. 24B

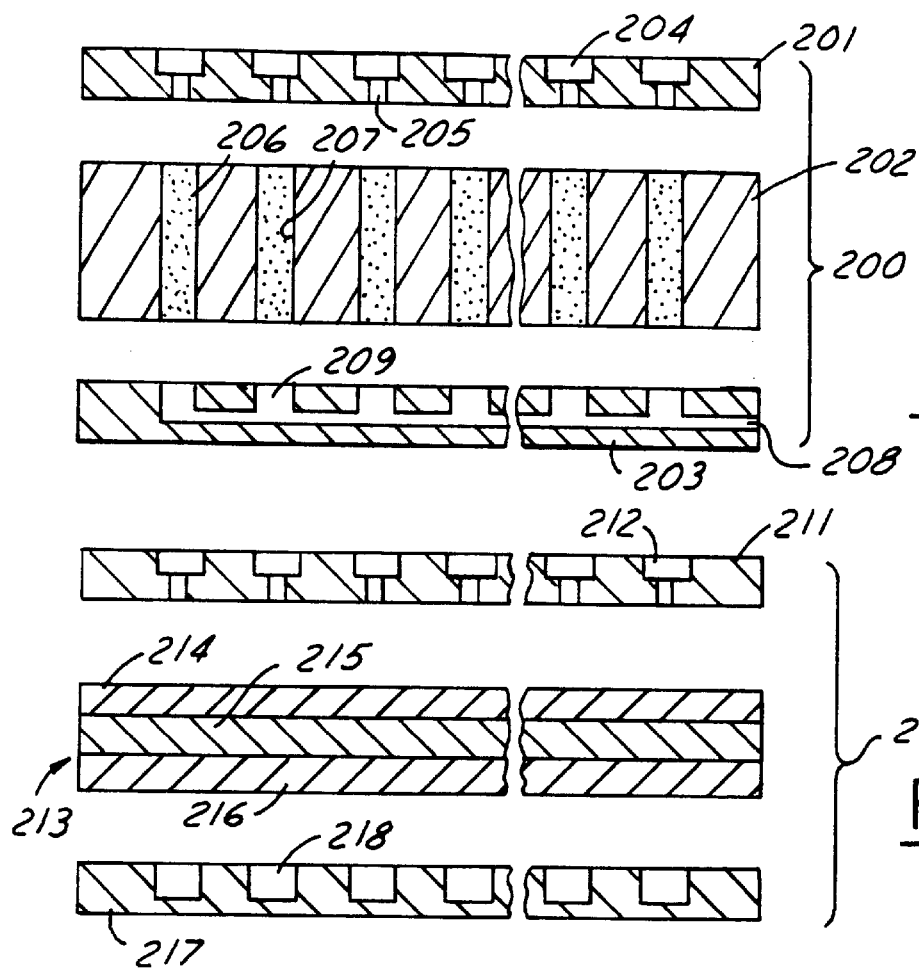
FIG.30
FIG.31
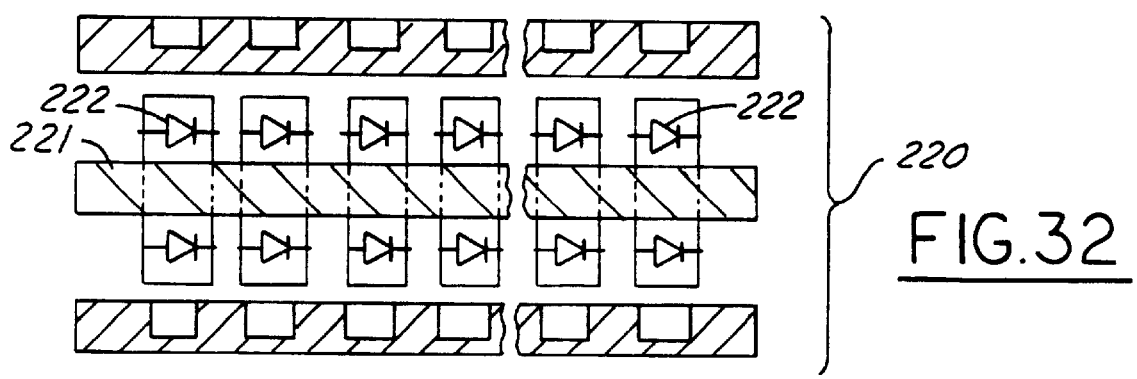
FIG.32

MULTIPLE FLUID SAMPLE PROCESSOR AND SYSTEM

CROSS-REFERENCE TO RELATED APPLICATIONS

This application relates to the subject material simultaneously filed U.S. patent application Ser. No. 09/321,170, entitled "Genetic Assay System", the disclosure of which is hereby incorporated by reference herein.

TECHNICAL FIELD

The present invention relates to methods, systems and apparatuses for accomplishing combinatorial processes, including synthesis screening and chemical diagnostic assays. More particularly, the invention relates to a system and method that utilizes a relatively small multiple fluid sample processor with detachable layers.

BACKGROUND OF THE INVENTION

Traditional methods in the field of chemical and biological processes, are often slow and tedious. These include combinatorial chemistry, high-throughput screening assays and genomic synthesis for making, screening and/or testing potential new compounds and materials. In the pharmaceutical industry, for example, combinatorial chemistry for making series of compounds for testing potential new drug candidates are often complex, time-consuming and expensive. One of the underlying reasons in combinatorial chemistry is that each member of a series, or each potential drug compound, must be created and tested individually.

Traditionally, experiments are conducted by manually injecting reagent fluids or other agents into a multitude of vials or reaction tubes. Each vial is filled manually by a laboratory technician or by a robot processor. The solutions within each vial or reaction tube may differ only slightly from an enjoining vial so that permutations of the solution are investigated simultaneously. Often, receptors with fluorescent tags or other mechanisms for identifying each of the new compounds are included in the vial or reaction tube. This allows better identity of the compound and also allows computerization of the results.

Recently, the process has been improved with the introduction of robotics which automate the process of depositing materials into the multitude of vials and reaction tubes. However, the process continues to face problems in the area of cost and space requirements. With thousands of compounds being tested and in some cases incubated over long periods of time, the process requires a large quantity of space to house the multitude of trays of vials or reaction tubes. These apparatuses are currently large and cumbersome to handle. Furthermore, the process generally consumes a large quantity of reagents for testing thousands of compounds. The reagents and other materials used in the process are often expensive and difficult to obtain.

To reduce the cost and increase the efficiency of the system and processes, smaller reaction synthesizers have been utilized. These use smaller quantities of reagents. However, proper control and an effective delivery system are necessary for regulating and distributing the minute amounts of reagents to the reaction cells.

One apparatus for multiple simultaneous synthesis is shown, for example, in U.S. Pat. No. 5,324,483. A smaller device using microchannels which addresses some of the problems of size and cost, is shown, for example, in U.S. Pat. No. 5,603,351.

A need exists in the art for faster, more efficient and less costing multiple fluid sample processors, systems and methods for accomplishing the process of combinatorial chemistry, as well as other chemical and biological processes. A need also exists for automating the fluid sample processing and diagnostic processes, including use of robotic mechanisms and systems.

SUMMARY OF THE INVENTION

It is an object of the present invention to provide a new and improved multiple fluid sample processor, system and method, particularly for use in combinatorial chemistry, but also for use in any synthesis, catalyst discovery, process development, screening or diagnostic applications. It is another object of the present invention to create a relatively small device which can carry out hundreds and even thousands of chemical experiments simultaneously, create new compounds, and assess their impact on chemical or biological systems.

It is another object of the present invention to provide a liquid handling drug discovery and diagnostic tool which increases the speed and productivity of discovering new drug candidates and does so on a miniaturized scale or platform that reduces cost and manual handling. It is a further object of the present invention to provide a multiple fluid sample processor, system and method which is capable of conveying, transporting, and/or processing samples in a large multiplicity of sites without exposure to the atmosphere.

Other objects, purposes and advantages of the present invention will become apparent in the following description of the invention, particularly when viewed in accordance with the attached drawings and appended claims.

In accordance with the present invention, a multiple fluid sample processor, system and method are provided which utilizes a multi-layered fluidic array having microtiter scale reservoirs, connecting microchannels and sub-microtiter reaction or assay wells. A three-dimensional architecture of microchannels and nano-reaction vessels are constructed in one or more of the layers. The array incorporates a modular configuration with several distinct layers or plates. The device array can include an upper reservoir layer (or top feedthrough plate), a center distribution layer or plate, and a lower or bottom well (or reactor) layer or plate. Additional plates and layers could be utilized as needed or desired. The plates are stacked vertically and either permanently bonded or coupled together, preferably forming liquid-tight seals.

The upper reservoir layer provides feed-through channels and also serves as a cover for the device array. It contains apertures selectively positioned and connected to inlets located in the center distribution plate or layer. The apertures provide openings to fill the reservoirs with a plurality of reagents or other materials. The center distribution layer comprises a plurality of micro-sized reservoirs, channels, reservoir feeds, cell feeds, and overflow feeds, reset manifolds, and back-flow valves which are selectively formed in one or more bonded layers on the center distribution plate. The channels and reservoirs form a delivery system where reservoirs are grouped preferably into columns and rows. The reservoir layer and distribution layers can each comprise two or more plates or layers connected together in order to form and provide the requisite channels, reservoirs, and the like.

A detachable bottom layer or plate includes a plurality of submicrotiter reaction wells with a plurality of drain feeds. Once the proper agents or the materials are introduced into the reaction wells, the bottom plate may be processed while assembled, or can be decoupled from the display array and removed for incubation or analysis.

Pressurized fluid delivery mechanisms are utilized to distribute the reagents, solvents and other fluids to the array of channels and to fill the appropriate reservoirs. Micro-sized valves, such as capillary forming structures, are provided to allow orderly and efficient delivery and transport of fluid materials through the device. Various exhaust, capture and collection mechanisms and systems are provided for the materials once they are processed.

BRIEF DESCRIPTION OF THE DRAWINGS

The teachings of the present invention can be readily understood by considering the following detailed description in connection with accompanying drawings, in which:

FIG. 6 is a cross-sectional view of the top feed-through (reservoir) layer of a processor in accordance with the present invention, the cross-section being taken along line 6—6 in FIG. 2 and in the direction of the arrows;

FIG. 7 is a cross-sectional view of the central distribution layer of a multiple fluid sample processor in accordance with the present invention, the cross-section being taken along line 7—7 in FIG. 2 and in the direction of the arrows;

FIG. 7A illustrates alternate embodiments of central distribution layers for use with the present invention;

FIG. 8 is a cross-sectional view of the bottom well-plate of a multiple fluid sample processor in accordance with the present invention, the cross-section being taken along line 8—8 in FIG. 2 and in the direction of the arrows;

FIG. 9 illustrates use of a pressure system in accordance with the present invention;

FIGS. 10–18 depicts use of pressure and/or vacuum systems in a chemical synthesis process;

FIGS. 21 and 22 illustrate two embodiments of fluid connectors that can be used with the present invention;

FIG. 23 illustrates another embodiment of the present invention which utilizes in-plane delivery;

FIGS. 24, 24A, 24B, and 24C illustrate representative fluidic transportation sequences and/or procedures in accordance with embodiments of the present invention;

FIG. 30 illustrates an embodiment of the invention utilizing an absorbent material layer;

FIG. 31 schematically illustrates a five-layer processor in accordance with the present invention;

FIG. 32 illustrates an embodiment of the present invention which utilizes a primarily non-fluidic layer;

DESCRIPTION OF THE PREFERRED EMBODIMENT

The drawings generally depict use of the present inventive processor, system and method adapted for performing processes and procedures concerning combinatorial chemistry. As a result, the Figures will be described with reference to that technical field. However, it is to be understood that the present invention has many varied uses. The inventive processor, system and method can be applied to a variety of chemical and biological processes other than combinatorial chemistry, such as high-throughput screening of assays and DNA synthesis and genetic analysis. In particular, the present invention has numerous applications in the fields of drug discovery, catalyst discovery, process development, DNA synthesis and genetic analysis, basic biomedical research, basic chemistry research, clinical diagnostics (particularly in immunology, micro-biology and oncology), and environmental, military and agricultural uses, such as on-site DNA fingerprinting, food processing testing, and biological hazard identification.

The present invention can be used particularly in the industrialization of discovery processes for pharmaceutical, agricultural, or biotechnology programs. The present invention increases speed and productivity while providing researchers with expanded capabilities and quality assurance. The invention provides substantial time and efficiency advantages over prior techniques. The invention provides miniaturized liquid handling systems which perform the biological, chemical and the analytical processes fundamental to life sciences research and development. The invention can be utilized to perform thousands of reactions simultaneously in an integrated format, which substantially reduces the time, effort and expense required while improving the quality of the test results.

The processor in accordance with the present invention generally incorporates a modular configuration with distinct layers or plates. The processor is capable of conducting parallel synthesis of thousands of small molecule compounds through the precise delivery of reagents to discrete reaction sites. This helps create a significantly larger number and variety of small molecules more effectively and with fewer resources.

With the present invention, arrays of DNA can be synthesized on demand. The processor can also be used for high volume of sample processing and testing, as well as the search for new molecular targets and determining expression levels and response to known drugs. The processor can incorporate multiple assay formats, such as, but not limited to, receptor binding, antibody-antigen interactions, DNA/RNA amplification and detection, as well as magnetic bead based separations. The versatility of the processor and its architecture make it available for use with synthesis work stations, genomic support stations, and analytical preparation systems.

Figure 1:
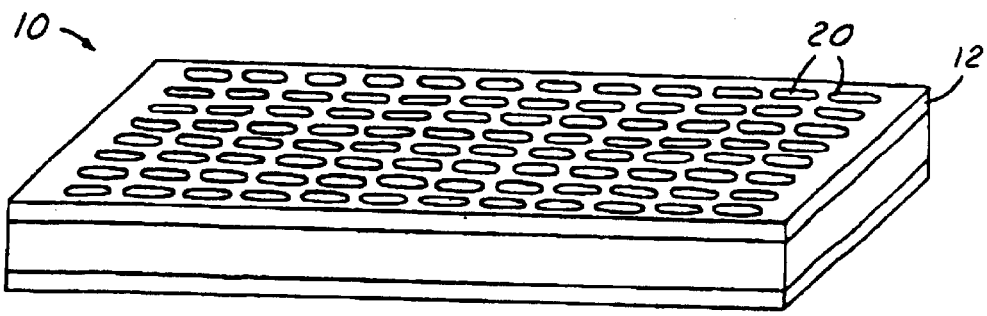
FIG. 1 illustrates a multiple fluid sample processor in accordance with the present invention.
Figure 2:
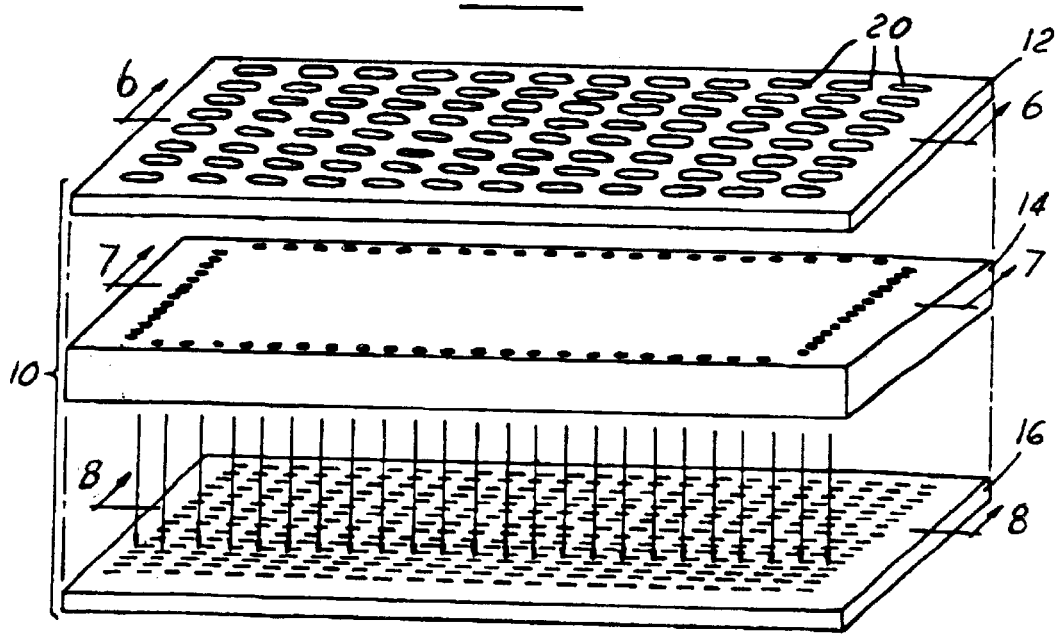
FIG. 2 is an exploded view of the processor shown in FIG. 1.

A basic multiple fluid sample processor in accordance with the present invention is shown in FIGS. 1 and 2, with cross-sections of the layers being shown in FIGS. 6, 7 and 8. The processor, which is generally referred to by the reference numeral 10, is a three-layered structure in the embodiment illustrated. The processor 10 is also called a fluid array layered device (FALD), or a fluidic array.

The processor 10 includes a top plate or layer, which is also called a reagent reservoir 12. The processor 10 also includes a middle plate or layer 14 (also called a fluidic delivery or distribution layer), as well as one or more bottom layers or well plates 16.

The top layer 12 is also called a feed-through plate and serves as a macro fluidic interface for the processor. The layer 12 contains a number of apertures 20 which are selectively positioned immediately above channels 22 in the middle or fluidic layer 14 and in communication with fluidic inlets in layer 14. The apertures 20 are preferably sized to industry standards (i.e. 2.25, 4.5 and 9 mm pitch). A series of micro-sized channels formed or positioned in the middle or bottom surface of the top layer or plate 12 convey the materials (e.g. liquids) from the apertures 20 to positions above selected openings 22 and/or 24 in the middle layer. The openings 22 and 24 are connected in the middle layer 14 by an elongated microchannel 26 which in turn has a plurality of small passage channels 28. The microchannel 26 can be formed in the middle of layer 14 by standard techniques, such as laser drilling, or formed on the surfaces of two sub-plates or layers which are bonded together to form layer 14.

The lower well plate 16 has a plurality of wells 30 which are used to hold the reagents, solid supports, particles, and/or other materials in order for them to react to create products. Each of the reaction wells 30 has one or more entrance channels 32 and one or more exhaust or drain channels 34. The well members 30 can be formed with standard techniques in a single piece of material, or can be formed in the intersection of two, three, or more thin plates which are bonded or fused together.

The three plates or layers 12, 14 and 16 are releasably stacked or permanently bonded together to form a modular configuration. If releasably stacked, they are coupled together tightly to form a liquid-tight seal, preferably with gaskets or sealing means, as described in more detail below. If desired, the top layer 12 can be bounded or fused to the center distribution plate or layer 14. The bottom or well plate layer 16, however, is preferably detachably coupled to layer 14 or a combination of layers 12 and 14, although layer 16 could also be permanently bonded to them.

The plates 12, 14 and 16 can be made from any desirable material, such as glass, Pyrex, fused silica, quartz, metals, ceramics, plastics, polymers, silicon wafer materials, or the like. The micro-sized reservoirs, channels and reaction cells can be controllably etched or otherwise formed onto the plates, for example, using semiconductor fabrication techniques with a suitable chemical or laser etchant. The channels can also be formed by micromolding techniques in some materials.

The top plate 12 contains apertures connected by microchannels to openings 22, 24, located in the central plate. These apertures provide the necessary openings for liquid handling robots to fill the reservoirs with a plurality of reagents or other materials.

A pressure pumping mechanism, such as that shown in FIG. 9, is preferably used to assist in loading and distributing the reagents and other materials within the layers. The pressure system can also be used to assist in draining and evacuation of excess reagents and wash solvents frolic the channels and wells, although a vacuum system could be utilized for the same purpose. As shown in FIG. 9, pumping mechanisms 40 and 42, which can be of any conventional type, are used to pressurize the fluid sample processor. One or both of the pressure members 40 and 42 transmit pressurized air or inert gases to pressure members 44 and 46 which are adapted to be positioned directly on the processor 10. Either single-sided or double-sided pressure pumping can be utilized. After the reagents or other materials are passed through apertures 20 in the uppermost layer 12 (usually by capillary forces), the pressure mechanisms 44 and/or 46 are pressurized slightly and sufficiently in order to distribute the materials evenly along channel 26 in middle layer 14. A slightly greater pressure amplitude or duration enables fluid flow from the channels into each of the reaction cells or wells 30. The pressure exerted by the pressure members 44 and 46 conveys the liquid through the small passageways or microvalves 28 and 32 until the materials reside in the larger reaction wells. The microvalves can be capillary forming structures which form capillary barriers and prevent further movement of liquid materials.

The sizing of the microvalves 28, 32 can be optimized to balance fluid resistances over a set of wells in order to deliver equal volumes of liquids to each well. A shorter pulse duration or lower amplitude of pressure from the pressure pumping mechanism provides a means to partially fill the wells so that limited quantities or additional reagents may be added. Other means for partially filling the wells can include posts or pins positioned in the wells in order to wick the fluids drop-by-drop from the channels into the wells, as discussed in more detail below.

Subsequently, when it is desired to empty or exhaust the materials from the reaction wells 30, pressure is increased in the pressure members 44 and 46 from the pressure sources 40 and 42 sufficiently to exhaust the materials from the reaction wells. For this purpose, a plurality of collection or drain containers can be positioned immediately below the processor 10 during its use. The drain container can be removably attached to the well plate 16 if desired. Alternately, the wells may be partially or fully emptied by applying a vacuum along the lower layer, or by an electrostatic spraying system as described below. The wells can also be emptied by wicking with posts or pins positioned in the collection cavities.

The microchannells, passageways, and other openings are generally circular in cross-section although they can have a variety of geometric cross-sectional shapes depending in part on the method of manufacture. The cross-sectional dimensions are in the range of approximately 5–1000 microns ($\mu$m) and preferably 50–500 microns ($\mu$m). The microvalves are also generally circular in cross-section, but again can have different cross-sections depending on the method of manufacture and the desired degree of fluid transmission and prevention. The microvalves typically have cross-sectional dimensions in the range from approximately 5–300 microns and preferably in the range from 10–150 microns. The wells and reservoirs can vary more widely in size and shape and can range in size from approximately 5–20,000 microns in width (preferably 500–12,000 microns) and from approximately 0–10,000 microns in height or depth (preferably 0–6,000 microns).

FIGS. 10–18 schematically illustrate the use of a pressure pumping system (or an alternate vacuum system) for fluid delivery and pressure control through a synthesis process. In these drawings, the microfluidic chip member 10' has a reservoir layer schematically depicted by reference number 12', a middle or distribution layer 14' and a well plate layer 16'. The top layer 12' has a pair of openings 20' which are connected via microchannels to a row or column channel 26' in the middle layer 14'. The channel 26' is in fluid communication with reaction well 30' through channels 28' and 32'. One or more microbeads 31 may be positioned in the reaction well 30' for solid phase chemistry applications. Sealing members, such as O-rings 27 or gasket sheeting are used to seal the interface between the layers 12' and 14'.

Figure 11:
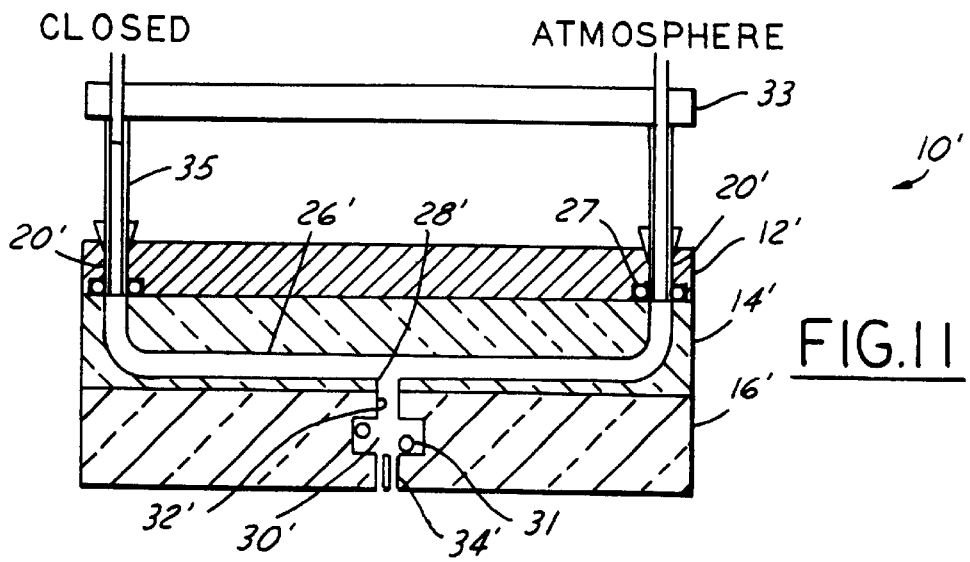
Figure 12:
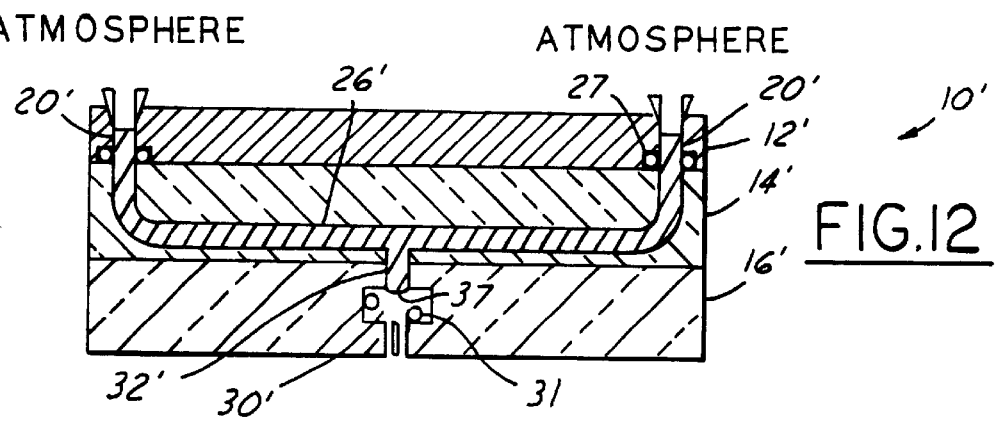

Initially, the openings 20' are sealed with sealing members 29. The sealing members have self-sealing openings which allow the entry of probes or pipettes in order to allow materials to be introduced into the chip member 10'. As shown in FIG. 11, a liquid distribution member 33 is positioned on the chip member 10' and probes 35 are used to insert a liquid, such as a reagent, into openings 20'. Then, by capillary forces or low pressure pumping, the reagent fills the row or column channel 26', as shown in FIG. 12. If the fluid levels in the two reservoirs do not equalize, then differential pressures may be applied to equalize fluid deliveries. A capillary forming structure (also called a microvalve) 37 is fabricated in channel 32' at the entrance to the reaction well 30'. As stated above, the reservoir and distribution layers can be formed from two or more separate plate members with the micro-sized channels, reservoirs, and the like formed on the mating surfaces.

The pressures utilized with the present invention range from 0 to 20 psi in amplitude and have a pulse duration from 1 to 500 milliseconds. Preferably, the amplitude is 3–6 psi and the duration is 15–150 ms. A typical low pressure pulse is 1 psi for 15 ms. A typical high pressure pulse is 6 psi for 150 ms.

Although the pressure pumping system preferably uses double sided pumping as shown, it is to be understood that a single sided pressure pumping system and procedure could be utilized as an alternate embodiment. Alternatively, the microchannels and wells can be filled and/or emptied by a vacuum suction system. It is preferred that all openings 28' in the middle distribution 16' be filled simultaneously and have approximately the same amount of fluid trapped in them by a capillary barrier. Preferably, volumes differing less than 3:1 are desired. Also, it is preferred that the well members 30 be filled at the same time and with approximately the same amounts of material. The simultaneous and equivalent volume filling can be assured by various factors, such as pressure balancing, timing of processing steps, adjusting and varying the diameter and lengths of the microchannels, varying the sizes of the openings, etc.

Figure 13:
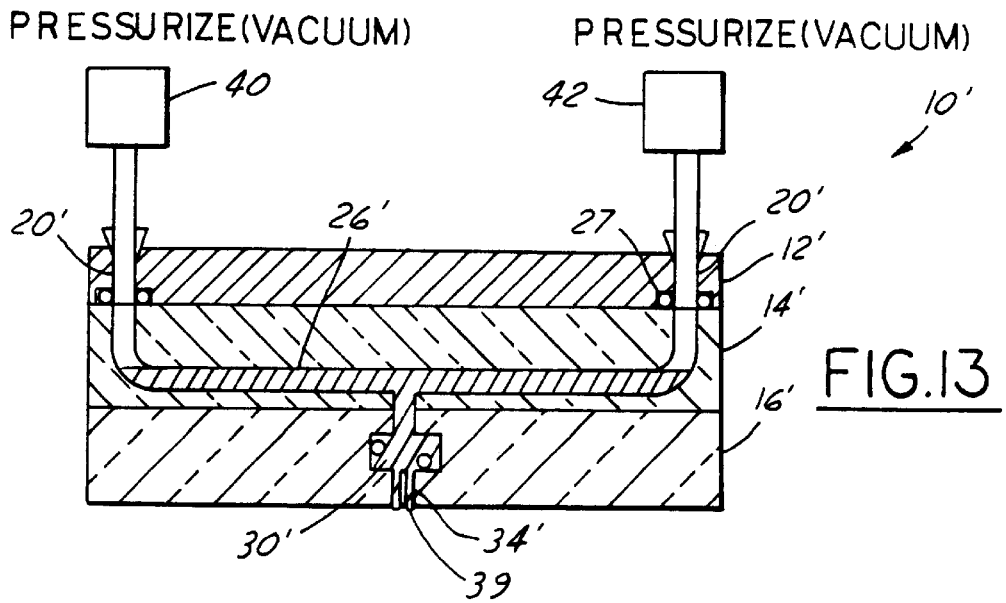
Figure 14:
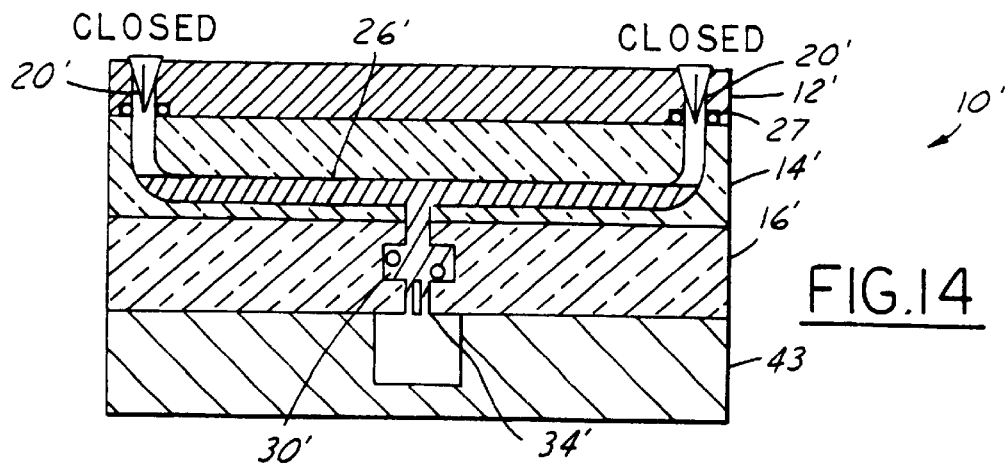
Figure 15:
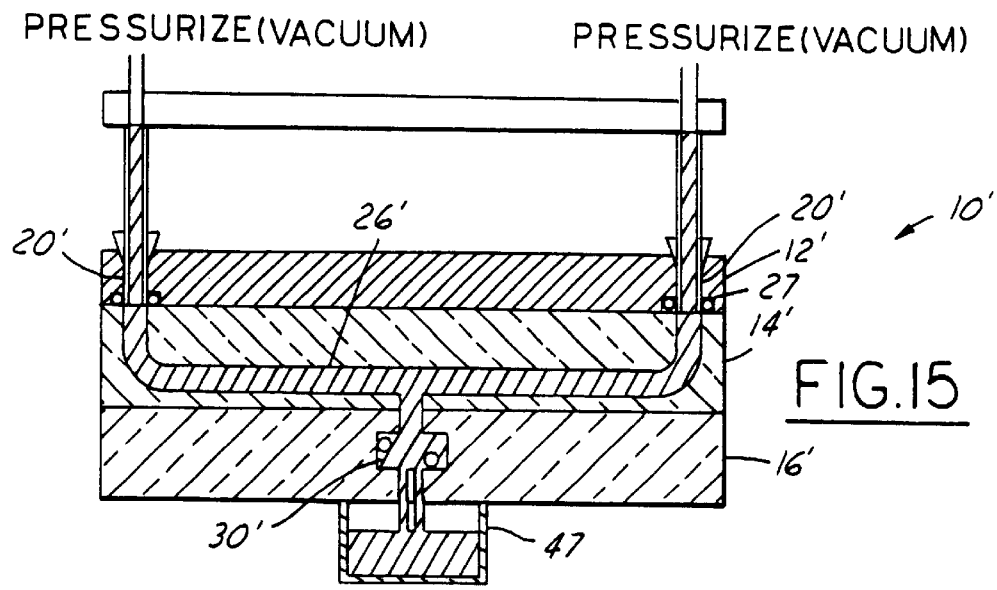
Figure 16:
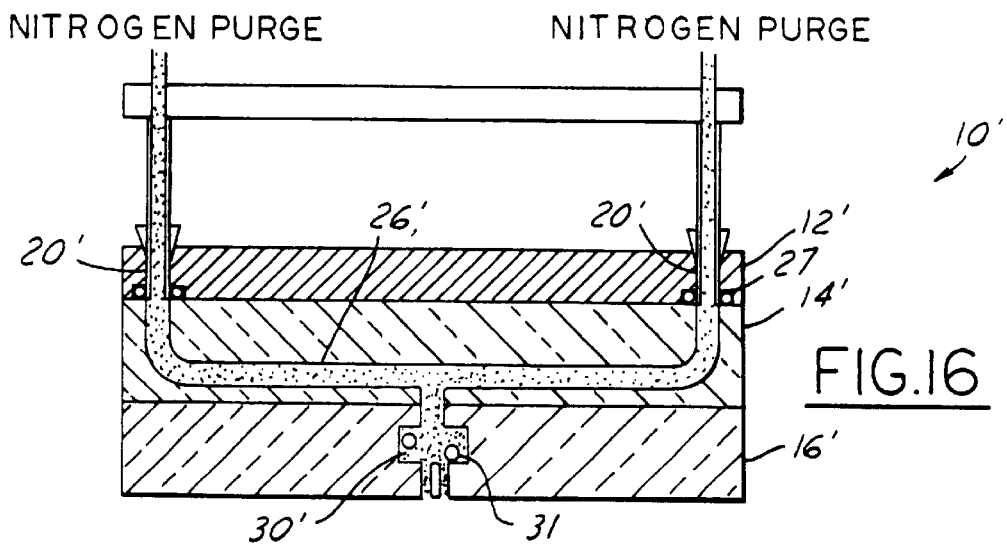

When high or low pressures (or vacuum in an alternate embodiment) are applied to both openings 20', as shown in FIG. 13, the capillary surface tension is ruptured (i.e., the microvalve is released) and the liquid is allowed to flow into and fill well 30'. An equal or differential pressure pulse from pressure members 40 and 42 is provided at each opening 20'. A second smaller capillary valve 39 is formed at the outlet 34' to the well 30'. Thereafter, the material in the well 30' is heated or cooled by temperature control member 43, as shown in FIG. 14, as part of the synthesis process. A subsequent well rinsing step is then carried out as shown in FIG. 15. In solid phase synthesis, washing fluid is then delivered to openings 20' and pressure is applied to the chip member 10' through the microchannels. This results in waste materials being exhausted from the chip member 10' into waste container 47 or common drain channels. In order to dry out and purge the chip member, a gas under pressure, such as Nitrogen gas, is pressure pumped through the member 10'. This is shown schematically in FIG. 16. Alternatively, wash solvents or excess reagents may be removed using other conventional synthesis procedures.

As to the temperature control, temperatures in the range of −40° to +200° C. can be achieved utilizing external resistive temperature devices (RTD) or piezoelectric devices in combination with active or passive cooling.

Figure 17:
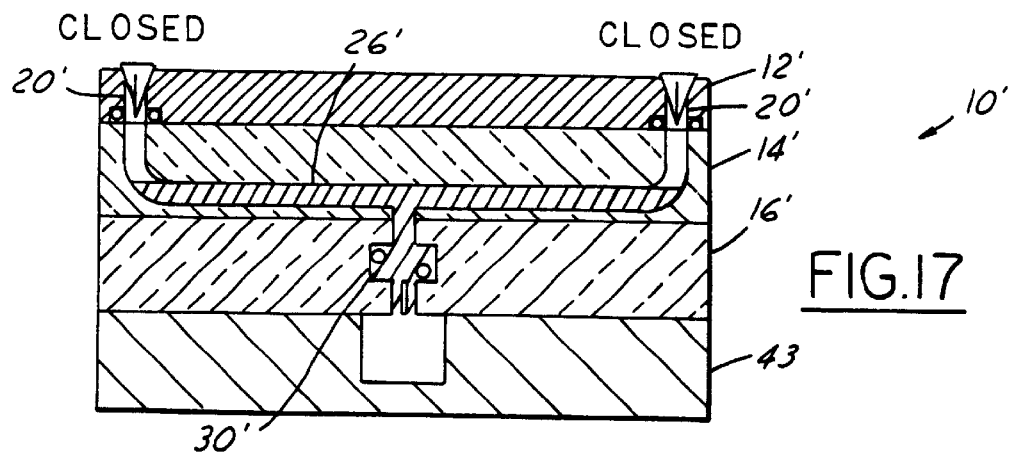
Figure 18:
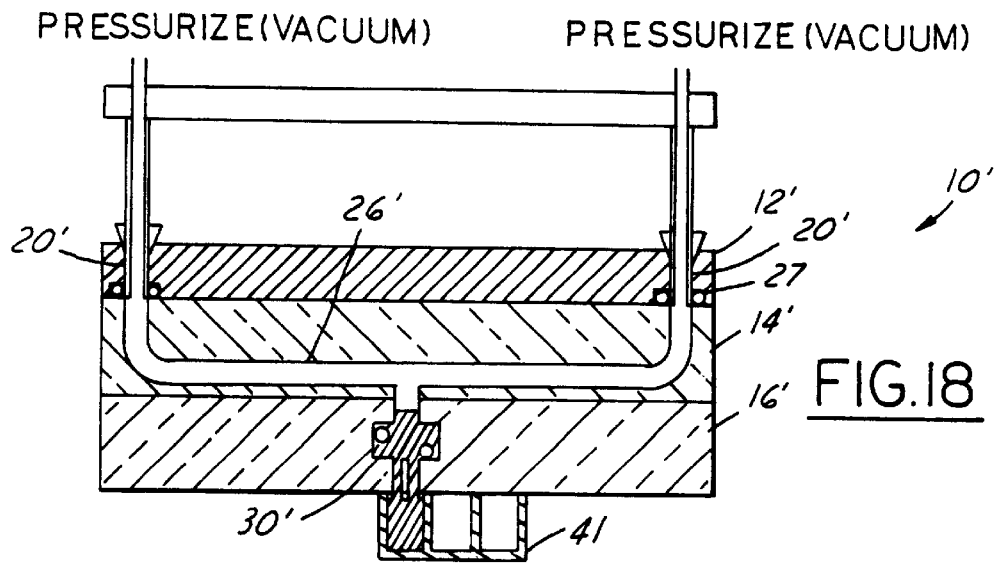

Thereafter, the chip member 10' is subjected to similar repeated processing steps, as shown schematically in FIG. 17, until the chemical synthesis process is completed. The final products in each of the wells are then removed from the member 10' by being independently ejected into arrays of wells in a product layer (a/k/a "mother") plate 41 where they are available for analysis or biological assays. Prior to transfer of products to the product layer, the final reaction solutions may be concentrated by circulating gas with or without heating. Redissolving the products in solvents amenable to analysis or testing (i.e. DMSO or N, N-dimethylsulfoxide) can be achieved by delivery along reservoirs 20 and channels 26.

Figure 45A:
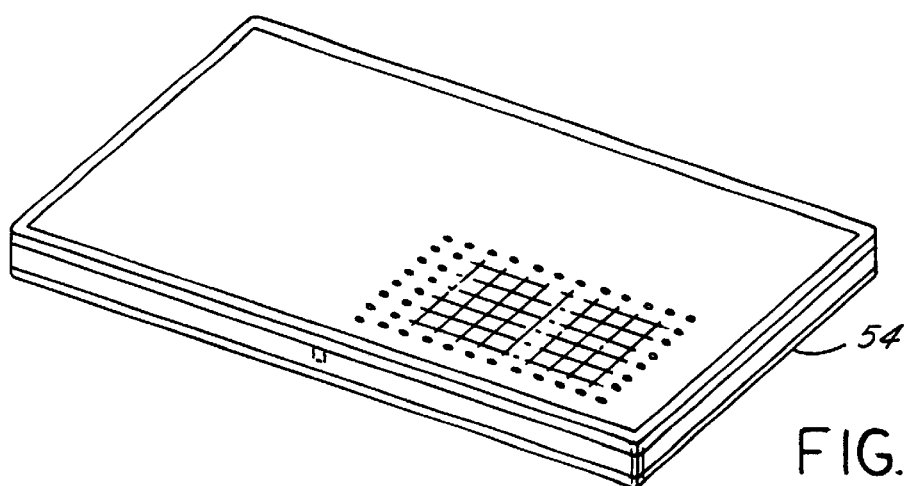
FIGS. 45A, 45B, and 45C illustrate three multiple fluid sample processors in accordance with the present invention.
Figure 45B:
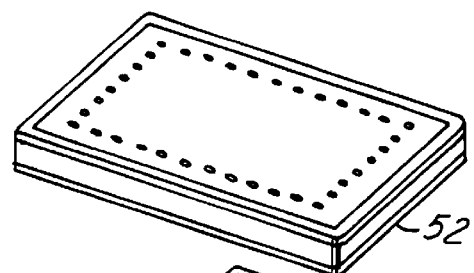
Figure 45C:
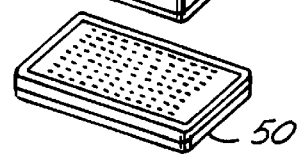

The particular well plate 16 shown in FIGS. 1 and 2 is a 384-well sample plate. Standard well plates are typically provided in multiples of 24 or 96, with a 96-well sample plate being commonly used. Larger multiples of 96 can also be utilized. For example, as shown in FIG. 45A, 45B and 45C, a 96 well processor 50 is shown in FIG. 45C, a 384 well processor 52 is shown in FIG. 45B and a 1,536-well sample processor 54 is shown in FIG. 45A. With the present invention, the densities of the wells are several times greater than traditional 96-well plates.

A typical need is for one of the sample plates to have each sample conveyed, transported and/or processed while eventually being delivered into the well plate. During this time, the samples are typically exposed to the atmosphere and can oxidize, evaporate or cross-contaminate to an undesirable extent. With the present invention, however, the multi-layered sample processor with detachable well plates inhibits cross-contamination of the fluids or reactor contents used in the processes, both chemical and biological.

The detachable layers in accordance with the present invention are preferably of a common external dimensionality for ease of being handled by robotic or other automation means. A common set of dimensions has been adopted by many manufacturers which match that of the 96-well plate known as a "microtiter" plate, or the 384-well plate.

Preferably, the plates 12, 14 and 16 are connected to each other by an indexing means of alignment and cassette fixturing, such as detents, flanges, locating pins, etc., so they are closely aligned in the horizontal and vertical directions. A variety of means and mechanisms for aligning the multiple layers can be utilized, including stacking against a flat surface, molded or applied markings, recessed or protruding rods, mating hemispherical members or other geometric indices. While engaged in such manner, samples from one of the plates can be caused to be moved and transported to another plate. Means for transporting or moving the samples from one of the plates to the other can be by pumping, draining, vacuum or capillary action. While the samples are engaged, and as a result of the transport of the samples from one layer to the other, the samples may be processed, reacted, separated, or otherwise modified by chemical or physical means, and then analyzed by optical, electrochemical, chemical, or other means.

Figure 20:
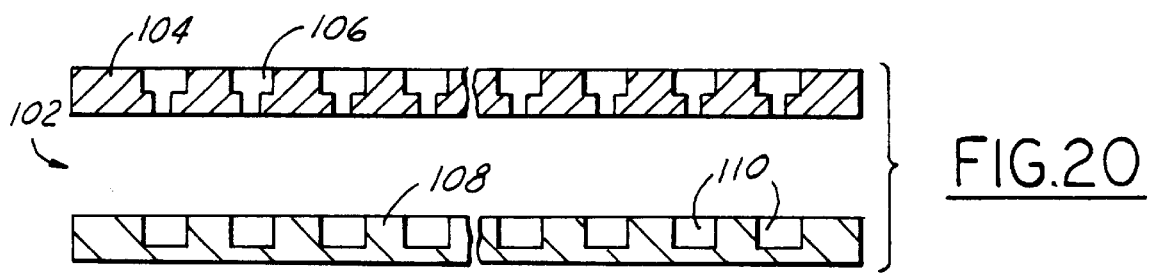
FIG. 20 illustrates another embodiment of a multiple fluid sample processor in accordance with the present invention.
Figure 26:
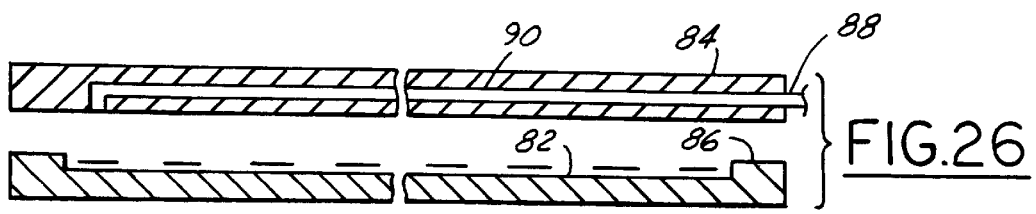
FIG. 26 illustrates a single well edged head multi-reaction processor in accordance with the present invention.

Samples or fluids can be delivered to the processor by being contained in one of the members of physically engaging sample multi-well plates, such as a top layer 12, or other means of sample introduction can be utilized, such as through the edges of such layer, or the inlets on top of layer 14. In this regard, an edge loading processor is shown in FIGS. 23 and 26. In FIG. 23, the processor 60 has a top layer 62, a middle layer 64, and a bottom layer 66. Reagents and other fluids are introduced into this central layer 64 through an edge tube 68. The fluids introduced through tube 68 are conveyed along microchannel 70 where they are deposited into reaction wells 72 contained in the bottom plate 66. A series of openings 74 are provided in the top plate 62 for addition and entry of other reagents and fluids to the process. The reaction wells contained in the bottom plate member can be merely containment vessels, as shown in FIGS. 20 and 23, or they can have one or more drain/exhaust openings, as shown in FIGS. 8 and 9. If closed wells 72 are provided, then bottom plate member 66 will be disconnected from the other layers for analysis or further processing of the materials in the wells. It is also possible for closed wells to be formed by attaching or bonding a flat solid plate member to a plate member with through-holes therein.

In FIG. 26, a processor 80 with a single reaction well 82 is provided. The processor 80 contains an upper plate 84 and a lower plate 86. A microchannel tubular member 88 is provided on the edge of layer 84 in order to introduce reagents and other fluids into channel 90.

Figure 3:
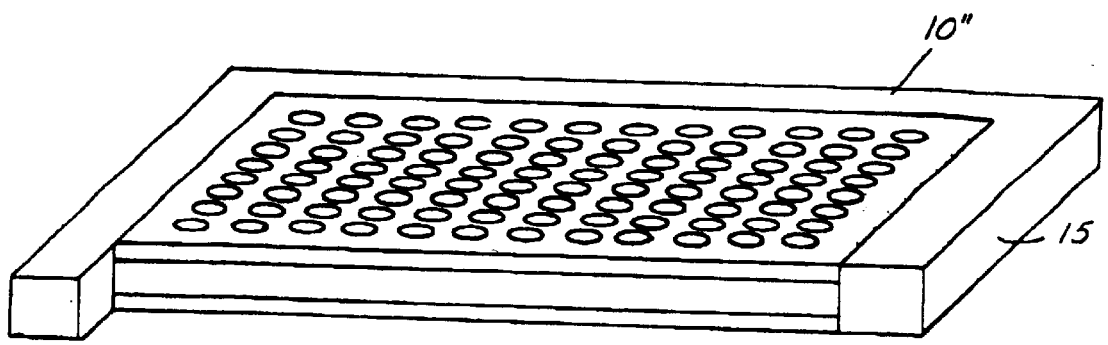
FIG. 3 depicts a processor within a frame member.
Figure 4:
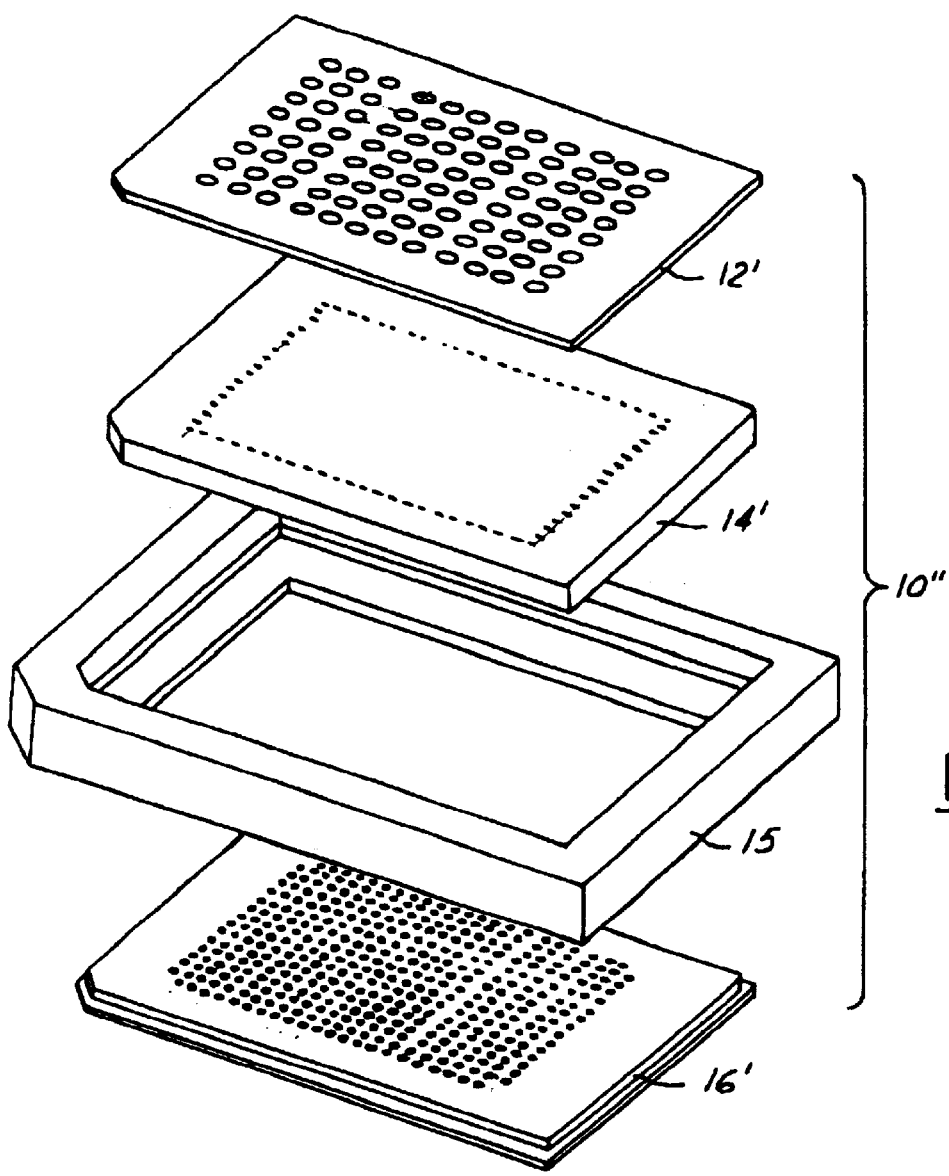
FIG. 4 is an exploded view of the processor shown in FIG. 3.

For ease of handling, it is often desirable to utilize a frame or other structural member attached to the processor. As shown in FIGS. 3 and 4, a three-layer processor 10" is provided attached to an outer frame member 15. The frame member 15 allows for uniform alignment and sealing, as well as for ease of handling, of the processor 10" by robotic or other automation mechanisms.

Figure 5:
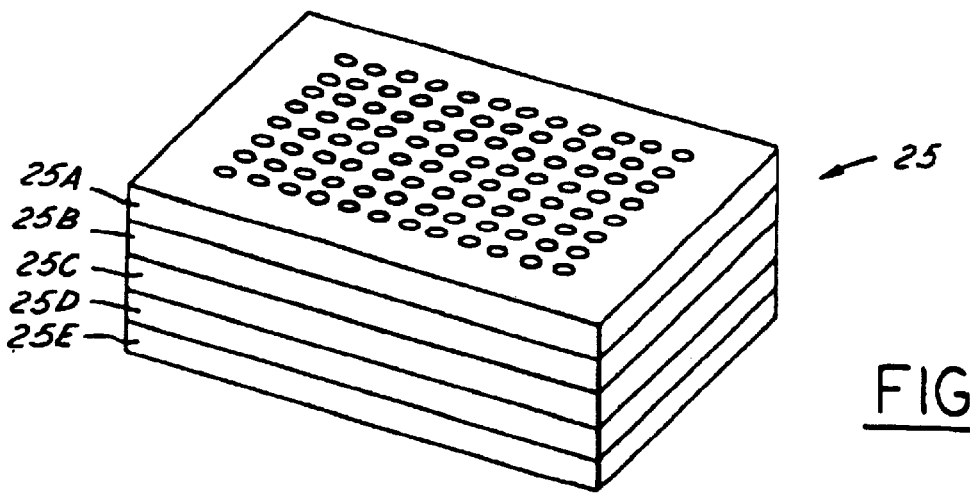
FIG. 5 illustrates a five-layered multiple fluid sample processor in accordance with the present invention.

As indicated above, a multi-layered sample processor in accordance with the present invention can have a large variety of layers or plates. For example, a five-layered sample processor 25 is shown in FIG. 5. The five layers are identified by the reference numerals 25A, 25B, 25C, 25D, and 25E. The layers can be detachably connected to each other or permanently bonded, as needed and desired. Each of these plates can also be formed of two or more sublayers in order to form the appropriate microchannels, reservoirs, and the like in the plates.

Figure 19:
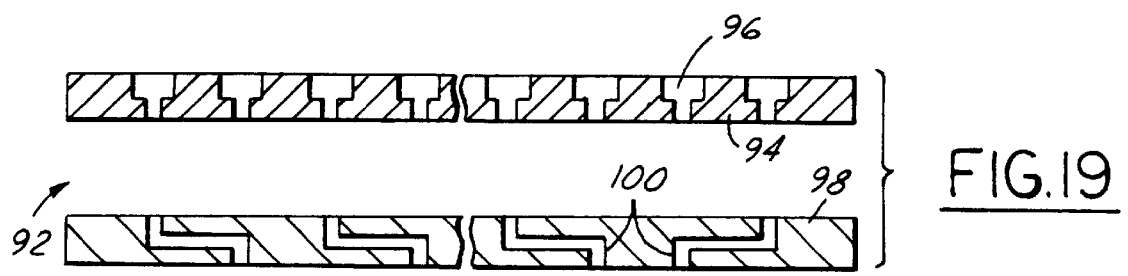
FIG. 19 illustrates two layers of a multiple fluid sample processor in accordance with the present invention.

FIGS. 19 and 20 show two other embodiments of processors in accordance with the present invention. In FIG. 19, two-layered processor 92 has a first layer 94 with a plurality of apertures or openings 96. Processor 92 also includes a lower layer 98, which has a plurality of stepped channels 100. In FIG. 20, processor 102 is provided which has an upper layer 104 with a plurality of openings or apertures 106, and a lower well-plate or bottom layer 108 with a plurality of containers or wells 110 therein.

All of the layers are engaged and, during the necessary transport of sample processing, the samples may be moved from one layer to another and be constantly in a controlled atmosphere of inert or other gas medium. Also, it is possible to utilize the present invention processor without an inert or gas atmosphere. Samples may be conveyed from one layer to another either single, in some multiplicity, one at a time, or in a defined set, row or column. As indicated above, preferably capillary forces, a pumping mechanism or a vacuum mechanism is used to transfer the samples from one layer to the other through the microchannels.

For a five-layered processor, such as shown in FIG. 5, the top layer 25A preferably contains multi-welled reservoirs with small fluid, transport channels or other means which convey the liquid contained in each of the wells to be pumped continuously into the next layer one or more wells at a time. The second layer 25B is a coarse distribution layer which has a plurality of microchannels fanning out from each well or defined well to the first layer and used to convey the samples to the appropriate sites on the next level. The third layer 25C is a fine distribution layer for delivering the sample fluid to the individual reaction wells of the next layer. The pumping means for transferring or delivering the samples from one layer to the other can be either through the top layer (as shown in FIG. 11), the central layer, or through a side/edge mechanism, as shown in FIGS. 23 and 26.

The fourth layer 25D is preferably a reaction well layer which contains a plurality of reaction wells or cells which allow the liquids to process, react, separate, or which allow the samples to be detected in some manner. Such reactions include, but are not limited to, reactions to other liquids delivered in a similar fashion, reaction with liquids or solids previously delivered or deposited into the reaction wells or sites, or reactions on the surface of beads or separation through molecular sieving means including gels, electrophoretic separation, or other separation means, absorptive or desorbtive interaction on any surface or liquid phase within a reaction well, or detection means.

The fifth or bottom layer 25E has a plurality of wells or small container sites into which the samples are eventually deposited after being processed through the other layers. Once the finish samples are deposited in the reaction wells in the bottom plate, the bottom plate is detached from the other layers and conveyed to another location for further processing. Again, as mentioned above, the detachment of the body layer, conveying the bottom layer to another location, and subsequent processing of the samples in the reaction wells in the bottom layer is preferably done by robotic or other automated means, although these steps can also be done manually.

Figure 59:
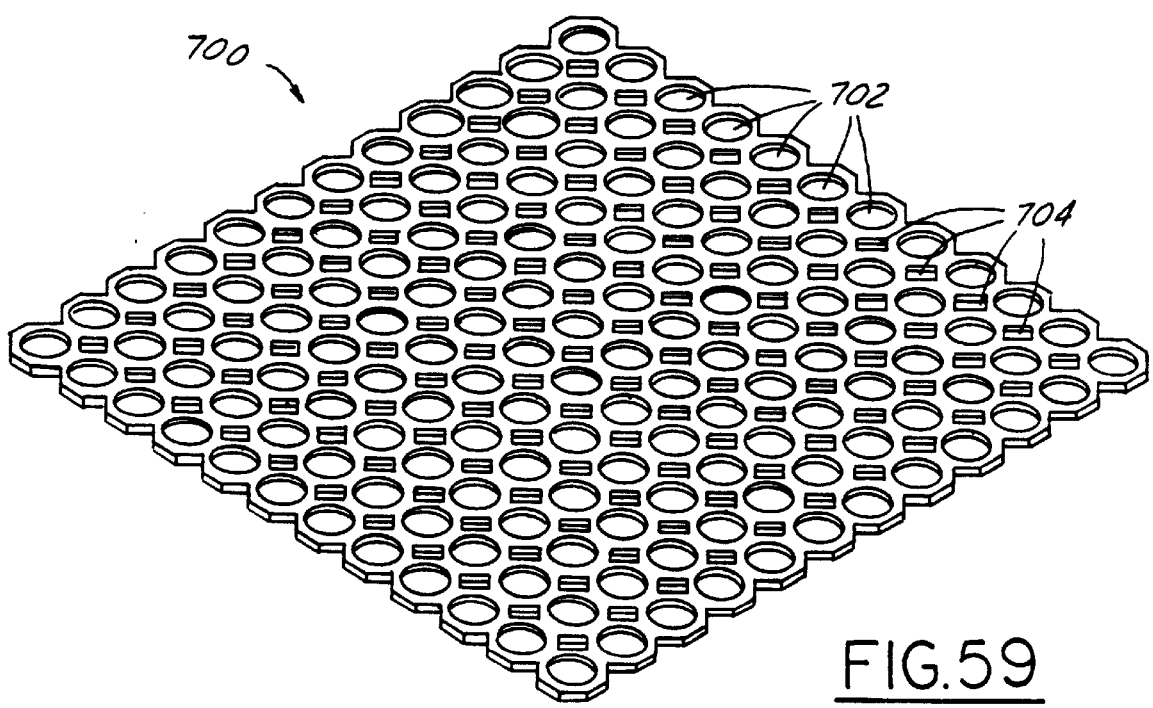
FIG. 59 illustrates a gasket sealing member which can be utilized with the present invention.

The top four layers of the five-layer processor 25, can be separate or bonded together in some manner. The layers can also be grouped in groups of two or three layers if desired. Also, gaskets or other sealing means, such as coatings, can be used to facilitate sealing of the layers with each other. In this regard, one preferred gasket-type sealing member 700 is shown in FIG. 59. This sealing member is preferably made of conventional sealing-type material, such as teflon® (tetrafluoethylene), silicone, GORTEX, VITON, neoprene, CHEMRAZ, prefluoruel estomer, KALOREZ, graphite, and the like, and has a plurality or grid of first openings 702 and a plurality or grid of second openings 704. Preferably, the sealing member is made from a chemically and biologically resistant material. The first openings 702 are provided in alignment with the mating channel openings in the mating plate members 12 and 14 and 14 and 16 in order to allow fluids to pass through and to seal around each opening. The second openings or voids 704 are provided for expansion of the sealing member material when it is compressed between adjacent plate members.

Also, any of the layers in the processor can incorporate electronic or optical elements including, for example, transistors, memory cells, capacitors, resistors, LED's, fiber optics, lenses, micro lenses, phase gratings, computer chips, bells, tuning forks, acoustical wave detectors, edge connectors, surface connectors, or any other means or mechanism of detection, processing, thermal sensing, heating, cooling, exciting, probing, detecting, separating or chemically modifying the samples. Any layer may include these elements with or without liquid elements. Any of the layers may also include both liquid and non-liquid elements, and may include means for the liquids to come into contact with non-liquid elements. Any of the layers may also have edge, or in-plane fluidic delivery such as the fluidic edge connector embodiments shown in FIGS. 23 and 26.

The layers forming the processor can also include any conventional means to facilitate the connection or deconnection, whether active or passive. These means could include mechanical clamping devices, solenoids, Velcro, glue, vacuum latches, and the like.

The advantages of the present invention apply generally to any application where a large number of fluids need to be processed, stowed, conveyed or transported by a wide range of means (such as pumping) and eventually reach another large number of locations. The present invention also applies to such situations where a single sample is processed, subdivided and possibly detected in a large number of wells or sites. The invention also can be utilized for a large number of samples which are eventually heated or cooled and processed similarly or detected together without maintaining unique fluidic passages.

Examples of applications to which the processor may be utilized include, but are not limited to, small molecule synthesis, DNA or oligonucleotide synthesis, peptide synthesis, RNA synthesis, oligosaccharide synthesis, catalyst synthesis, DNA or RNA preparation, RNA/DNA purification, RNA/DNA amplification, RNA/DNA detection, magnetic bead or other bead based cell collection or sample preparation, bead based RNA/DNA detection, DNA/RNA single nucleotide polymorphisms, protein and protein fragment separation, assay detection and the like. The invention can also be utilized for other biological assay systems utilizing detection mechanisms such as phosphate release, calcium release, and fluorescence.

In FIG. 19, the two layers 94 and 98 are preferably secured together in one or more of the ways discussed above. Fluidic distribution, redistribution and the like takes place within the two layers. In FIG. 20, samples are stored or transported to the top layer 104 by any of the means discussed above, including tubes. In the reaction wells 110, any of the processing steps or procedures discussed above can take place such as reaction, separation, detection, storage, and/or atmosphere control.

FIGS. 21 and 22 illustrate ways in which fluidic connectors can be utilized with processors in accordance with the present invention. For example, in FIG. 21, three fluidic inlets 112 are interfaced to a two-layered processor 114, while four fluidic outlets 116 are interfaced to a second processor 118. The two processors 114 and 118 are then connected together for sample processing.

In FIG. 22, a two layer processor 120 is connected to a single layer processor 122. A plurality of fluidic inlets 124 are utilized to transport samples and other materials to the processor 120.

Due to the series of microchannels contained in one or more of the central layers of the processor, samples and other materials introduced into the top plate are delivered in a specified manner to openings in subsequent layers or plates. As indicated, it is possible for materials introduced into one opening in the top plate to be transported by the microchannels and passageways to fill a row or column of wells or passageways in the next layer. FIG. 24 depicts a representative mapping which can be utilized to join the plurality of openings in the top layer 132 with the row and column end feed openings in the middle layer 134. It is to be understood that FIG. 24 only depicts one representative format of mapping the microchannels to achieve a row-column format and that other formats and arrangements could be utilized.

In FIG. 24, only one quadrant 133 is depicted in detail, since the other three quadrants can be formatted in the same manner. The layer 132 has a 96-well microtiter format, with eight rows of twelve openings each spaced 4.5 mm apart, while layer 134 has 80 inlets in a 16×24 format and 384 inlets. As shown, openings A, A in layer 132 are connected through microchannels 135 to communicate with openings A, A in layer 134. In the same manner, openings B, B, C, C and D, D communicate through microchannels formed in layer 132 with corresponding openings B, B, C, C and D, D respectively, in layer 134. The openings A, A, B, B, C, C, and D, D in layer 134 are located at the ends of row channels which extend across layer 134 and communicate with corresponding openings A', A', B', B', C', C' and D', D', respectively on the opposite side or end of layer 134.

Similarly, openings E, E, E, F, F, F, G, G, G, and H, H, H, in layer 132 communicate with corresponding sets of openings at the ends of columns in layer 134, shown by the letters E', F', G' and H', respectively. In this regard, the particular sequence of conveying and processing shown in FIG. 24 is merely illustrative of the wide variety of transport systems and procedures which can be used to transport samples from one layer to another in a multi-layered sample processor in accordance with the present invention.

As shown, in FIG. 24, there are 96 apertures (8×12) on the top layer 132 which mate with 40 apertures (16+24) on the middle layer 134. Only 40 of the 96 apertures in the top layer are typically used for reagent addition, with 40 others being utilized for double sided pumping. The remaining sixteen apertures (indicated, for example, by numeral 136) can be used for reagent mixing, storage or other processing. If single-sided pressure pulsing is utilized, only 40 apertures are needed to be provided or utilized in the top layer. With only 40 apertures, the pitch can be 9 mm and only one column of 16 apertures and one row of 24 apertures are needed on the middle or distribution layer.

Figure 24A:
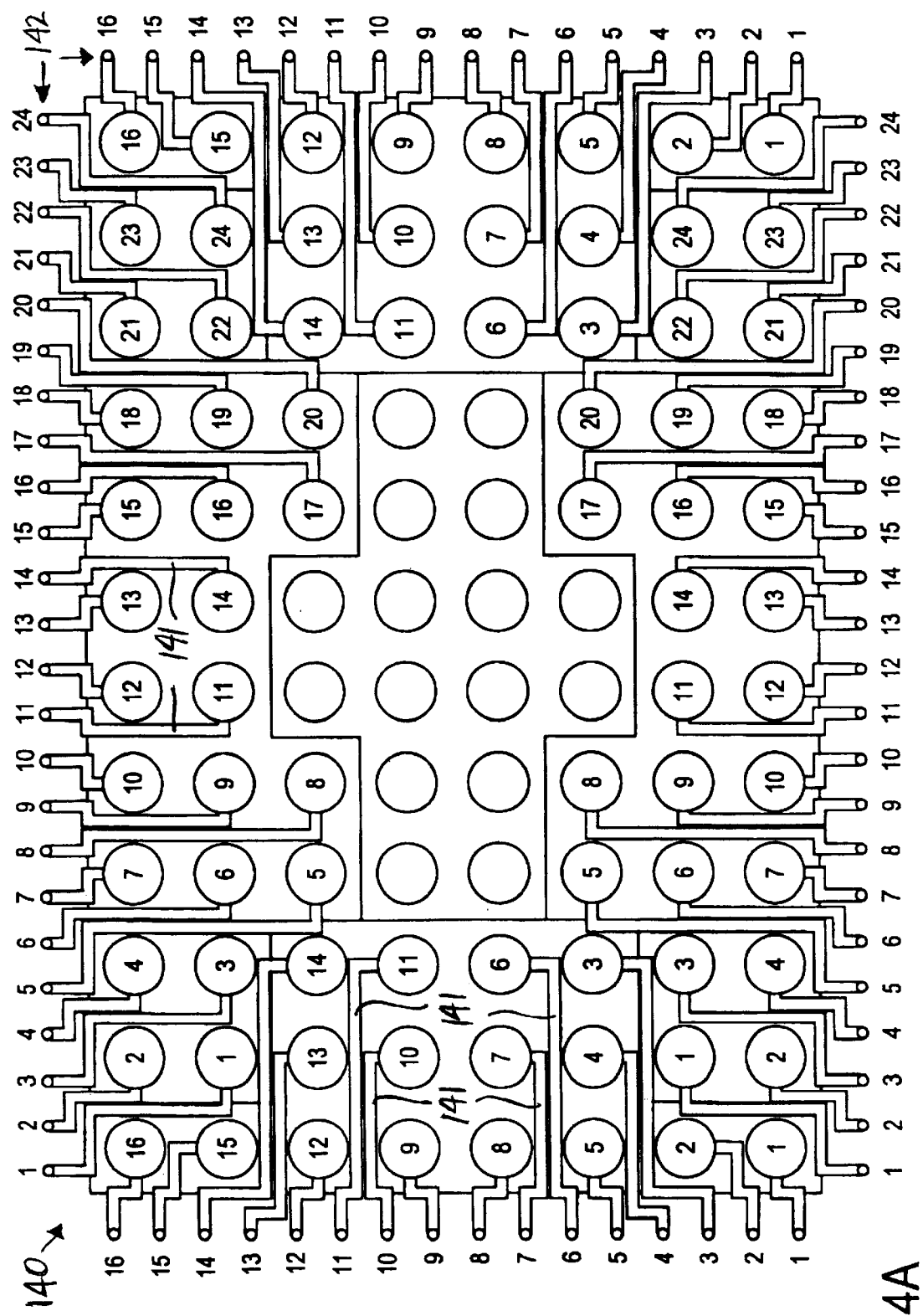

FIG. 24A depicts another mapping format (a/k/a "fan out") for the microchannels for transporting liquids or other materials in one layer to openings in another layer. This embodiment is generally referred to by the reference numeral 140 and depicts a 96-well reservoir plate. Eighty of the 96 wells are connected by microchannels 141 to eighty openings 142 arranged in a 16×24 rectilinear format. The mapping arrangement correlating specific wells to specific openings is shown by the corresponding numbers indicated in FIG. 24A.

There are many options for delivering reagents and other liquids from a reservoir plate with a certain number of openings (e.g., 24, 96, 384) and having a certain pitch between their centers (e.g., 4.5 mm, 9 mm) to a well plate having a larger number of wells (e.g., 96, 384, 1536). Various numbers of openings in the rows and columns of the reservoir plate can be utilized, with the number often depending on whether the single or double-sided pressure pumping is utilized. FIG. 24B is a chart setting forth various options for reservoir plate deliveries. Example 143 from the chart can be used to explain it. In order to fill 384 wells in a well plate with a pitch of 2.25 mm between the wells, the reservoir can have 24 openings (4×6 format) at a pitch of 9 mm, and either 16 rows or 24 columns can be filled in the distribution layer. Single-sided pumping is used to fill the wells. In example 144, again 384 wells with a 2.25 mm pitch are filled from a reservoir plate with a 96-well format at a 4.5 mm pitch. Either 16 rows and 24 columns are filled, or 32 rows are filled, and either single-sided or double-sided pumping can be utilized.

Figure 24C:
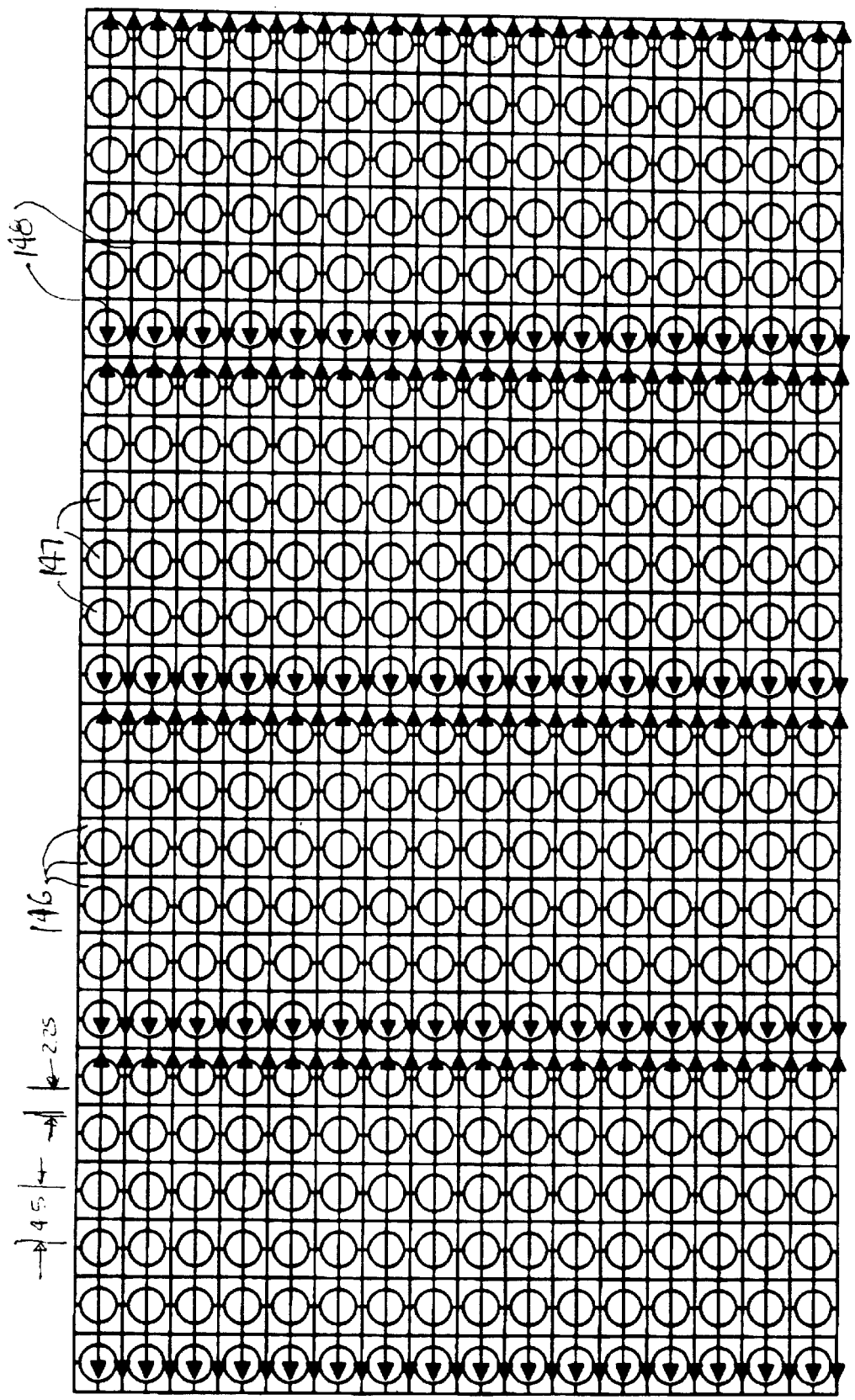

It is also possible to subdivide the rows and columns within the architecture of a plate. This allows use of portions of rows or columns. For example, as shown in FIG. 24C, a 1536 well plate (at 2.25 mm pitch) is utilized with a 384 reservoir plate (at 4.5 mm pitch). Both the reservoir and well plate are shown in FIG. 24C, one overlaid over the other. The well plate has 1536 square wells 146, while the reservoir has 384 round wells 147. Each of the rows are divided into four equal portions and double pressure pumping is utilized on each portion. Twelve wells are addressed in each delivery, with the arrows 148 indicating the direction and extent of the delivery.

Figure 25:
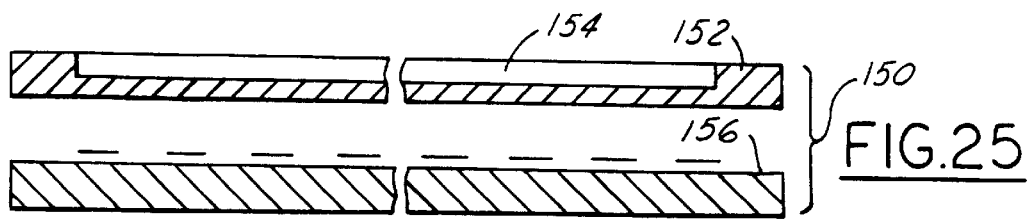
FIG. 25 illustrates a single well, multiple reaction site processor in accordance with the present invention.

Other embodiments of sample processors in accordance with the present invention are shown in FIGS. 25 and 27–32. In FIG. 25, a single well, multi-reaction site processor 150 is illustrated. The upper layer 152 of processor 150 has a single well 154. The second or bottom layer of processor 150 is identified by the reference numeral 156.

Figure 27:
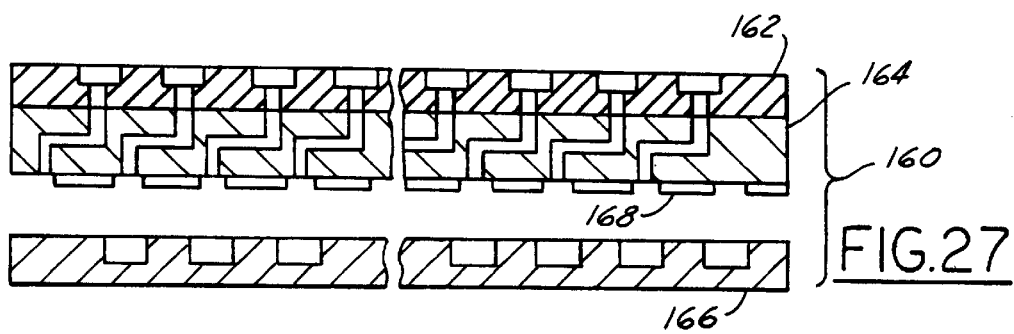
FIG. 27 illustrates a use of a sealing member or gasket in accordance with the present invention.
Figure 28:
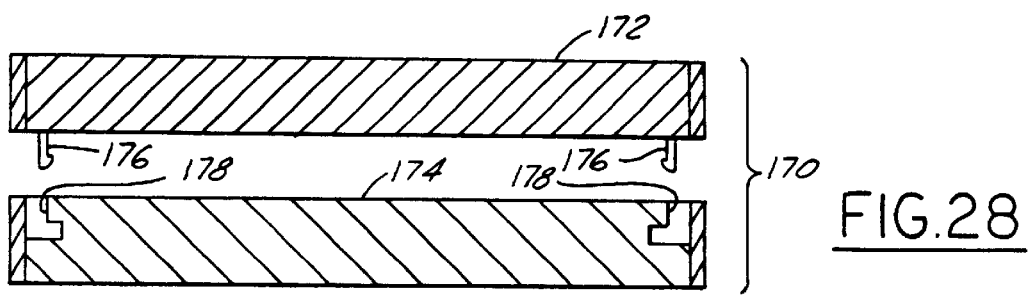
FIG. 28 illustrates a representative coupling mechanism to connect multiple layers together in a processor in accordance with the present invention.

In FIG. 27, a three-layer processor 160 is illustrated. The processor 160 has a first layer 162 which is bonded or otherwise fixedly secured to a central layer 164. The central layer 164 is detachably connected to the well plate or bottom layer 166. A sealing member or gasket 168 is shown and utilized between the detachable layers 164 and 166. (For this purpose, the gasket-type sealing member 700 as shown in FIG. 59 can be utilized.) FIG. 28 illustrates one mechanism for holding two layers of a processor together. The processor 170 has a first layer 172 connected to a second layer 174. The two layers are connected by a plurality of barbed tab members 176 which are adapted to be mated with and hooked into slotted openings 178 in the bottom layer. As indicated above, other means and mechanisms can be used to hold the layers of the processor together. The coupling mechanisms could include micro links, micro Velcro, pushed task button releases, mechanical latches, glue, solenoids, pneumatic bladders, electrostatic mechanisms, vacuums, and the like.

Figure 29:
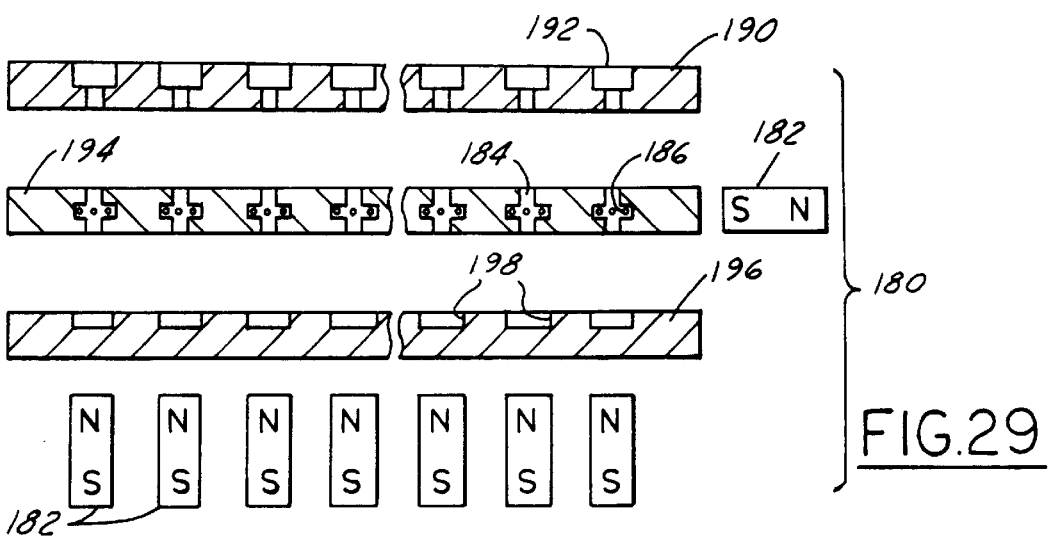
FIG. 29 illustrates an embodiment of the invention using magnetic bead members.
Figure 33:
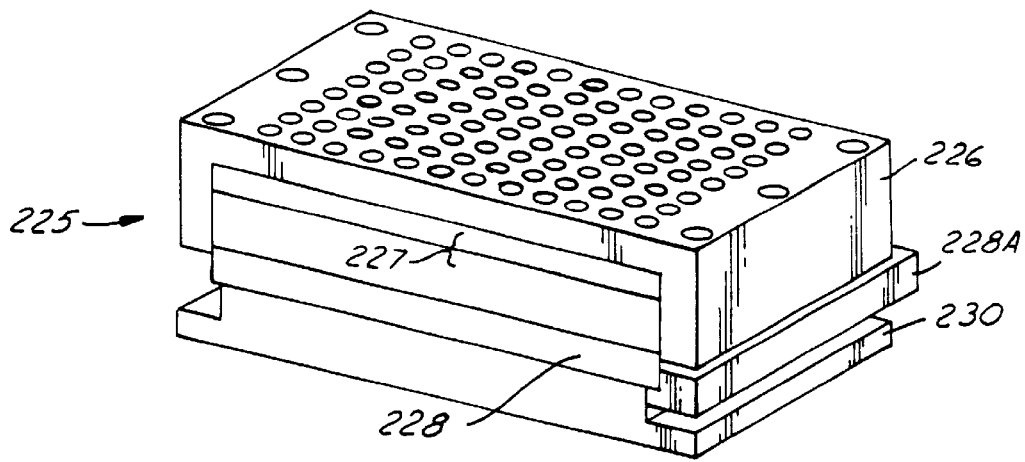
FIGS. 33–36 illustrate a preferred array synthesizer and fluid processor in accordance with the present invention and depict its use in reaction and product capture processes.
Figure 34:
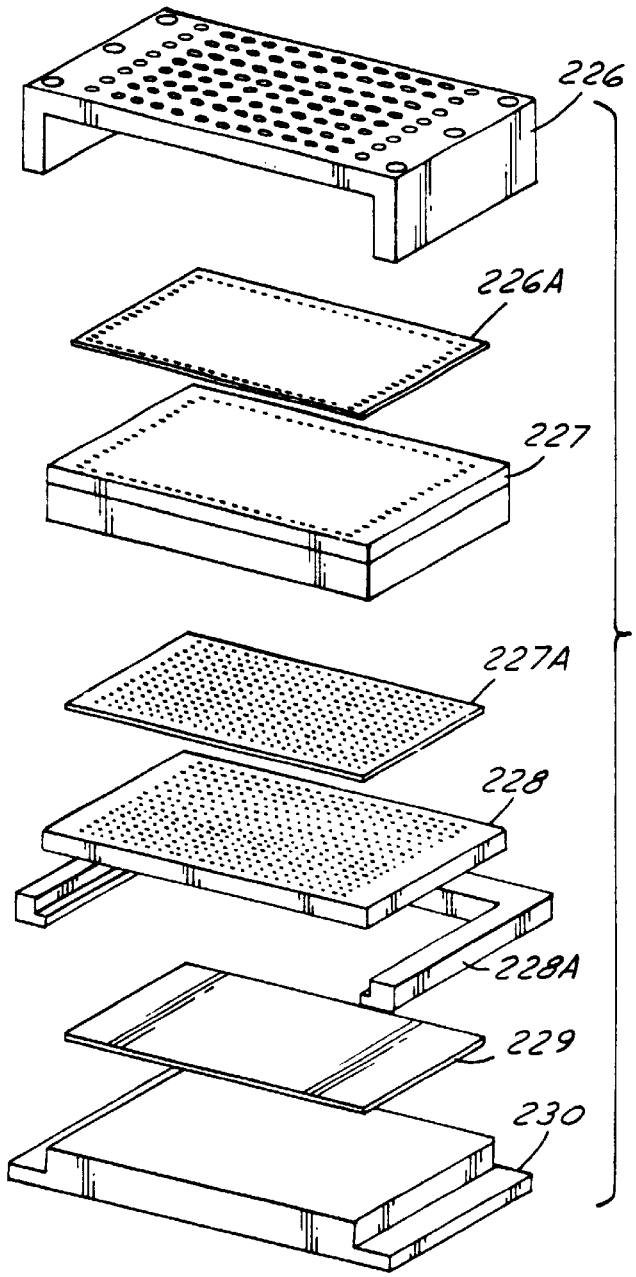

FIG. 29 illustrates a processor 180 which has particular use in DNA sample preparation and similar applications. In the processor 180, a plurality of magnets 182 are utilized in order to attract small magnetic particles 184 in reaction wells 186. The processor 180 includes a top layer 190 with a plurality of openings or apertures 192, a central layer 194 with a plurality of reaction wells or sites 186, and a bottom or well plate layer 196 having a plurality of reaction wells 198 therein.

In FIG. 30, a three-layered processor 200 is illustrated. The processor 200 includes a first layer 201, middle layer 202 and a bottom layer (or well plate) 203. A plurality of apertures 204 are contained in the upper layer 201 with passageways 205 which allow the samples introduced into apertures 204 to be transported to the middle layer 202. In the middle layer, an absorbent material 206 is positioned in each of the passageways 207. In the bottom layer 203, microchannel 208 is used to convey samples entering the passageways 209 to be transported from the processor for further processing.

In FIG. 31, a five layer processor 210 is illustrated. Processor 210 has a first layer 211 with a plurality of reservoirs 212 positioned in it. The middle layer 213 consists of a coarse distribution plate 214, a fine distribution plate 215, and a reactor layer 216 bonded together. The bottom layer or well plate 217 has a plurality of reaction wells 218 positioned therein and is detachable from the central layer 213.

FIG. 32 illustrates a processor 220 which utilizes one layer 221 which is primarily non-fluidic. For example, layer 221 has a plurality of light emitting detector elements 222 arranged in pairs.

As indicated above, the processors contain a labyrinth of tiny channels which link an assortment of reagents to reaction chambers in which the new compounds are created. The microscopic features of the processes are created within structures (preferably glass and silicon) using, for example, lasers, machining, photolithography and etching. The channels are approximately the size of a human hair (5–500 $\mu$m) and transport the reagents along both vertical and horizontal flow paths from one layer to another. The processors have no moving parts and have adaptable architectures which can be tailored to suit a broad range of applications. The small capillary channels are less than one millimeter in width.

These channels distribute reagents, test samples and other fluids throughout the processor and its various layers. Etching can be done on both sides of a plate, as well as on both faces of adjoining plates, in order to create microchannels thereon. The etching can be done using patterns of photo resist and metal layers to form a network of capillary channels. The channels can cross over each other without intersecting.

The test materials and reagents are loaded into the processor through the pumps 40 and 42, as well as capillary tubing or channels. The capillaries preferably have an inner diameter of about 200 microns and outer diameters are about 600–700 microns. For certain processes, the channels and capillary valves are pretreated or coated to eliminate surface adsorption of proteins and related biomaterials in a known manner. Representative pretreatments or coatings include silicon dioxide, silicon nitride, titanium, TEFLON, silicon carbide, silanization, and the like.

The reaction vessels or wells in the layers preferably have a volume on the order of 5–2000 nanoliters and more preferably between 100–800 nanoliters. This is about one-thousandth of the scale currently being used in drug discovery synthesis and assays. The resultant substantial improvements in throughput capacity and precision as well as significantly lower costs than conventional screen technologies, are readily apparent.

A preferred cassette 225 with 384 reaction wells is shown in FIG. 33–36 with various attachments that can be utilized during a synthesis process. As a reaction module, the cassette 225 includes a top plate 226 (for sealing from atmosphere and for interface with pressure and vacuum systems), a reservoir and fluidic chip 227 and a well plate or chip 228. An injection gasket 226A is positioned between the top plate and reservoir member. A well gasket 227A is positioned between the fluidic plate/chip and well plate. A support frame 228A can be utilized to help hold and seal the various layers together and allow for automatic or robotic handling. The gaskets 226A and 227A can be of any conventional type, or can be of the structure and material of gasket 700 described above with reference to FIG. 59. In one embodiment, the injection gasket is manufactured to enable the introduction of liquids and resealing following liquid delivery. This can be accomplished with a pre-scored perfluro elastomer gasket. The ability to retain a self-sealing interface is particularly important for procedures involving partial well filling.

In a solid phase synthesis process, micro beads are first loaded into the wells in the well plate 228. If using solution phase materials, the wells are not filled prior to assembly. The gasket 227A is then applied and the reservoir member 227 and well plate 228 are aligned and sealed together. The injection gasket 226A and top plate are also assembled together with the reservoir member 227. A first reagent is then added (e.g. by a robotic mechanism) to the openings in the top plate 226 where they are transferred to the -rows and columns (as shown earlier in FIG. 12). Pressure is then applied to yield the capillary valves and load the reaction wells. A plurality of reagents can also be added if required by the chemical synthesis process being utilized. This is accomplished by delivery along the orthogonal delivery lines or evacuation of the previous channels followed by charging with a second reagent. Thereafter, if heating is needed for the reaction, a temperature plate 230 and spacer gasket 229 are attached to the well plate 228 and utilized to heat materials in the reaction wells. Once the reaction is completed, the temperature plate and spacer gasket are removed and the reaction wells are evacuated, washed, and purged, in a manner set forth above with reference to FIGS. 15 and 16. Thereafter, the fill, reaction, wash and purge cycles are repeated as many times as necessary to complete the synthesis.

The evacuation process can also be achieved with vacuums from 0.1 torr to 760 torr (1 atm). A typical low vacuum is 45 torr while a typical high vacuum is 660 torr.

Figure 35:
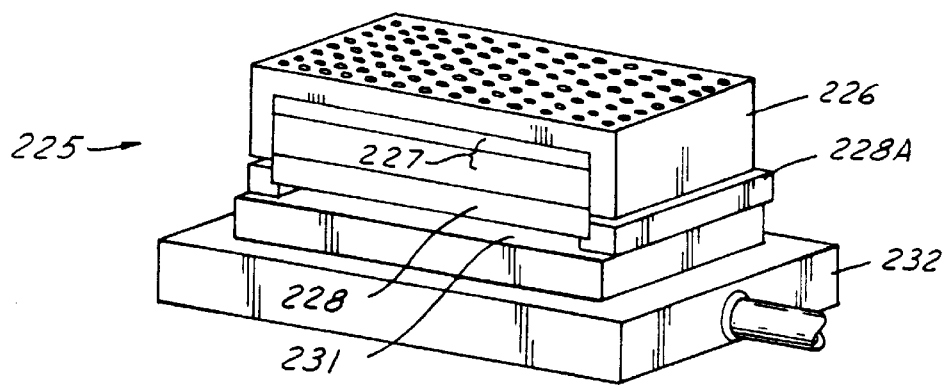
Figure 36:
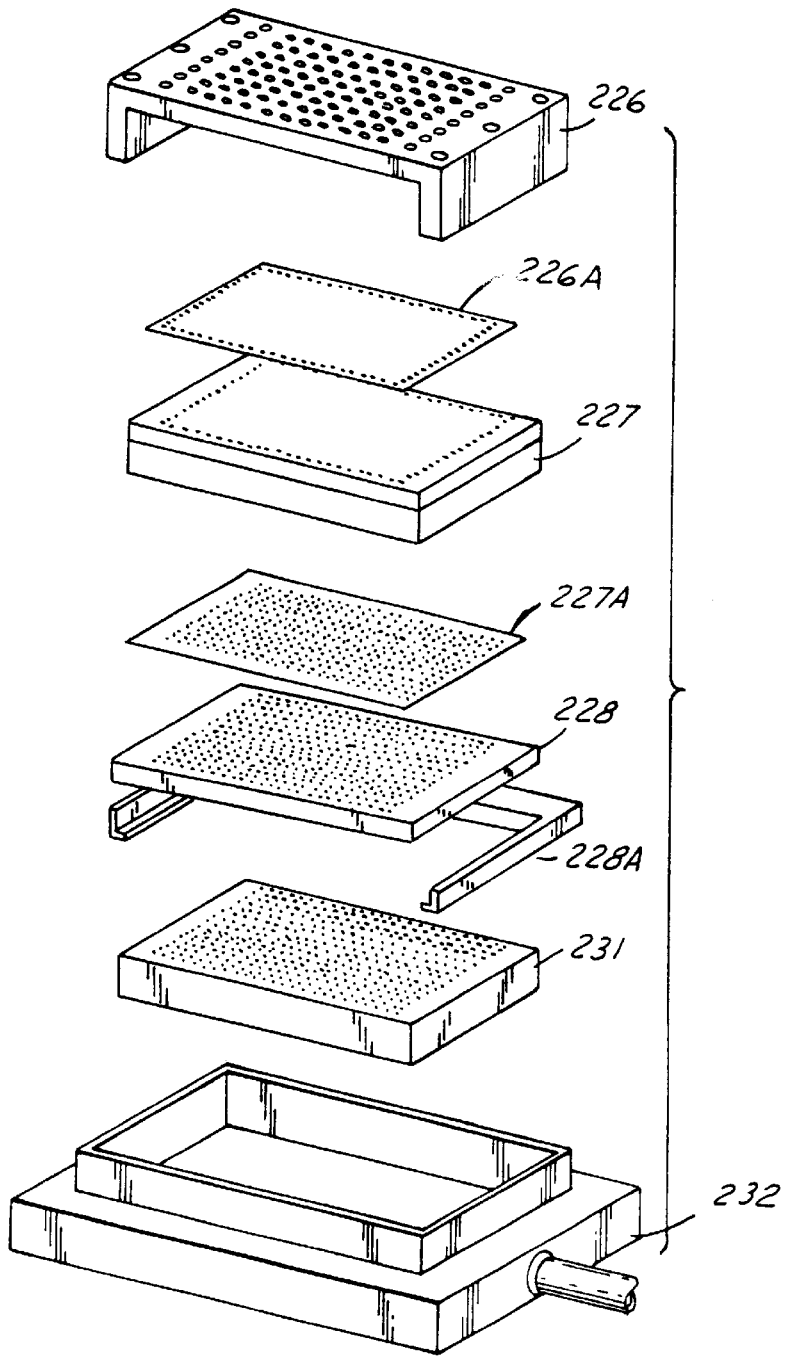

A product or "mother" plate 231 is then attached to the well plate 228, as shown in FIGS. 35 and 36. The product plate has larger capacity wells for capturing the effluent materials ejected from the wells in the well plate after the cleavage and rinse cycles are executed. A vacuum mechanism 232 can be positioned on the mother plate 231 and used to assist evacuation of the wells and independent capture of products when required. Other mechanisms and systems can also be utilized to evacuate the wells, such as pressure pumping and electrostatic spraying systems.

Another diagnostic assay device for chemical and biological event processing is shown in FIGS. 37–40. The assay device 233 consists of a two-piece housing comprised of a front member 234 and a rear member 235. The members 234 and 235 are preferably made from a plastic material and are held tightly together by snap-fit closure members. A middle layer member 236 is held in place between the two housing members. The middle layer is preferably made of a compliant, moldable, elastomer member such as polydimethylsiloxane (PDMS) or liquid silicone rubber (LSR). PDMS is currently available from Dow Corning under the brand name Slygard elastomer 184. Both PDMS and LSR can be molded with precision and are compatible with the types of samples and reagent fluids used for biological assays, genotyping and DNA processing. These materials also have an affinity to releasably attach themselves tightly to glass or silicone and form liquid-tight seals between the materials without bubbles.

Figure 37:
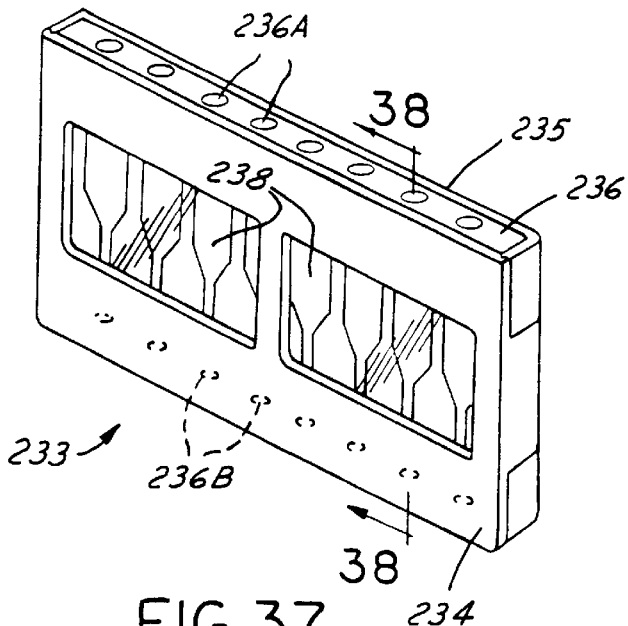
FIGS. 37–39 illustrates another assay device in accordance with the present invention, with FIG. 37 being a perspective view, FIG. 38 being a cross-sectional view taken along line 38—38 in FIG. 37, and FIG. 39 being an exploded view.
Figure 38:
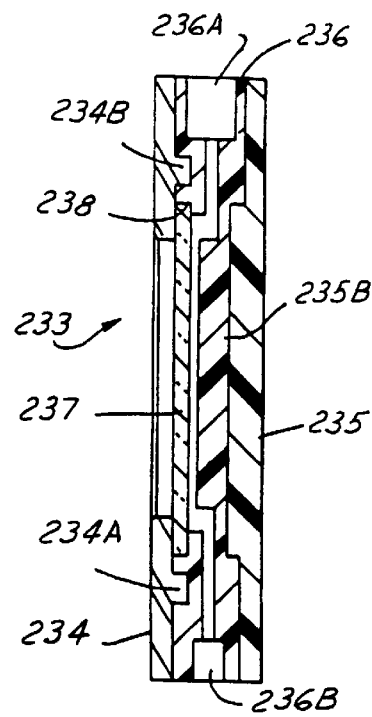
Figure 39:
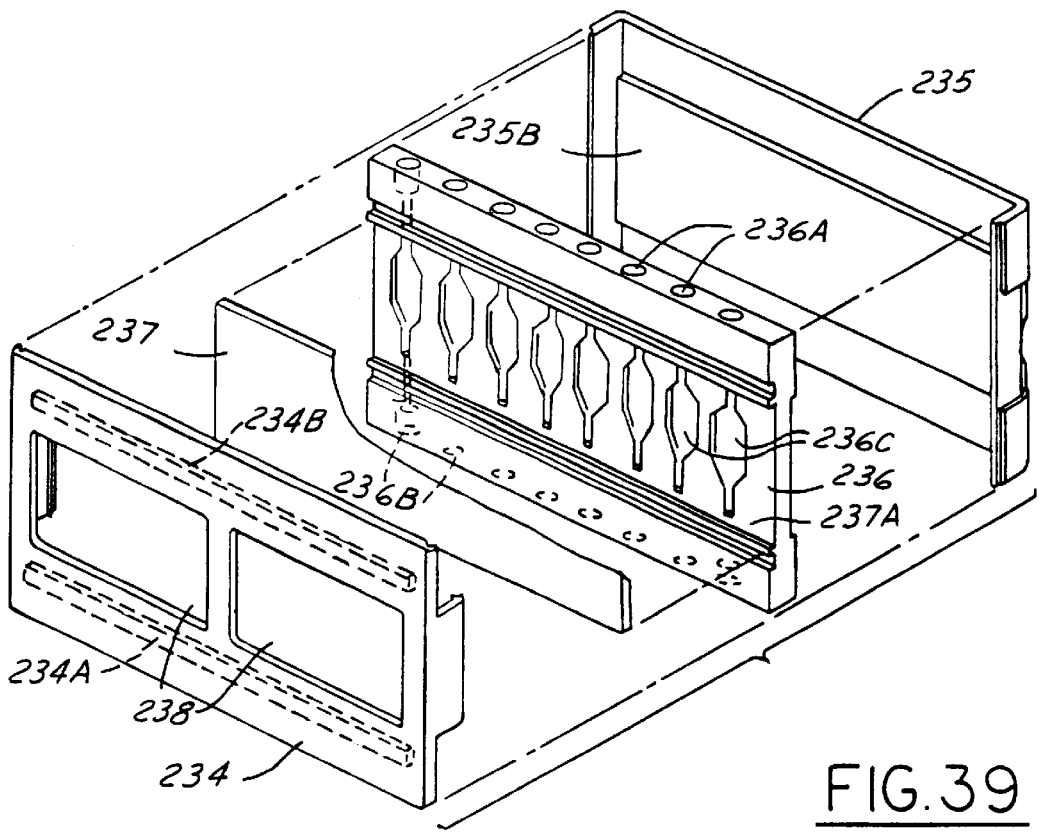

A glass slide member 237 is positioned in the housing and held in a recess 237A formed in the middle layer. The slide member is spotted with arrays of oligonucleotides from DNA synthesis (not shown). The oligo arrays are designed to detect single nucleotide polymorphisms (SNPs) of interest. When the assay device is assembled together, as shown in FIGS. 37 and 38, elongated ribs 234A and 234B on front housing 234 and wide raised rib member 235B on the rear housing member 235, compress the middle layer and hold the glass slide member and middle layer tightly together and in place. Windows 238 in the front cover member provide visual access to inspect the genotyping or assay process and also can allow reading by colorimeter, fluorescent, or mass spectral (ms) means of the SNPs on the glass slide without disassembly of the device.

The middle layer 236 is preferably fabricated by a molding process and is formed with a plurality of inlet ports or openings 236A, outlet ports or openings 236B, microchannels and recessed reaction or assay areas 236C. A wide variety of widths, lengths, and depths of ports, channels, and reaction recessed areas can be utilized with the present invention.

In order to increase the number and density of arrays to be processed, two glass slide members could be coupled in the housing, one on either side of the middle member. For this embodiment, two sets or rows of recessed reaction sites would be provided on the middle layer, one set or row on each side. Another set of windows could also be provided on the rear housing member for viewing the second side.

Figure 40:
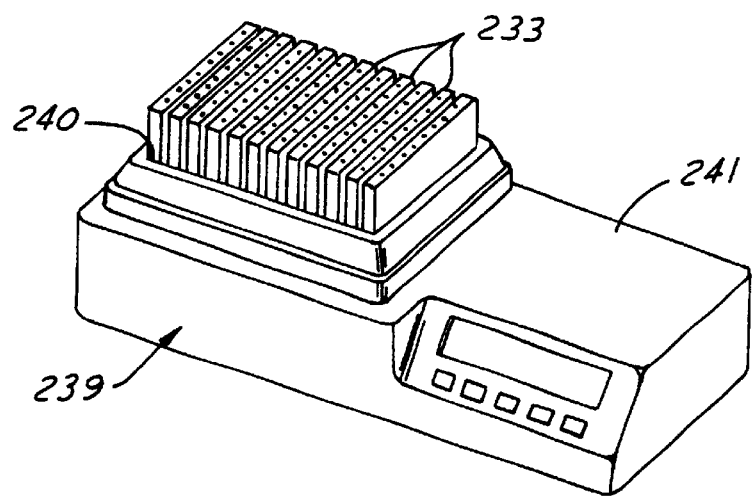
FIG. 40 illustrates a control base for use with the present invention.

In order to test a large number of arrays at the same time, a plurality of assay devices 233 can be positioned in a support base 239, as shown in FIG. 40. The support base has a recess or well 240 in which a plurality of assay devices 233 are positioned, as well as a console control and readout section 241. Preferably, support base 239 holds up to twelve assay devices 233. When fully loaded, the inlet ports of the devices are in the same configuration, volume and spacing as a 96-well microtiter plate. For this purpose, preferably the assay devices 233 have eight ports 236A, together with eight reaction recesses 236C. The 96-well configuration of the inlet ports allows for the presentation of samples and reagents to the devices by a pressure pumping and control system, such as shown in FIG. 9 and further disclosed in FIGS. 10–18. In essence, the present invention, with use of the assay devices 233, extends a microtiter plate in the vertical direction, which increases the usable surface area and subsequent array densities without increasing the volume.

Samples or reagents are added to the assay devices 233 through the inlet ports 236A. After appropriate incubation periods where required, waste products are extracted through the outlet ports on the bottom of the devices, as defined by DNA and SNP assay protocols.

Purified DNA samples can be dispensed into the inlet ports of the assay devices 233. The dispensing can be done automatically, such as by use of equipment including the Tecan miniprep or the Bio-Mek liquid handling devices. At a control point, the fluidic system within the support base 239 causes the samples to enter and fill the cavities of the assay devices 233. Once the sample is no longer needed, the samples are drawn or forced out of the devices into the waste management section of the support base. Wash and other reagents are then presented to and extracted from the assay devices in a similar manner. The triggering of these fluidic operations can be done automatically through computer control, depending on the design of the support base.

In order to optimize the multiple fluid sample processor in accordance with the present invention, it is necessary to have a reliable capillary valve or "break" in the middle layer of the processor. (The capillary valves are also called micro-sized valves.) This insures that the liquids being transferred from the middle layer into the reaction wells at various points along the rows or columns will have a consistent fluid volume distribution. In this regard, a distribution of less than 3:1 is preferable. It is also necessary to have a reliable capillary break in the well plate in order to control the draining of the wells.

One method of providing a reliable capillary break for acceptable holding and repeatable fluid delivery is to provide the capillary breaks in a layer portion of a silicon material that is reactive ion etched. The silicon layer portion could be positioned between the middle-reservoir layer and well plate layer. This is shown in FIG. 7A with the silicon layer portion being identified by the reference numeral 14B.

Another manner used to verify consistent fluid volume distribution in the networks is to minimize the feed channel resistance. This is done by making the column or row main supply channel 26A of a larger diameter. Again, this is shown in FIG. 7A (compared with channel 26 in FIG. 7). Another method for accomplishing a similar result is to vary the diameter of the openings in the reservoir layer extending from the row/column channel to the well plate layer. This is shown in FIG. 7A where openings 28A, 28B, and 28C are progressively larger as they extend further away from the inlet openings 22A and 24A adjacent the edges of the layer or plate 14A toward the center of the plate. As a result, when samples, reagents, or other fluids are inserted into openings 22A and 24A, the liquids fill each of the microchannels 28A, 28B, 28C, in the same amount and in approximately the same time. Thereafter, when double-sided pressure pumping is applied to the assay device and inlets 22A and 24A, the capillary micro-valves at the ends of channels 28A, 28B, 28C are all activated at the same time, thus simultaneously transferring the materials into the reaction wells in the well plate layer. In this regard, the capillary valve diameters range in size from about 5 to 500 micrometers, preferably about 50–100 µm. Typical diameters of the channels range from 50 micrometers to 1.0 mm, and preferably are 100–300 µm. The cross-sectional shapes of the channels can also be a variety of architectures, including circular, square, elliptical, rectangular, and the like.

With single-sided pressure pumping, the openings can increase in size (diameter) from one side of the plate to the other, thus allowing all of the openings to be filled at the same time.

Figure 56:
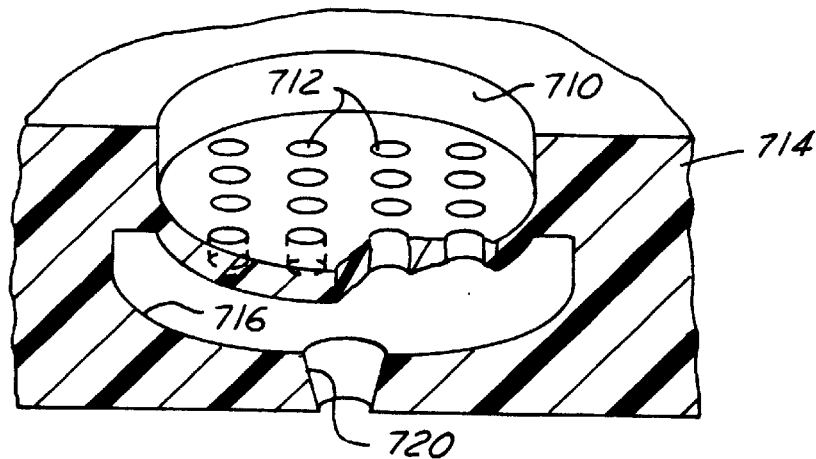
FIGS. 56–58 depict alternate embodiments of well members which can be utilized with the present invention.

For better control of well draining, it is also possible to vary the diameter of the exit hole 34 (shown in FIG. 8). It is also possible to provide an array or plurality of openings in the bottom of each of the reaction wells 30 in order to allow proper drainage and/or pressure pumping into a waste container, product (mother) layer, or the like. In this regard, a well member 710 with a plurality of openings 712 in a well plate 714 is shown in FIG. 56. In the embodiment shown, sixteen openings 712 are provided. A large number of openings spread out and positioned across the lower surface of the well member prevents any beads positioned in the well from blocking the drainage passage and preventing effective emptying of fluid materials from the wells. Similarly, it is also possible to provide one or more elongated slits in the bottom of each reaction well, or a combination of openings and slits, in order to control the draining of the reaction wells and, at the same time, to prevent blockage by beads used in solid phase synthesis processes.

The micro-sized openings in the plates and layers can also be tapered in order to provide secure sites for formation of capillary barriers or valves. A tapered opening 720 for this purpose is provided in plate 714 in FIG. 56. A sub-well collection member 716 with curved sides is shown in FIG. 56. The curved configuration assists in channeling or funneling liquid materials in the collection member 716 toward the drainage opening 720.

In order to control the filling of the microchannels and the distribution of the fluids throughout the cassette array members, it is also appropriate to control the strength and timing of the pressure pulses from the pressure devices. In this regard, when the materials or fluids are first positioned in the top plate member and need to be transferred to the reservoir member, small pressure pulses of smaller pressure forces can be utilized. Thereafter, when it is desired to open or yield the capillary valves and transfer the liquids into the reaction wells in the reaction plate layer, one or more stronger pressure pulses can be utilized. Pressure pulses having amplitudes ranging from 0 to 20 psi (preferably 3 to 6 psi) and having durations ranging from 1 to 500 ms (preferably 15 to 150 ms) are preferred. Partial well filling and partial well emptying can be accomplished by varying the strength and duration of the pressure forces.

Figure 41:
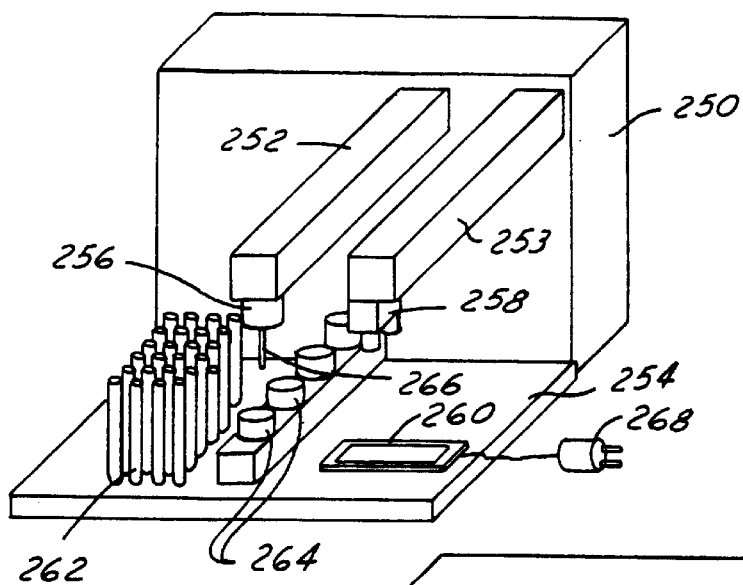
FIG. 41 illustrates a synthesis station utilizing a multiple fluid sample processor in accordance with the present invention.

A robotic and automated procedure for use with the present inventive processors is shown schematically in FIG. 41. A robotic sample processor, such as modified robotic processor 250 is utilized. The robotic processor includes a pair of arm members 252, 253 which are adapted to travel horizontally relative to the base plate (or deck) 254 of the processor. The arm 252 has a sample injector member 256 which is adapted to move longitudinally along arm 252, as well as longitudinally along its own axis. The arm 253 has a pressure pumping and/or vacuum mechanism 258 attached to it which is used to distribute the sampling materials through the processor 260.

For this purpose, the fluid sample processor 260 is positioned on the base plate 254 of the robotic sample processor 250 in a pre-defined location. A plurality of vials or test tubes of reagents 262 are positioned on the base plate 254, together with a plurality of wash or waste containers 264. Alternatively, these vials may be accessed from off-deck distribution lines. The probe 266 positioned on the movable member 256 is used to transfer reagents from the separate vials 262 and deposit them into the reservoirs in the upper surface of the sample processor 260. The waste container and wash containers 264 are utilized to wash the probe 266 between various liquid transfer steps, or to collect waste reagents and materials which have been removed from the processor or reaction wells.

The robot preferably is a two-armed Cartesian robot. It is also possible to heat or cool the processor 260 in order to accelerate, control reactions, or react the materials as needed. For this purpose, a resistance heater of a conventional type can be provided and electronically controlled through plug 268 in order to heat the fluid sample processor 260 and its contents. Other convention temperature control members and mechanisms can be utilized to heat and/or cool the temperatures of the materials in the processor.

Figure 42:
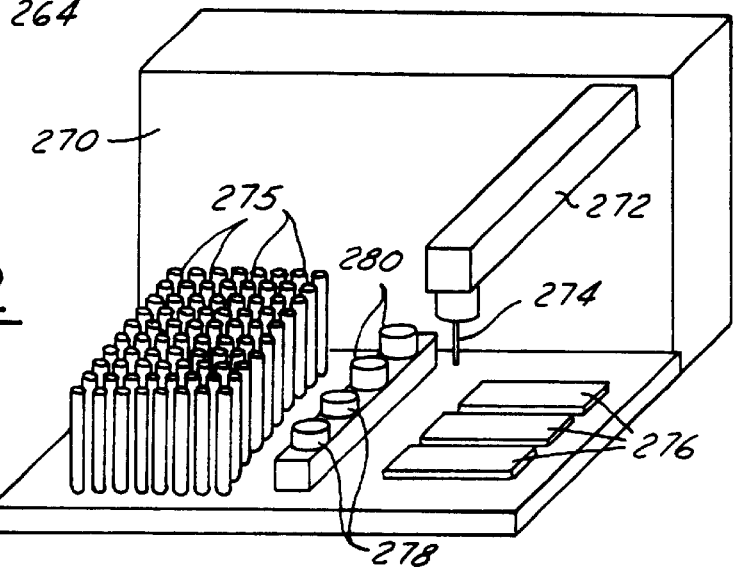
FIG. 42 illustrates preparation of reagents on a sample processor utilizing multiple fluid sample processors in accordance with the present invention.

In FIG. 42, the reagent preparation is illustrated. A single arm, single fixed tip Cartesian robot 270 is utilized. The arm 272 and the single tip member 274 is utilized to aspirate reagents from vials 275 and dispense them in one or more reservoirs of reagent plates 276. The reagent plates 276 can be 96 or 384-well reagent plates. The containers 278 and 280 contain common reagents commercially available or bulk solvents which may be accessed on or off deck. The formatting of reagents from vials to reagent plates is significant for cycle times of thousands of synthesis.

Figure 43:
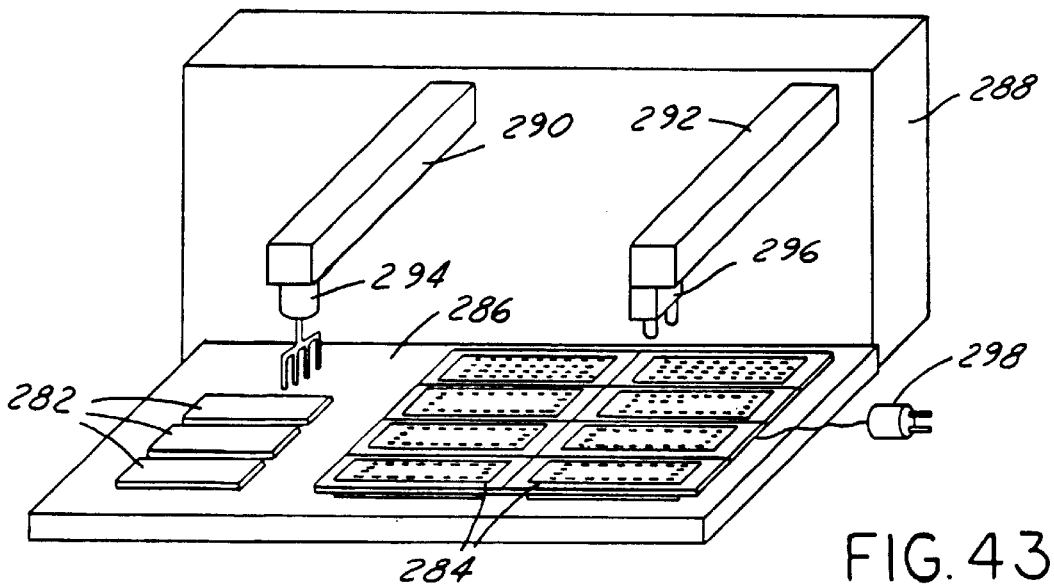
FIG. 43 illustrates another synthesis station utilizing sample processors in accordance with the present invention.

It is also possible to expand the processing capabilities of the present invention beyond those shown in FIGS. 41 and 42. For example, in FIG. 43, a 12,288 (12K) synthesis station is utilized. A plurality of 96 or 384-well reagent plates 282, together with 384 or 1536-well cassettes 284, are positioned on the base plate 286 of a robotic sample processor 288. Processor 288 has a pair of arms 290 and 292. Ann 290 is used to aspirate and dispense reagents, samples and other materials by means of a multi-tip probe member 294. The four tip probe 294 shown permits filling of four reservoirs in one step. A pressure and vacuum mechanism 296 is positioned on the other arm 292 and a temperature control mechanism 298 is also included in the system. A pressure or vacuum mechanism, as set forth above, can be used to distribute the fluids in the microchannels in the hips and activate the capillary valves.

Figure 44:
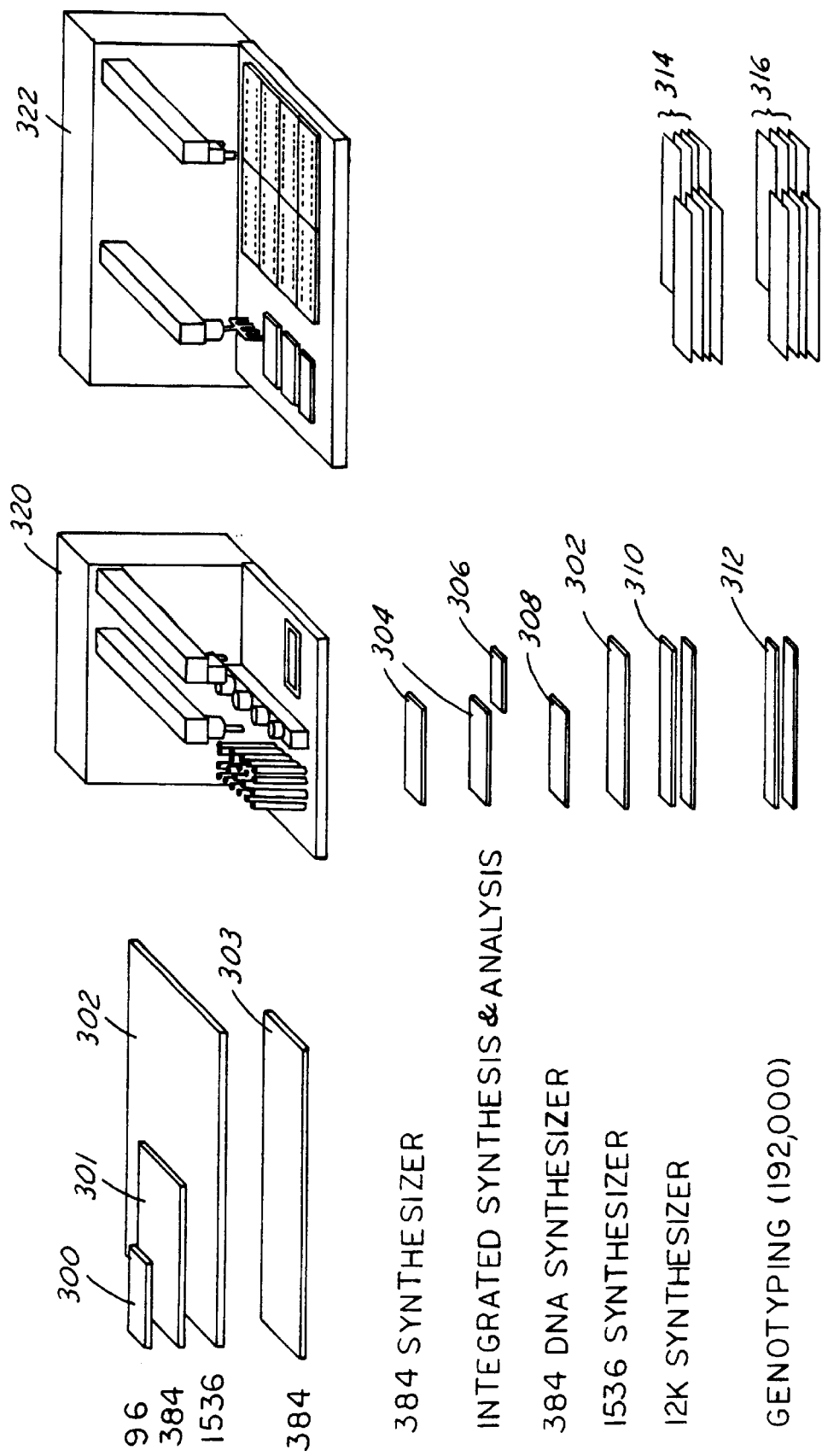
FIG. 44 illustrates various embodiments of the present invention and systems utilizing the present invention.

FIG. 44 also schematically illustrates various applications for use with the inventive processors. As indicated, the fluid sample processors 300, 301, 302, and 303 have 96, 384, and 1536- and 384-wells, respectively. A 384-well synthesizer 304 can also be integrated with a 96-well processor 306. The processor can also be a 384-DNA synthesizer, as referred to by reference numeral 308. The synthesizer can also be a 1536- synthesizer or a 12K-synthesizer 302 and 310. It is also possible for the processor to be used for a genotyping process or for thousands of samples 312. It is further possible to modularly combine or stack a group of the synthesizers together, as shown by reference numerals 314 and 316 in FIG. 44. Also, as indicated with respect to FIGS. 41–43 discussed above, processors in accordance with the present invention can be utilized with bench-type sample processors, such as those referred to by reference numerals 320 and 322 and FIG. 44.

It is also possible to simply change the pitch of a fluid sample processor. For example, it is possible to convey liquid materials from a 96-well processor having a 2.25 mm pitch to a 96-well processor having a 4.5 or 9 mm pitch.

Figure 46:
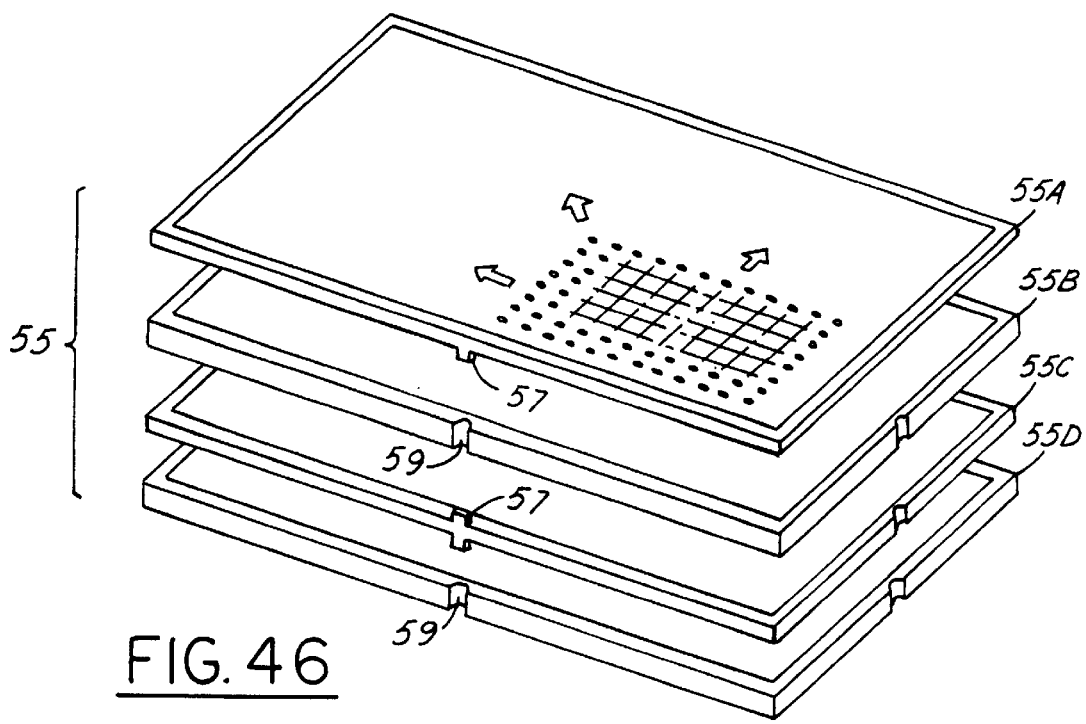
FIG. 46 illustrates a four-layered embodiment of the present invention.

A four-layered processor 55 is shown in FIG. 46. Four-layers 55A, 55B, 55C, and 55D can have any of the standard plurality of apertures therein, whether 96-, 384-, or 1536-. Also, as shown in FIG. 46, a plurality of mating tab members and grooves, 57 and 59, respectively, can be utilized to position and orient the layers accurately relative to one another.

Figure 47:
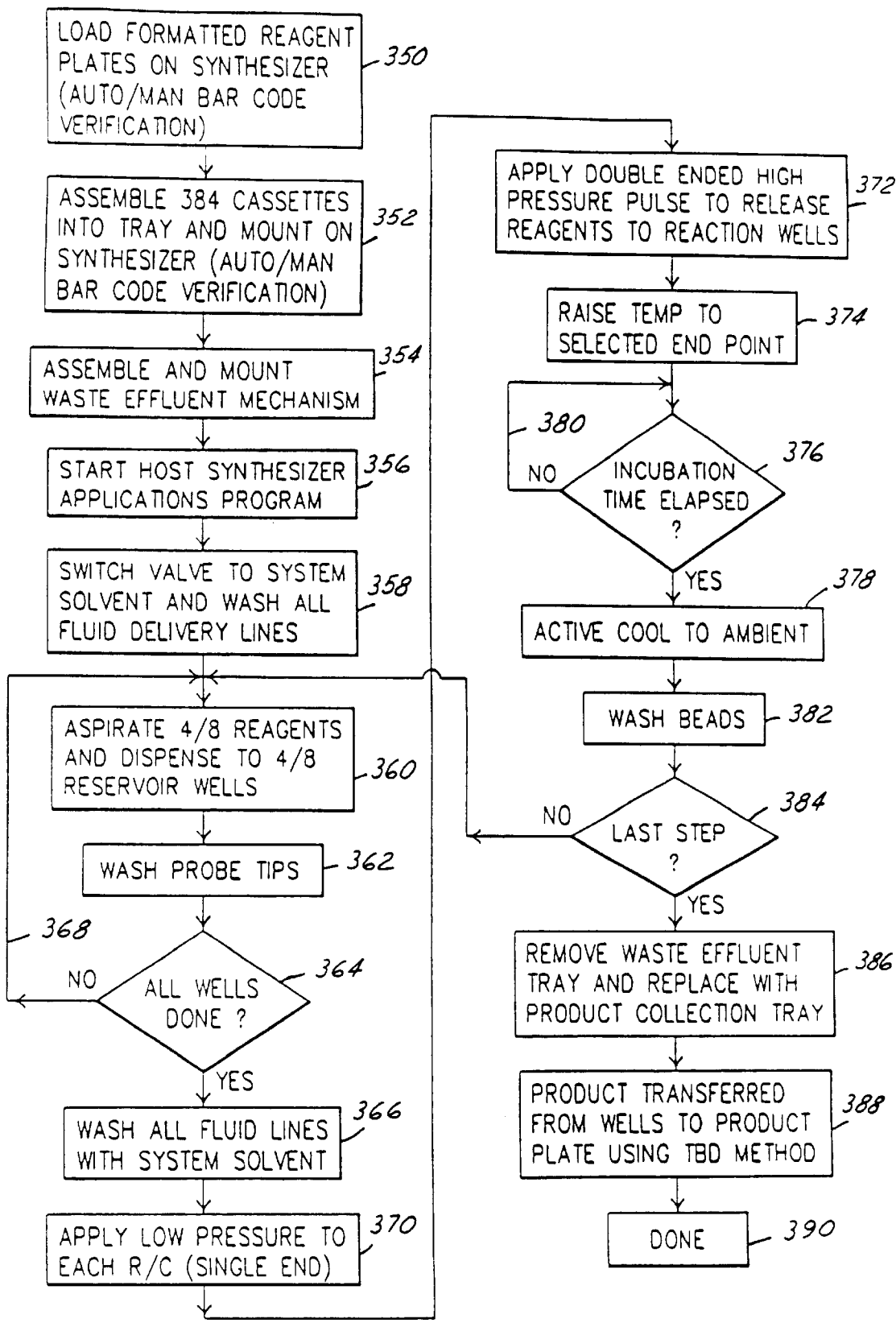
FIG. 47 is a flow chart illustrating a synthesis procedure utilizing the present invention.

FIG. 47 depicts a representative process for synthesis utilizing the multi-layered fluid processor in accordance with the present invention and the robotic or automatic mechanisms discussed above. First, the formatted reagent plates are loaded on the synthesizer (350). The 384- well cassettes are then assembled onto trays and mounted onto synthesizer (352). The waste fluid mechanism is then assembled and mounted (354). Thereafter the host synthesizer application program is started (356). The valve is then switched to system solvent and all of the fluid delivery lines are washed (358). At that point, reagents are aspirated and dispensed to the reservoir wells (360). The probe tips are then washed (362). If the reactions in all the wells are completed (364), the fluid lines are again washed with solvent (366). If the synthesis is not complete in all of the wells (368), then steps (360) and (362) are repeated until all of the reactions are driven to completion. Once the fluid lines are washed again with solvent (366), low pressure is applied to each rationing cassette. The pressure is preferably applied in the process as a single end feed (370). Thereafter, a double-ended high pressure pulse is applied to release the agents to the reaction wells (372). The double pressure micro-valve capillaries are formed in the passageways in the processor. The temperature is then controlled to a preselected point depending on the process (374). The temperature is controlled for a certain length of time (376). If the incubation time period has elapsed, then the liquids are allowed to cool to ambient temperature (378). If the incubation time is not elapsed, which could be hours, days or months, then the processor is held in place at the elevated temperature (380).

If this is the last step (384) in the chemical synthesis process, then the waste tray or temperature control plate is removed or replaced with a product collection tray (386). If this is not the last step in the synthesis process, then the same or other reagents are aspirated and dispensed to the reservoir wells and steps (360) to (382) are repeated.

Once the product collection trays (356) are put in position, the product is transferred from the reaction wells in the processor to the product plate (388). At that point, the synthesis process is completed (390).

In this regard, the host referred to in step (356) is preferably a computer, and the beads referred to in step (382) are preferably positioned in each of the well plates. The removal of the waste affluent and replacement with the product collection tray in step (386) is typically done manually. Finally, the transfer of the product from the wells to the product plate at step (388) can be done in any conventional manner, such as vacuuming, pressure, or gravity.

Figure 48:
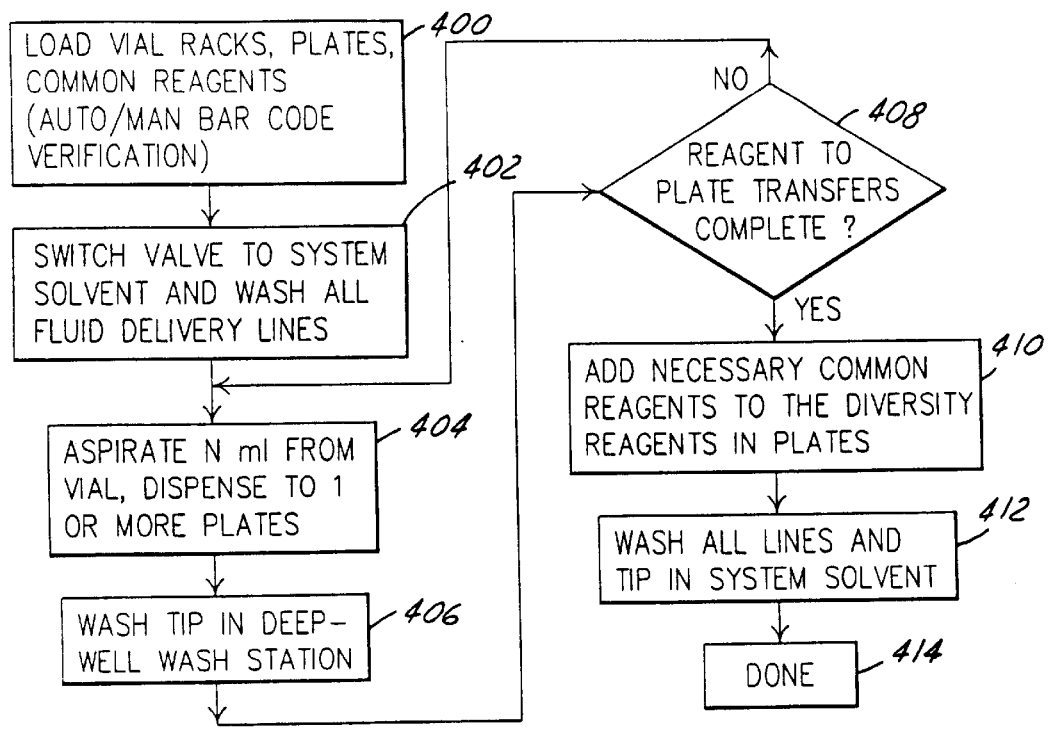
FIG. 48 is a flow chart illustrating a reagent plate preparation process in accordance with the present invention.

A flow chart for the reagent plate preparation process is shown in FIG. 48. The vial racks, plates and common reagents are first loaded onto the sample processor (400). A bar code verification is also accomplished at this step. Then, the valve is switched to system solvent and washed for all fluid delivery lines (402). The agents are subsequently aspirated from the vials and dispensed into one or more of the processors on the robotic sample processor (404). The tip of the aspirator is washed at the deep well station (406). If the transfer of the reagent to the plate is complete (408), then the necessary common reagents are added to the diversity reagents in the plates (410). If all of the plate transfers are not complete, then steps (404) and (406) are repeated. Once all the necessary reagents are added, all the lines and tips are washed in the system solvent (412). At this point, the reagent preparation process is completed (414).

Figure 49:
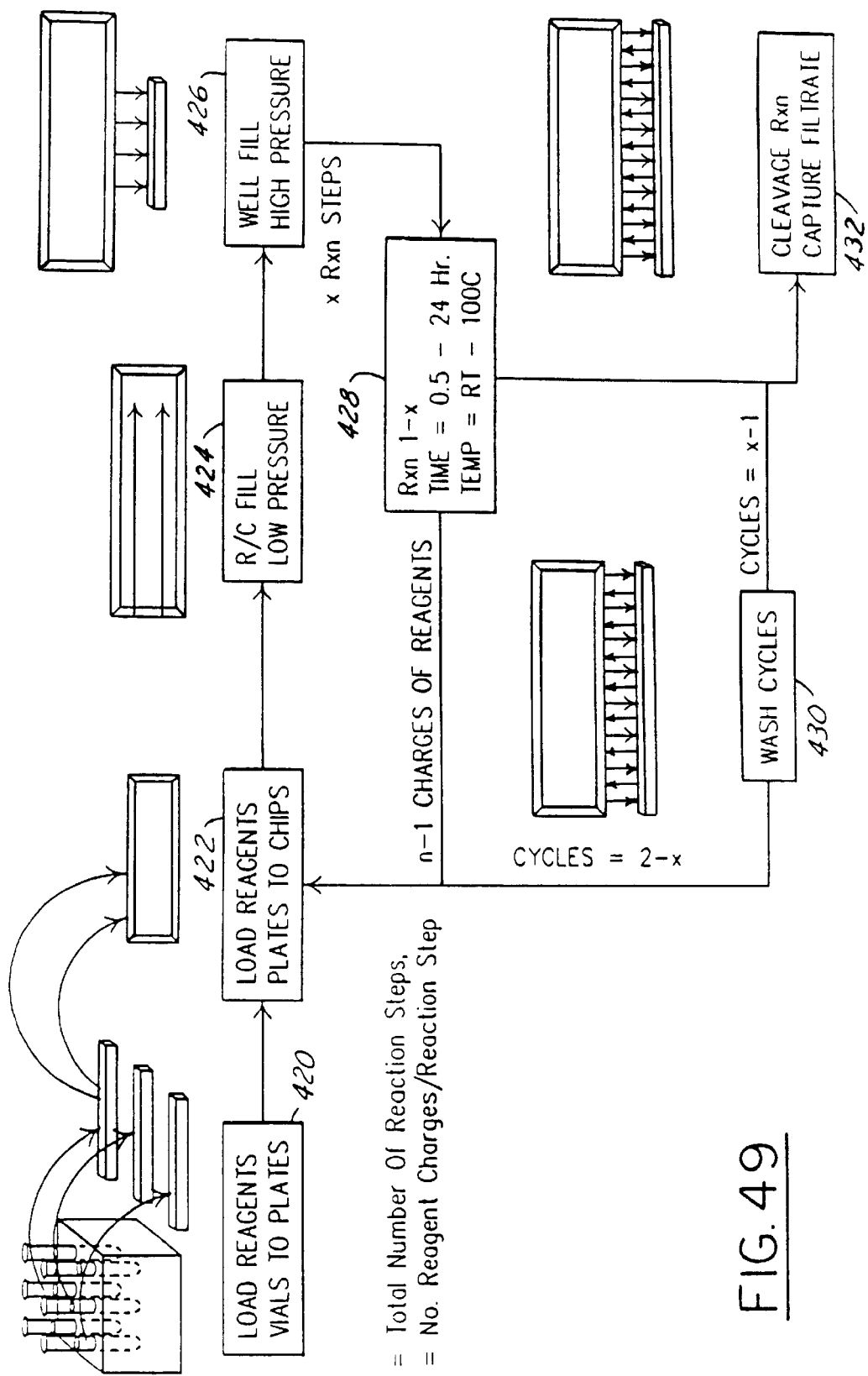
FIG. 49 schematically illustrates a synthesis process utilizing multiple fluid sample processors in accordance with the present invention.

A typical micro-synthesis process is shown in FIG. 49. The reagents in vials are loaded on the plates (420). The reagent plates are then loaded to chips (422). Low pressure is utilized to fill the row and column (R/C) channels in the processor (424). High pressure or high vacuum is then utilized to discharge the waste effluents from the processor (426). The loaded reagents and washing of the samples are carried out a number of times in order to complete the synthesis process (428). A plurality of wash cycles (430) is typically utilized during the process. Once the material is synthesized, it is cleaved from the solid support and the filtrate is captured (432).

Figure 50:
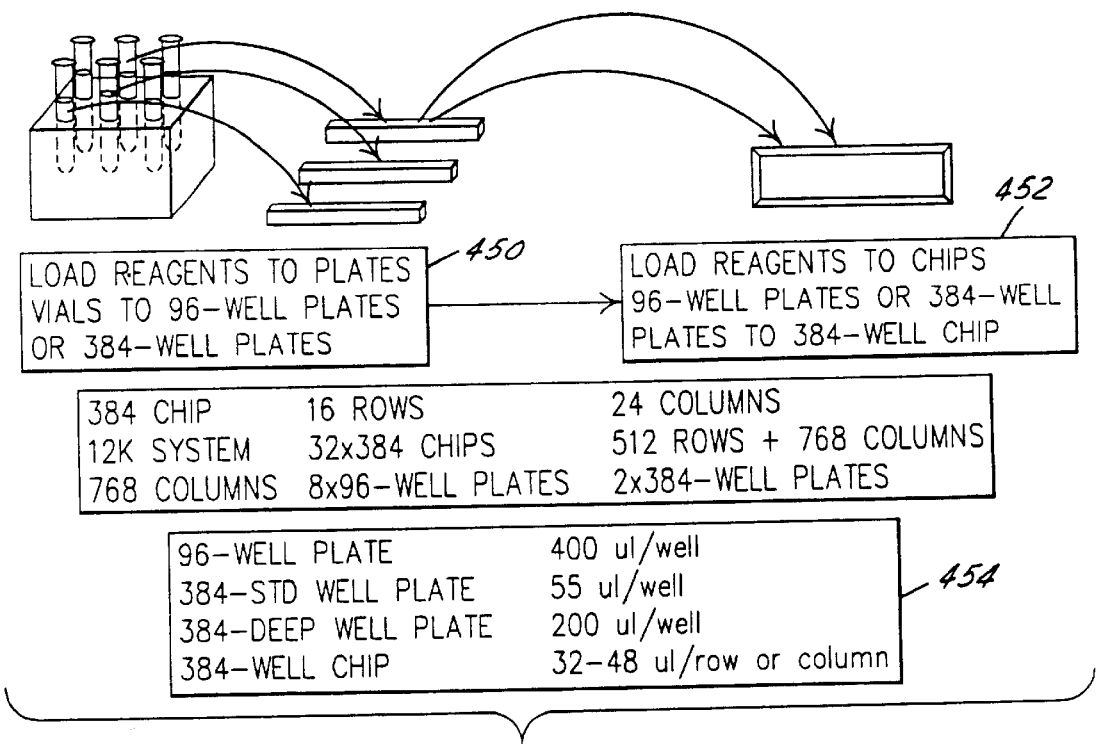
FIG. 50 schematically shows a reagent mapping process in accordance with the present invention.

A reagent mapping process is shown in FIG. 50. The reagents are loaded onto plates (450). The reagents are then loaded to chips (452). In a 384-chip, there are 16 rows and 24 columns of openings or apertures which can be loaded. In a 12 k system, there are 32 chips, each with 384 apertures or wells; this means that there are 520 rows and 768 columns. In box (454) in FIG. 50, the amounts of reagents used in the various well plates are shown. For example, in a 384 standard well plate, 55 micro liters of fluid are used in each well.

Figure 51:
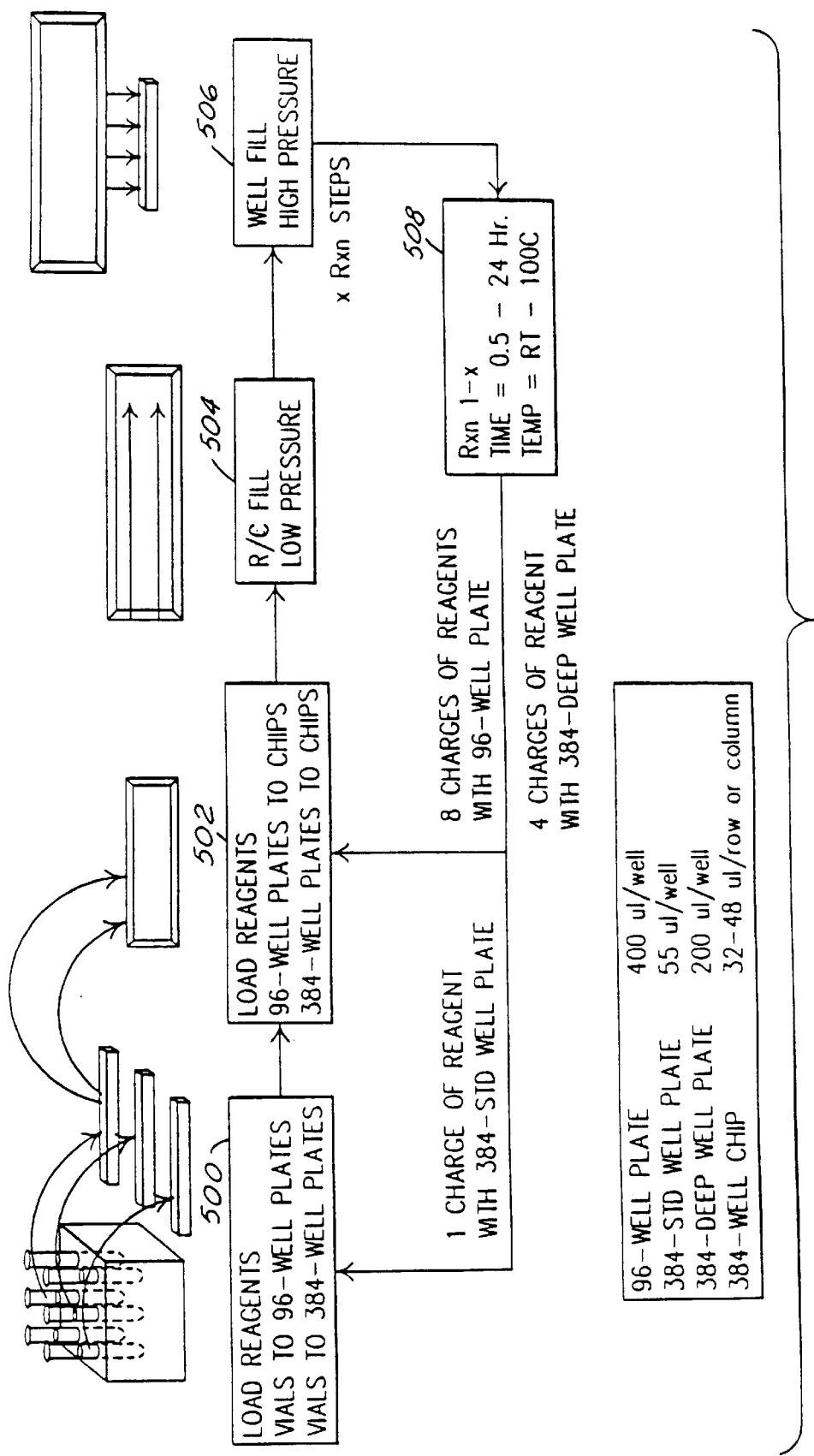
FIG. 51 schematically illustrates reagent processing in accordance with the present invention.

FIG. 51 illustrates another reagent processing procedure in flow chart or schematic form. The reagents are loaded from the vials to the well plates (500). The reagents are loaded from the well plates to the chips (502). Low pressure pumping action is then used to distribute the samples throughout the rows and columns (R/C) of the microchannels and wells (504). The high pressure is then used to fill the wells from the channels and break the capillaries (506). This procedure is repeated a sufficient number of times until the synthesis process is completed (508).

Figure 52:
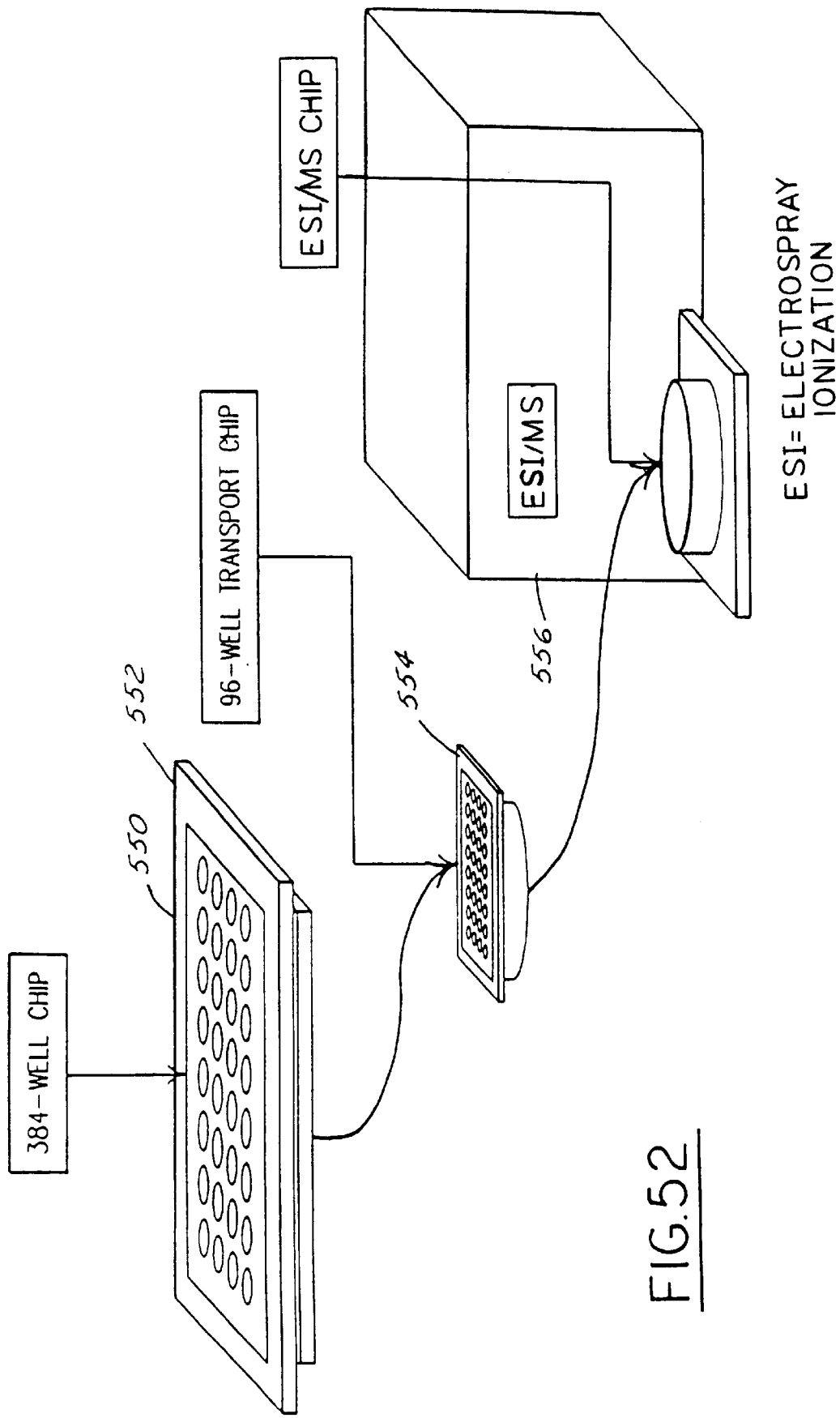
FIG. 52 illustrates an integrated synthesis and analysis system utilizing the present invention.

An integrated synthesis and analysis process is shown schematically in FIG. 52. A 384-well processor (550) with a frame (552) is utilized. A 96-well transport processor 554 is utilized to transport the materials from the 384-well to a processor (550) and then to a robotic sample processor 556. The ESI/MS chip is used to analyze resultant compounds produced by the synthesis process.

Figure 53:
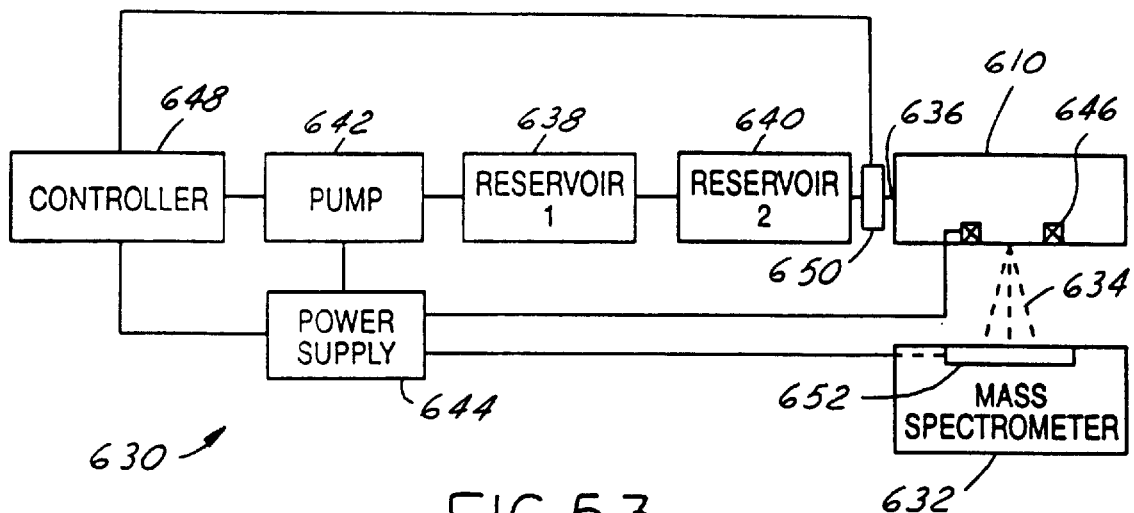
FIG. 53 is a block diagram schematic view of a microfluidic fluid transportation system according to the present invention.

Referring now to FIG. 53, a block diagram of a fluid transportation system 630 that is used to remove fluid from a microfluidic device 610 is illustrated. Fluid transportation system 630 controls the amount of fluid distributed from or within microfluidic device 610. Fluid transportation system 630 is illustrated adjacent to a mass spectrometer 632 that is used for analyzing the composition of a fluid delivery 634 from microfluidic device 610. Mass spectrometer 632 analyzes the composition of fluid delivery 634 in a well-known manner.

Microfluidic device 610 has a fluid input 636 which is coupled to a first fluid reservoir 638. As will be further described below, a second fluid reservoir 640 may also be coupled in series with first fluid reservoir 638. A pump 642 is used to move fluid from the first reservoir 638 and second fluid reservoir 640 into fluid input 636.

A power supply 644 is electrically coupled to buffer reservoir or pump 642 to an electrode 646 in microfluidic device 610 and mass spectrometer 632. A controller 648 is coupled to power supply 644 and may be coupled to pump 642. Controller 648 controls the coupling of power to electrode 646, pump 642, and mass spectrometer 632. Controller 648 is preferably microprocessor based. Controller 648, however, in its simplest form may comprise a number of switches. In the microprocessor form, controller 648 may include an internal timer.

A flow meter 650 may be positioned between fluid reservoir 638 and fluid input 636. Flow meter 650 may provide feedback to controller 648 with regard to the amount of fluid transported to microfluidic device 610.

Other feedback means to controller 648 may, for example, be timing for pump 642. If the pump flows at a certain rate when in operation, the amount of fluid delivered to microfluidic device 610 may be determined by a timer. The timer may be incorporated within pump 642 or within controller 648 as described above.

In operation, controller 648 controls pump 642 to supply a predetermined amount of fluid from reservoirs 638 and 640. As will be further described below, as a droplet of fluid forms at an opening of microfluidic device 610, power supply 644 under the control of controller 648 applies power to contacts 646 and between a target 652. A voltage potential difference exists between contact 646 and target 652 so that fluid delivery 634 is formed therebetween.

A first reservoir 638 and second reservoir 640 may be used to electrically isolate pump 642 from microfluidic device 610. In this manner, second reservoir 640 provides isolation. Second reservoir 640 may be eliminated if another manner for electrical isolation is employed. In the illustration of FIG. 53, a single pump and a pair of series reservoirs 638, 640 are employed. However, it is likely that various numbers of pumps and reservoirs may be used to provide various reagents to microfluidic device 610.

Figure 54:
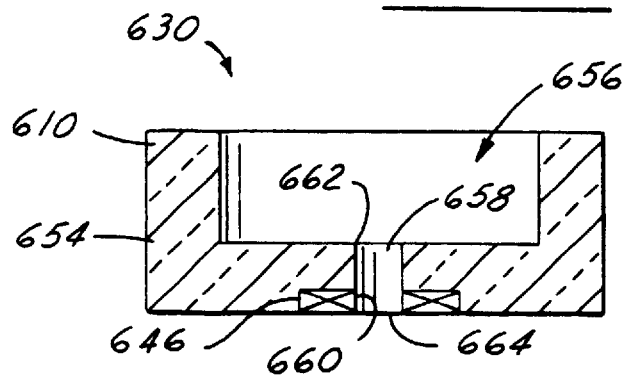
FIG. 54 is cross-sectional view of a well configured to transport liquid according to the present invention.
Figure 55:
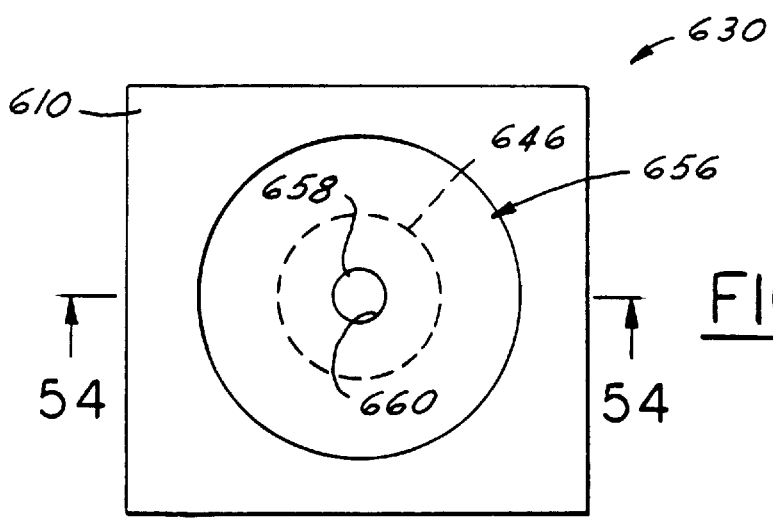
FIG. 55 is a top view of the device shown in FIG. 54.

Referring now to FIGS. 54 and 55, a portion of a microfluidic device 610 is shown. The portion shown, may, for example, be a well plate 654 having a well 656. A well plate 654 is described in FIGS. 1 and 2 as bottom layer 16. Well 656 receives fluids from the other layers of microfluidic device 610. Each fluid within each of the wells 656 of the device 610 must be analyzed. For many applications, it is desirable, however, to analyze only a small portion of the fluidic solution in well 656. A sample outlet 658 is provided from well 656 through well plate 654. An opening 660 is formed at sample outlet 658. Sample outlet also has an entrance 662 adjacent to well 656. To sample fluid from well 656, fluid moves through entrance 662 through sample outlet 658 and through opening 660.

Sample outlet 658 acts as a capillary channel from well 656. A capillary barrier or "break" 664 is formed at opening 660 of sample outlet 658. Capillary break 664 is formed by the surface tension of the fluid in sample outlet 658 when opening to a larger volume. Without a sufficiently high pressure or some other action, fluid within well 656 does not flow from sample outlet 658.

An electrode 646 is positioned within sample outlet 658. Electrode 646 is illustrated as a ring electrode positioned at opening 660. The shape of electrode 646, however, may vary depending on the application. Electrode 646 in any form should be capable of inducing a charge on fluid at outlet 658.

In operation, a droplet is formed at opening 660 of sample outlet 658. The volume of the droplet may be precisely controlled by pump 642 and controller 648 of FIG. 53. Once a droplet having a desired volume is formed, power supply 644 provides a potential difference between contact 646 and target 652. Depending on the viscosity of the fluid and other characteristics, when a sufficient potential difference is applied between contact 646 and target 652, the droplet is formed into fluid delivery 634. The type of fluid delivery 634 may include a Taylor cone which is formed by charged particles from the droplet.

The charged particles may also form a stream between opening 660 and target 652. A stream is formed when a relatively medium voltage potential is applied between electrode 646 and target 652. The type of fluid delivery 634 obtained is dependent upon the voltage. For example, voltage in the range between 500 volts and 3 kilovolts may be used.

Figure 57:
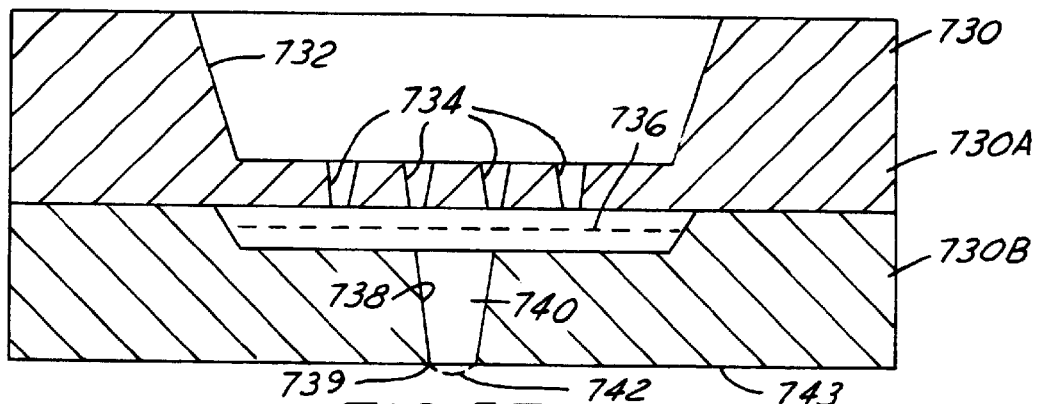
Figure 58:
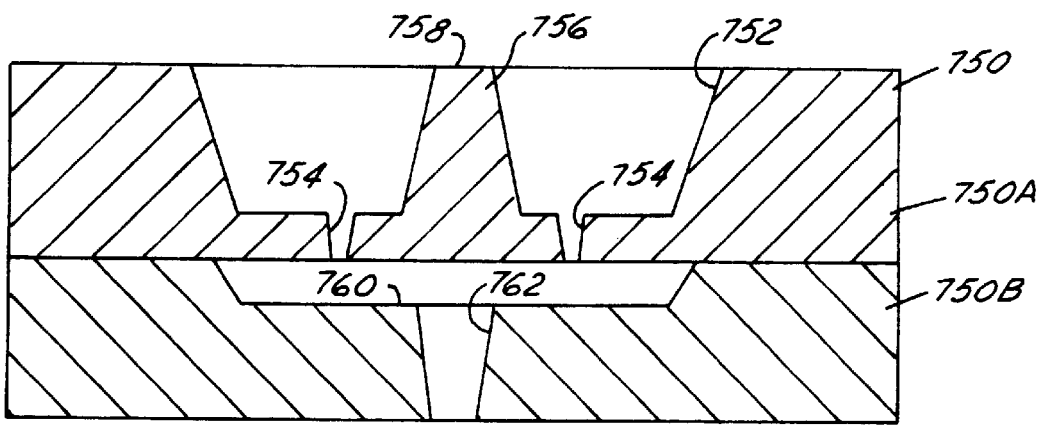

Still another system and procedure for effectively transporting liquid materials from one layer or plate member to another, and for effectively and consistently draining well members in discrete partial amounts is shown in FIGS. 57 and 58. A well plate member or chip 730 and a collection or product plate member or chip 750 are provided, each formed of two-layers 730A, 730B, and 750A, 750B, respectively, bonded or otherwise tightly secured together. Well plate member 730 has a well member 732 with a plurality of drainage openings 734 opening into a cavity or recess 736. A tapered channel 738 in turn communicates the cavity 736 with the lower surface of the plate member 730. When fluid materials 740 are positioned in the well plate member 730 and pressurized into the channel 738, a capillary barrier or bubble is formed at the exit of channel 738 (as shown by phantom line 742).

Collection plate 750 has a cavity 752 with a plurality of drainage holes 754 and a post or pin 756. The post or pin 756 can be made by conventional semi-conductor techniques. When plate member 750 is positioned below plate 730 and brought into contact or close proximity thereto, the upper end 758 of post or pin 756 makes contact with the liquid capillary barrier 742 and "wicks" or transfers some of the liquid material 740 into the cavity 752. Low pressure pumping could also be activated at the same time. With this system, the amount of material transferred from one plate to another can be controlled virtually on a drop-by-drop basis, thus allowing precise control of partial well draining for various detection and analysis purposes. As also shown in FIG. 58, the plate member 750 has a second cavity 760 and a tapered drainage channel 762.

In order to more effectively form capillary barriers at the ends of the microchannels in accordance with the present invention, it is also possible to add a layer or coating of a non-wettable or hydrophobic material, such as TEFLON, a polymer, or a plastic material, at the end of the channels or on an adjacent surface. For example, with reference to FIG. 57, a non-wettable coating could be applied at the exit end or orifice 739 of channel 738, or along the lower surface 743 of the plate member 730 (particularly adjacent to or surrounding the opening 738). In the alternative, the entire inside surface of channel 738 could be coated with a non-wettable material which would make the capillary micro-valve exist at the top or inlet of the opening rather than at the bottom or exit 739.

The present invention may be embodied in other specific forms without departing from the spirit or essential attributes thereof; therefore, the illustrated embodiments should be considered in all respects as illustrative and not restrictive, reference being made to the appended claims rather than to the foregoing description to indicate the scope of the invention.

What is claimed is:

1. A fluid sample processing apparatus comprising:

a reservoir plate member;

a distribution plate member connected to said reservoir plate member; and a well plate member connected to said distribution plate member;

said reservoir plate member having an upper surface and a lower surface and a first plurality of orifices in the upper surface for entry of liquids therein, and a plurality of second orifices on the lower surface for exhausting of liquids from said reservoir plate member, said first and second plurality of orifices being spatially oriented;

a first plurality of micro-sized channels in said reservoir plate member for conveying liquids from said first plurality of orifices to said plurality of second orifices;

said distribution plate member having an upper surface and a lower surface and a plurality of third orifices in said upper surface of said distribution plate member, said third orifices being spatially arranged in alignment with said second plurality of orifices in said reservoir plate member in order to transfer liquids from said reservoir plate member to said distribution plate member;

a second plurality of micro-sized channels in said distribution plate member for fluid communication between the orifices on the upper surface of the distribution plate member and a plurality of fourth orifices on the lower surface of said distribution layer;

said well plate member having a plurality of well members therein, said well members having first openings in alignment with said plurality of fourth orifices of said distribution plate member; and a pressurized fluid delivery mechanism, said mechanism positioned in contact with said reservoir plate member for selectively applying pressure into a plurality of first orifices in order to convey liquid materials through said apparatus.

2. The fluid sample processing apparatus as recited in claim 1 wherein said well plate member is releasably connected to said distribution plate member.

3. The fluid sample processing apparatus as recited in claim 1 wherein said well plate member is permanently bonded to said distribution plate member.

4. The fluid sample processing apparatus as recited in claim 1 wherein said well members have second openings therein for exhaustion of materials from said well members.

5. The apparatus as recited in claim 4 further comprising a collection plate layer positioned adjacent to said well plate member and having a plurality of collection members therein for collecting materials exhausted from said well members.

6. The apparatus as recited in claim 5 further comprising a spacing Member positioned between said well plate member and said collection plate member.

7. The apparatus as recited in claim 4 further comprising a heating plate member positioned adjacent to said well plate member for heating of materials placed in said well members.

8. The apparatus as recited in claim 1 wherein at least a portion of said second plurality of micro-sized channels in said distribution plate member are increased in size in order to control the distribution of a variety of materials with different fluidic properties.

9. The apparatus as recited in claim 1 wherein at least a portion of said second plurality of micro-sized channels increase sequentially in size along at least a portion of the surface of said distribution plate member.

10. An apparatus as set forth in claim 9 wherein said micro-sized channels increase sequentially in size toward the center of the distribution plate member.

11. The apparatus as recited in claim 1 wherein first micro-sized valve means are provided in communication with said plurality of third orifices in said distribution plate member.

12. The apparatus as recited in claim 1 wherein said sealing member is an elastomer member having a first plurality of openings positioned in alignment with said plurality of fourth orifices on said distribution plate member and a second plurality of opening positioned between said first plurality of openings, wherein said sealing member is altered in cross section, said elastomeric material can flow into said second openings.

13. The apparatus as recited in claim 1 wherein said sealing member is made from a material selected from the group comprising silicon, neoprene, and perfluro elastomer.

14. The apparatus as recited in claim 1 wherein said sealing member is a liquid coating material.

15. The apparatus as recited in claim 1 wherein said reservoir plate member is made from a material selected from the group comprising glass, fused silica, quartz, silicon, plastic, ceramic, tetrafluoroethylene, steel, stainless steel, aluminum and alloys of steel and aluminum.

16. The apparatus as recited in claim 1 wherein said distribution plate member is made from a material selected from the group comprising glass, fused silica, quartz, silicon, plastic, ceramic, tetrafluoroethylene, steel, stainless steel, aluminum and alloys of steel and aluminum.

17. The apparatus as recited in claim 1 wherein said well plate member is made from a material selected from the group comprising glass, tetrafluoroethylene, steel, stainless steel, aluminum and alloys of steel and aluminum.

18. The apparatus as recited in claim 1 wherein said distribution plate member and said well plate member are pretreated with materials selected from the group comprising silicon dioxide, silicon nitride, silicon carbide, titanium, tetrafluoroethylene, and silane.

19. The apparatus as recited in claim 1 wherein said first and second plurality of micro-sized channels are formed using semi-conductor fabrication techniques.

20. The apparatus as recited in claim 1 wherein said micro-sized channels are formed by laser etching, said channels having internal diameters in the range from 5 to 500 $\mu$m.

21. The apparatus as recited in claim 1 wherein said pressurized fluid delivery mechanism comprises means for applying pressure into opposed ends of rows and columns of orifices.

22. The apparatus as recited in claim 1 wherein said first plurality of orifices in said reservoir plate member comprises 96 orifices, said orifices arranged in an 8×12 microtiter format.

23. The apparatus as recited in claim 22 wherein the center-to-center spacing of the orifices is 2.25, 4.5, or 9.0 mm.

24. The apparatus as recited in claim 1 further comprising means on said distribution plate member for introduction of liquid materials from an outer edge.

25. The apparatus as recited in claim 1 wherein each of said well members in said well plate member has a volume in the range of 5 to 2000 nanoliters.

26. The apparatus as recited in claim 25 wherein the volume is 100–800 nanoliters.

27. The apparatus as recited in claim 1 further comprising a sealing member positioned adjacent to the upper surface of said reservoir plate member.

28. A system for simultaneously processing multiple fluid samples comprising:
   at least one fluid sample processing apparatus as set forth in claim 1; and
   a robotic mechanism for automatically handling and processing fluid samples in said at least one fluid sample processing apparatus;
   said robotic mechanism comprising a rack member for positioning of said at least one fluid sample processing apparatus thereon, a fluid transfer mechanism for injecting fluids into said fluid sample processing apparatus, and a controller for operating said fluid transfer mechanism.

29. The system as set forth in claim 28 further comprising a pressurized fluid delivery mechanism for selectively applying pressure to said fluid sample processing apparatus and thereby conveying fluids therethrough.

30. The system as set forth in claim 28 further comprising a vacuum mechanism for selectively applying a vacuum to said fluid sample processing apparatus and thereby conveying fluids therethrough.

31. The system as set forth in claim 28 wherein two fluid processing apparatuses are provided for simultaneously handling and processing by said robotic mechanism.

32. The system as set forth in claim 28 wherein said robotic mechanism is a Cartesian robot mechanism with at least one moveable arm member and further comprises a pressure pumping mechanism for distribution of fluid materials into and through said at least one fluid sample processing apparatus.

33. The system as set forth in claim 28 wherein said robotic mechanism is a Cartesian robot mechanism with at least one moveable arm member and further comprises a pressure pumping mechanism and a vacuum mechanism for distribution of fluid materials into and through said at least one fluid sample processing apparatus.

34. The system as set forth in claim 28 wherein said plurality of first orifices in said reservoir plate member comprises 96 orifices, said orifices arranged in an 8×12 microtiter format.

35. The system as set forth in claim 28 wherein said plurality of first orifices in said reservoir plate member comprises 384 orifices, said orifices arranged in a 16×24 row and column format.

36. The system as set forth in claim 28 wherein said plurality of first orifices in said reservoir plate member comprises 1536 orifices, said orifices arranged in a 32×48 row and column format.

37. The system as set forth in claim 28 further comprising means for washing said reservoir, distribution and well plate members by application of pressure followed by evacuation by vacuum.

38. The system as set forth in claim 28 further comprising means to partially fill said well members in said well plate member.

39. The system as set forth in claim 28 further comprising a plurality of collection plate members for attachment to said at least one fluid sample processing apparatus, wherein liquids exhausted from said well plate member can be collected and apportioned.

40. The system as set forth in claim 28 further comprising means to concentrate materials in said well members.

41. The system as set forth in claim 40 wherein said means for concentrating materials comprises a flow of a gas material.

42. A fluid sample processing apparatus comprising:

a reservoir plate member;

a distribution plate member connected to said reservoir plate member; and a well plate member connected to said distribution plate member;

said reservoir plate member having an upper surface and a lower surface and a first plurality of orifices in the upper surface for entry of liquids therein, and a plurality of second orifices on the lower surface for exhausting of liquids from said reservoir plate member, said first plurality of orifices being spatially oriented in across said first surface, said second plurality of orifices fluidically coupled to said first orifices, said second plurality of orifices arranged in a rectangular pattern directly adjacent to edges of said reservoir plate member;

a first plurality of micro-sized channels in said reservoir plate member for conveying liquids from said first plurality of orifices to said plurality of second orifices;

said distribution plate member having an upper surface and a lower surface and a plurality of layers and a plurality of third orifices in said upper surface of said distribution plate member, said third orifices being spatially arranged in a rectilinear pattern in alignment with said second plurality of orifices in said reservoir plate member in order to transfer liquids from said reservoir plate member to said distribution plate member, the rectangular pattern having a first pair of opposites sides and a second pair of opposite side, said first pair of opposite sides have corresponding with row inputs of said distribution plate, and said second pair of opposite sides corresponding with column inputs of said distribution plate;

a second plurality of micro-sized channels in said distribution plate member for fluid communication between the rectilinear array of orifices on the upper surface of distribution plate member and a plurality of fourth orifices on the lower surface of said distribution layer;

said well plate member having a plurality of well members therein, said well members having first openings in alignment with said plurality of fourth orifices in the lowermost layer of said distribution plate member.

43. A fluid sample processing apparatus comprising:

a reservoir plate member;

a distribution plate member connected to said reservoir plate member; and a well plate member connected to said distribution plate member;

said reservoir plate member having an upper surface and a lower surface and a first plurality of orifices in the upper surface for entry of liquids therein, and a plurality of second orifices on the lower surface for exhausting of liquids from said reservoir plate member, said first and second plurality of orifices being spatially oriented;

a first plurality of micro-sized channels in said reservoir plate member for conveying liquids from said first plurality of orifices to said plurality of second orifices;

said distribution plate member having an upper surface and a lower surface and a plurality of third orifices in said upper surface of said distribution plate member, said third orifices being spatially arranged in alignment with said second plurality of orifices in said reservoir plate member in order to transfer liquids from said reservoir plate member to said distribution plate member;

a second plurality of micro-sized channels in said distribution plate member for fluid communication between the orifices on the upper surface of the distribution plate member and a plurality of fourth orifices on the lower surface of said distribution layer;

said well plate member having a plurality of well members therein for conducting chemical and biological events, said well members having first openings in alignment with said plurality of fourth orifices of said distribution plate member; and a vacuum box mechanism for connected to said fluid sample processing apparatus for vacuum exhaustion of materials from said well plate member.

44. A fluid sample processing apparatus comprising:

a reservoir plate member;

a distribution plate member connected to said reservoir plate member; and a well plate member connected to said distribution plate member;

said reservoir plate member having an upper surface and a lower surface and a first plurality of orifices in the upper surface for entry of liquids therein, and a plurality of second orifices on the lower surface for exhausting of liquids from said reservoir plate member, said first and second plurality of orifices being spatially oriented;

a first plurality of micro-sized channels in said reservoir plate member for conveying liquids from said first plurality of orifices to said plurality of second orifices;

said distribution plate member having an upper surface and a lower surface and a plurality of third orifices in said upper surface of said distribution plate member, said third orifices being spatially arranged in alignment with said second plurality of orifices in said reservoir plate member in order to transfer liquids from said reservoir plate member to said distribution plate member;

a second plurality of micro-sized channels in said distribution plate member for fluid communication between the orifices on the upper surface of the distribution plate member and a plurality of fourth orifices on the lower surface of said distribution layer;

said well plate member having a plurality of well members therein for conducting chemical and biological events, said well members having first openings in alignment with said plurality of fourth orifices of said distribution plate member; and electrical spray means for exhaustion of liquid materials from said well members.

45. A fluid sample processing apparatus comprising:

a reservoir plate member;

a distribution plate member connected to said reservoir plate member; and a well plate member connected to said distribution plate member;

said reservoir plate member having an upper surface and a lower surface and a first plurality of orifices in the upper surface for entry of liquids therein, and a plurality of second orifices on the lower surface for exhausting of liquids from said reservoir plate member, said first and second plurality of orifices being spatially oriented;

a first plurality of micro-sized channels in said reservoir plate member for conveying liquids from said first plurality of orifices to said plurality of second orifices;

said distribution plate member having an upper surface and a lower surface and a plurality of third orifices in said upper surface of said distribution plate member, said third orifices being spatially arranged in alignment with said second plurality of orifices in said reservoir plate member in order to transfer liquids from said reservoir plate member to said distribution plate member;

a second plurality of micro-sized channels in said distribution plate member for fluid communication between the orifices on the upper surface of the distribution plate member and a plurality of fourth orifices on the lower surface of said distribution layer;

said well plate member having a plurality of well members therein for conducting chemical and biological events, said well members having first openings in alignment with said plurality of fourth orifices of said distribution plate member; and micro-sized valve means in said plurality of first openings in said well plate member.

46. A fluid sample processing apparatus comprising:

a reservoir plate member;

a distribution plate member connected to said reservoir plate member; and a well plate member connected to said distribution plate member;

said reservoir plate member having an upper surface and a lower surface and a first plurality of orifices in the upper surface for entry of liquids therein, and a plurality of second orifices on the lower surface for exhausting of liquids from said reservoir plate member, said first and second plurality of orifices being spatially oriented;

a first plurality of micro-sized channels in said reservoir plate member for conveying liquids from said first plurality of orifices to said plurality of second orifices;

said distribution plate member having an upper surface and a lower surface and a plurality of third orifices in said upper surface of said distribution plate member, said third orifices being spatially arranged in alignment with said second plurality of orifices in said reservoir plate member in order to transfer liquids from said reservoir plate member to said distribution plate member;

a second plurality of micro-sized channels in said distribution plate member for fluid communication between the orifices on the upper surface of the distribution plate member and a plurality of fourth orifices on the lower surface of said distribution layer;

said well plate member having a plurality of well members therein for conducting chemical and biological events, said well members having first openings in alignment with said plurality of fourth orifices of said distribution plate member wherein said well members have second openings therein for exhaustion of materials from said well members, said second openings in said well members comprise a plurality of micro-sized valves.

47. The apparatus as recited in claim 46 wherein at least four micro-sized valves are provided.

48. The apparatus as recited in claim 46 wherein each of said micro-sized valves is tapered from a first diameter to a second diameter less than the first diameter.

49. A fluid sample processing apparatus comprising:

a reservoir plate member;

a distribution plate member connected to said reservoir plate member; and a well plate member connected to said distribution plate member;

said reservoir plate member having an upper surface and a lower surface and a first plurality of orifices in the upper surface for entry of liquids therein, and a plurality of second orifices on the lower surface for exhausting of liquids from said reservoir plate member, said first and second plurality of orifices being spatially oriented;

a first plurality of micro-sized channels in said reservoir plate member for conveying liquids from said first plurality of orifices to said plurality of second orifices;

said distribution plate member having an upper surface and a lower surface and a plurality of third orifices in said upper surface of said distribution plate member, said third orifices being spatially arranged in alignment with said second plurality of orifices in said reservoir plate member in order to transfer liquids from said reservoir plate member to said distribution plate member;

a second plurality of micro-sized channels in said distribution plate member for fluid communication between the orifices on the upper surface of the distribution plate member and a plurality of fourth orifices on the lower surface of said distribution layer;

said well plate member having a plurality of well members therein for conducting chemical and biological events, said well members having first openings in alignment with said plurality of fourth orifices of said distribution plate member; and a first sealing member positioned between said distribution plate member and said well plate member, said sealing member is an elastomeric member having a first plurality of openings positioned in alignment with said plurality of fourth orifices on said distribution plate member and a second plurality of openings positioned between said first plurality of openings, wherein when said sealing member is altered in cross-section, said elastomeric material can flow into said second openings.

50. A fluid sample processing apparatus comprising:

a reservoir plate member;

a distribution plate member connected to said reservoir plate member; and a well plate member connected to said distribution plate member;

said reservoir plate member having an upper surface and a lower surface and a first plurality of orifices in the upper surface for entry of liquids therein, and a plurality of second orifices on the lower surface for exhausting of liquids from said reservoir plate member, said first and second plurality of orifices being spatially oriented;

a first plurality of micro-sized channels in said reservoir plate member for conveying liquids from said first plurality of orifices to said plurality of second orifices;

said distribution plate member having an upper surface and a lower surface and a plurality of third orifices in said upper surface of said distribution plate member, said third orifices being spatially arranged in alignment with said second plurality of orifices in said reservoir plate member in order to transfer liquids from said reservoir plate member to said distribution plate member;

a second plurality of micro-sized channels in said distribution plate member for fluid communication between the orifices on the upper surface of the distribution plate member and a plurality of fourth orifices on the lower surface of said distribution layer;

said well plate member having a plurality of well members therein for conducting chemical and biological events, said well members having first openings in alignment with said plurality of fourth orifices of said distribution plate member;

wherein said plurality of first orifices in said reservoir plate member comprises 384 orifices and said apparatus further comprises a second reservoir member attached to said reservoir plate member, said second reservoir member having 96 orifices on its upper surface and a plurality of fan-out channels therein communicating said 96 orifices to said 384 orifices on said reservoir plate member.

51. A fluid sample processing apparatus comprising:

a reservoir plate member;

a distribution plate member connected to said reservoir plate member; and a well plate member connected to said distribution plate member;

said reservoir plate member having an upper surface and a lower surface and a first plurality of orifices in the upper surface for entry of liquids therein, and a plurality of second orifices on the lower surface for exhausting of liquids from said reservoir plate member, said first and second plurality of orifices being spatially oriented;

a first plurality of micro-sized channels in said reservoir plate member for conveying liquids from said first plurality of orifices to said plurality of second orifices;

said distribution plate member having an upper surface and a lower surface and a plurality of third orifices in said upper surface of said distribution plate member, said third orifices being spatially arranged in alignment with said second plurality of orifices in said reservoir plate member in order to transfer liquids from said reservoir plate member to said distribution plate member;

a second plurality of micro-sized channels in said distribution plate member for fluid communication between the orifices on the upper surface of the distribution plate member and a plurality of fourth orifices on the lower surface of said distribution layer;

said well plate member having a plurality of well members therein for conducting chemical and biological events, said well members having first openings in alignment with said plurality of fourth orifices of said distribution plate member;

wherein said plurality of first orifices in said reservoir plate member comprises 1536 orifices and said apparatus further comprises a second reservoir member attached to said reservoir plate member, said second reservoir member having 96 orifices on its upper surface and a plurality of fan-out channels therein communicating said 96 orifices to said 1536 orifices on said reservoir plate member.

52. A fluid sample processing apparatus comprising:

a reservoir plate member;

a distribution plate member connected to said reservoir plate member; and a well plate member connected to said distribution plate member;

said reservoir plate member having an upper surface and a lower surface and a first plurality of orifices in the upper surface for entry of liquids therein, and a plurality of second orifices on the lower surface for exhausting of liquids from said reservoir plate member, said first and second plurality of orifices being spatially oriented;

a first plurality of micro-sized channels in said reservoir plate member for conveying liquids from said first plurality of orifices to said plurality of second orifices;

said distribution plate member having an upper surface and a lower surface and a plurality of third orifices in said upper surface of said distribution plate member, said third orifices being spatially arranged in alignment with said second plurality of orifices in said reservoir plate member in order to transfer liquids from said reservoir plate member to said distribution plate member;

a second plurality of micro-sized channels in said distribution plate member for fluid communication between the orifices on the upper surface of the distribution plate member and a plurality of fourth orifices on the lower surface of said distribution layer;

said well plate member having a plurality of well members therein for conducting chemical and biological events, said well members having first openings in alignment with said plurality of fourth orifices of said distribution plate member;

a plurality of magnets positioned adjacent to said well plate member for attracting magnetic particles in said well members.

53. A fluid sample processing apparatus comprising:

a reservoir plate member;

a distribution plate member connected to said reservoir plate member; and a well plate member connected to said distribution plate member;

said reservoir plate member having an upper surface and a lower surface and a first plurality of orifices in the upper surface for entry of liquids therein, and a plurality of second orifices on the lower surface for exhausting of liquids from said reservoir plate member, said first and second plurality of orifices being spatially oriented;

a first plurality of micro-sized channels in said reservoir plate member for conveying liquids from said first plurality of orifices to said plurality of second orifices;

said distribution plate member having an upper surface and a lower surface and a plurality of third orifices in said upper surface of said distribution plate member, said third orifices being spatially arranged in alignment with said second plurality of orifices in said reservoir plate member in order to transfer liquids from said reservoir plate member to said distribution plate member;

a second plurality of micro-sized channels in said distribution plate member for fluid communication between the orifices on the upper surface of the distribution plate member and a plurality of fourth orifices on the lower surface of said distribution layer;

said well plate member having a plurality of well members therein for conducting chemical and biological events, said well members having first openings in alignment with said plurality of fourth orifices of said distribution plate member; and a non-fluidic plate member having a plurality of light emitting detection elements therein.

* * * * *